United States Patent [19]
Youngblood

[11] 3,748,031
[45] July 24, 1973

[54] PROJECTOR AND CARTRIDGE FOR COMBINATION VISUAL AND SOUND APPARATUS

[75] Inventor: Donald A. Youngblood, Chalfont, Pa.
[73] Assignee: Elco Corporation, Willow Grove, Pa.
[22] Filed: Apr. 6, 1970
[21] Appl. No.: 25,805

Related U.S. Application Data

[60] Division of Ser. No. 739,909, June 14, 1968, abandoned, which is a continuation of Ser. No. 535,149, March 17, 1966, abandoned.

[52] U.S. Cl. .................................. 353/15, 352/78
[51] Int. Cl. ..................... G03b 31/06, G03b 23/02
[58] Field of Search ..................... 353/15, 18, 68; 352/78

[56] References Cited
UNITED STATES PATENTS

| | | | |
|---|---|---|---|
| 3,252,372 | 5/1966 | Gallina | 353/15 |
| 2,856,812 | 10/1958 | Barron, Jr. | 353/68 |
| 3,410,498 | 11/1968 | Winkler | 352/78 |
| 3,316,806 | 5/1967 | Coulson | 353/15 |

Primary Examiner—S. Clement Swisher
Attorney—D. R. Pressman

[57] ABSTRACT

A projector for showing the frames of a filmstrip in noncontinuous sequence in synchronism with an audio presentation contains a receptacle which pivots out of the projector for receiving an audio/visual cartridge containing both an endless audio tape removable subcartridge and a removable endless-filmstrip holder. When the cartridge is inserted into the receptacle, the audio tape is moved to an operative position adjacent a tape head in the receptacle. When the receptacle with the cartridge is pivoted into the projector, the audio tape will be positioned adjacent a drive capstan in the projector and a pair of filmdrive sprocket wheels in the projector will engage sprocket holes in the tape via respective slots in the cartridge. The filmholder contains a mirror and the cartridge contains a framing aperture such that the projection light beam can be projected through the filmstrip, via the mirror and the framing aperture, when the filmholder is inserted in the cartridge.

11 Claims, 37 Drawing Figures

Patented July 24, 1973

INVENTOR.
DONALD A. YOUNGBLOOD

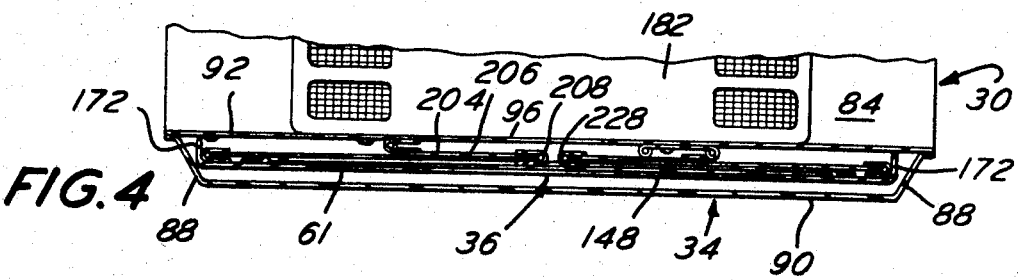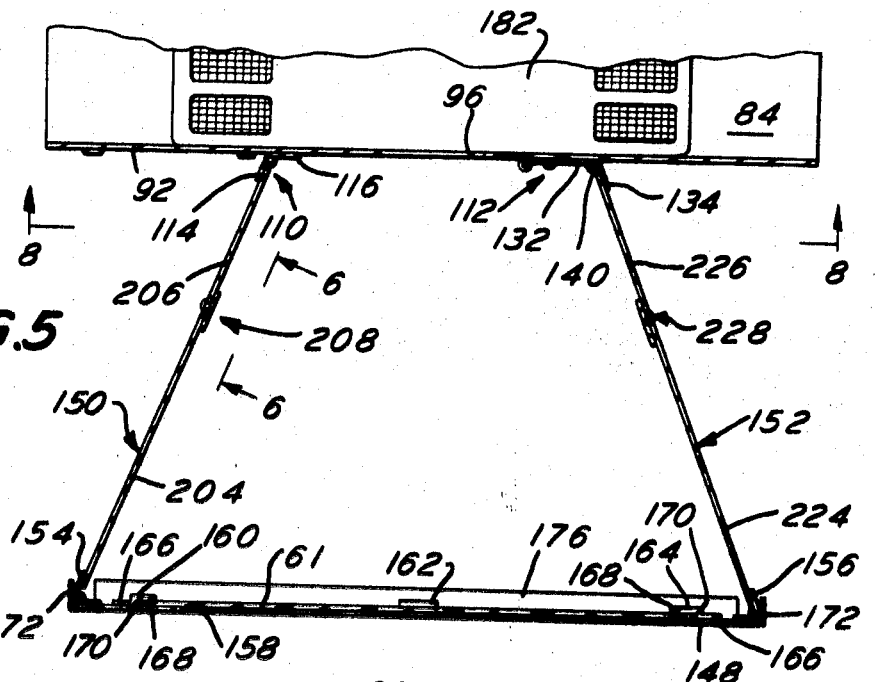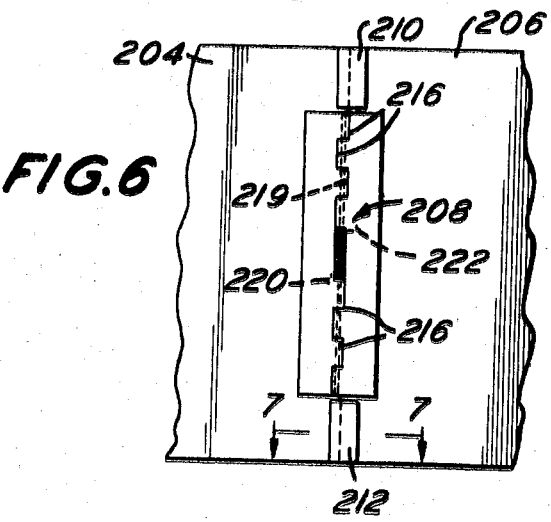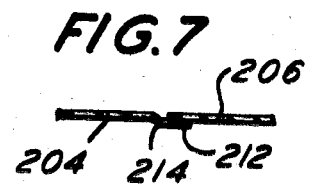

Patented July 24, 1973

INVENTOR
DONALD A. YOUNGBLOOD

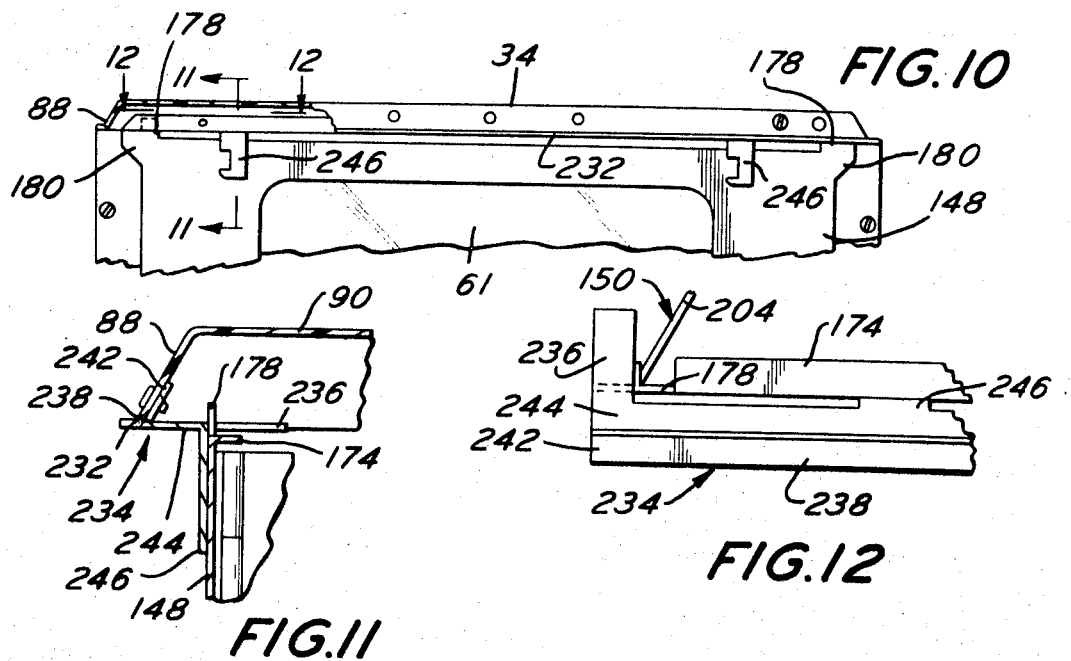
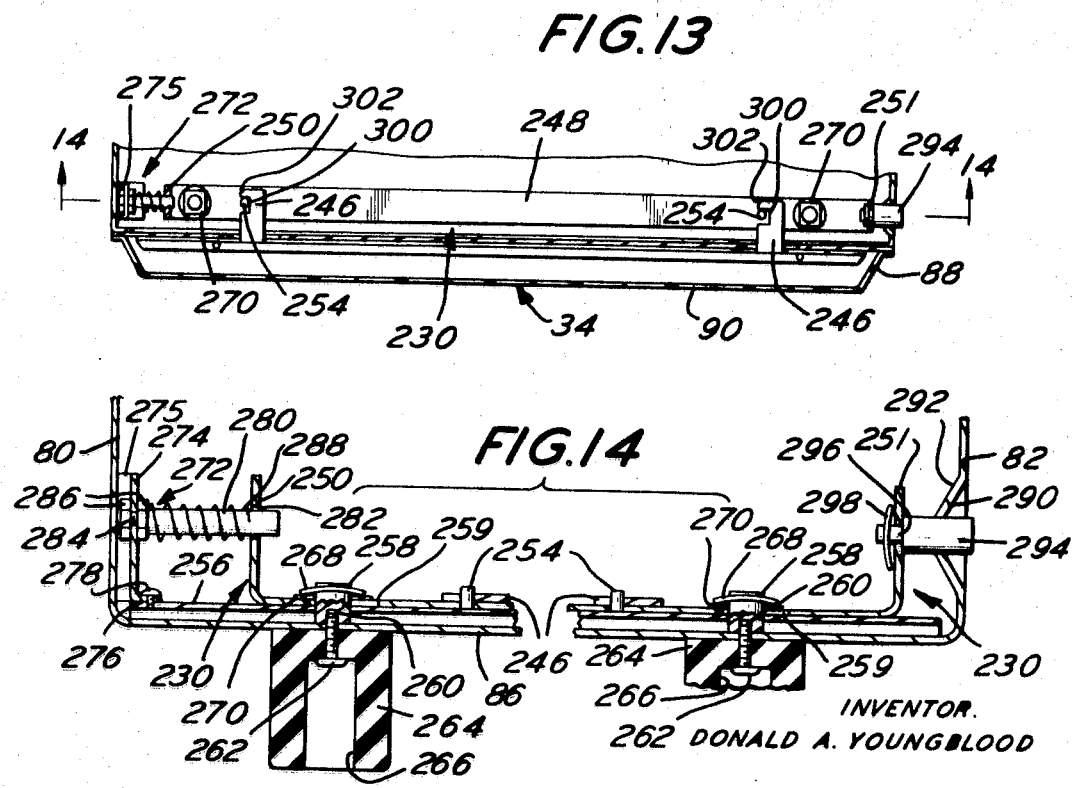

FIG.15

INVENTOR.
DONALD A. YOUNGBLOOD

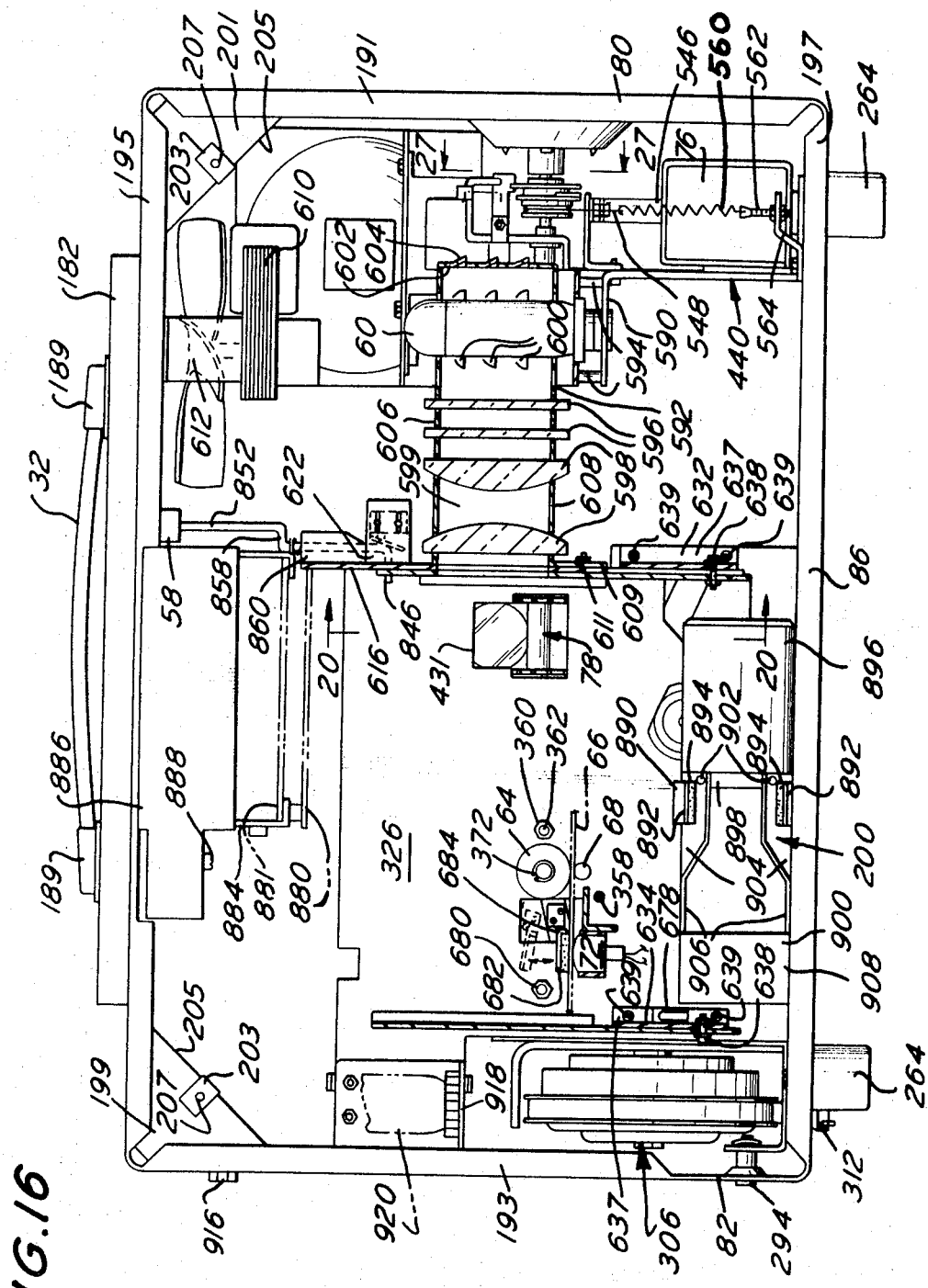

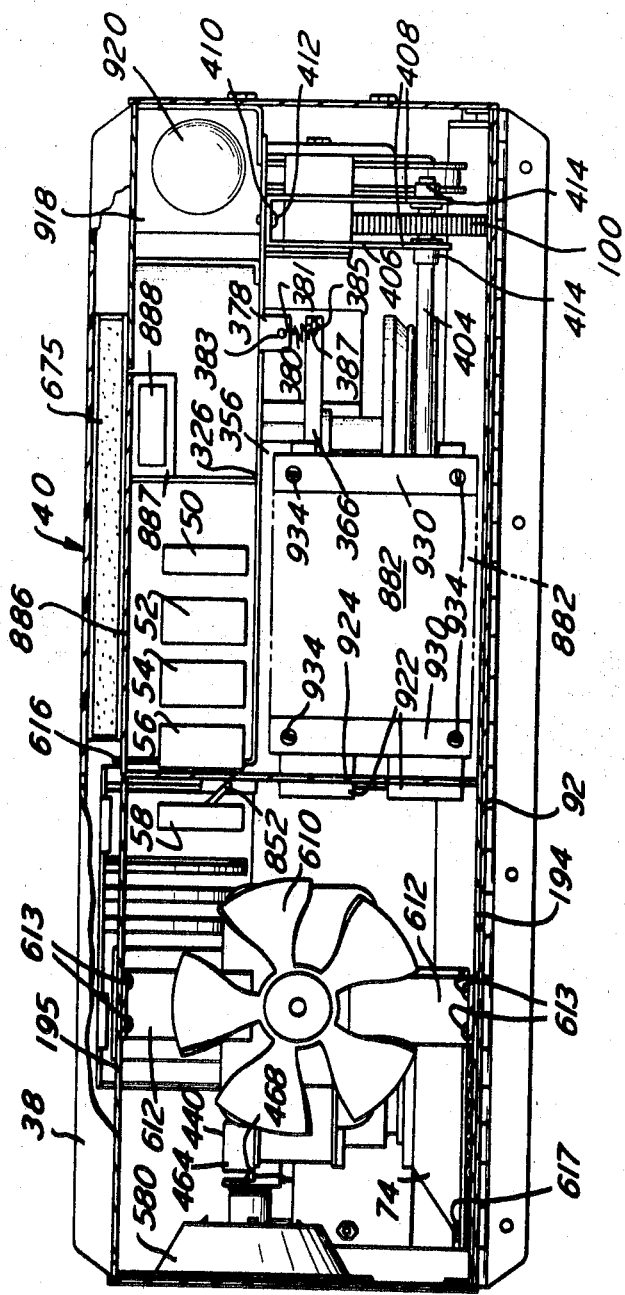

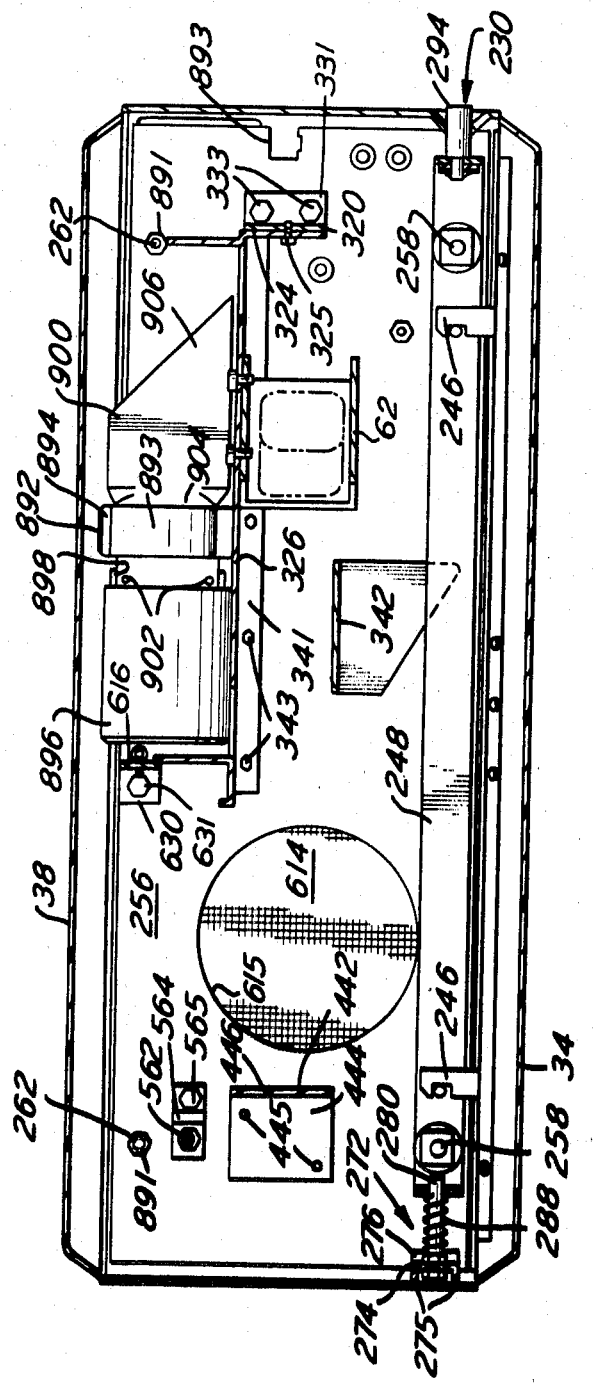

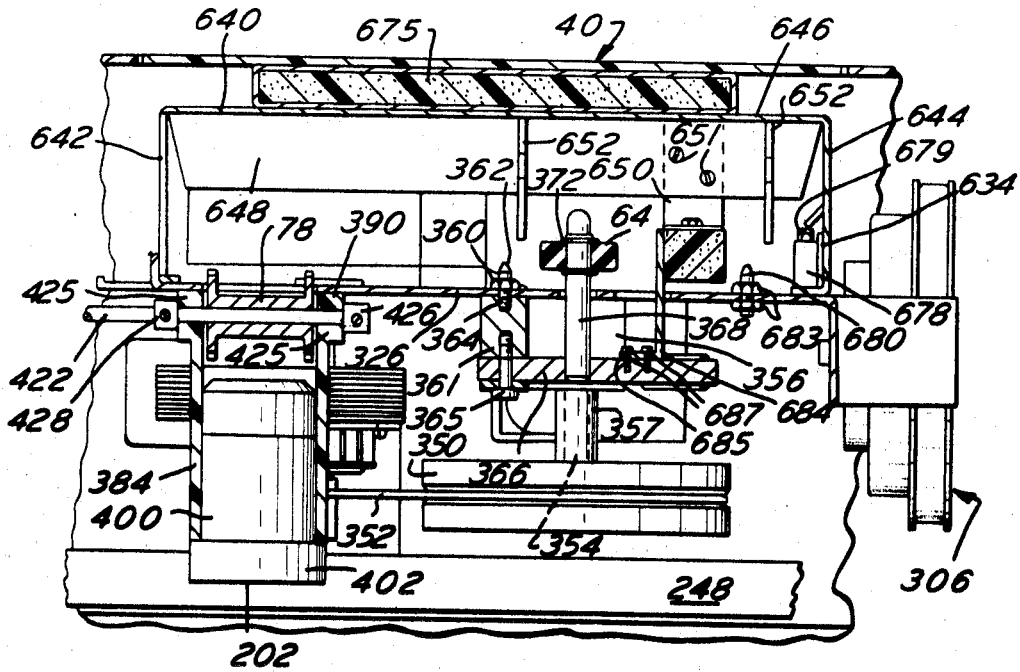
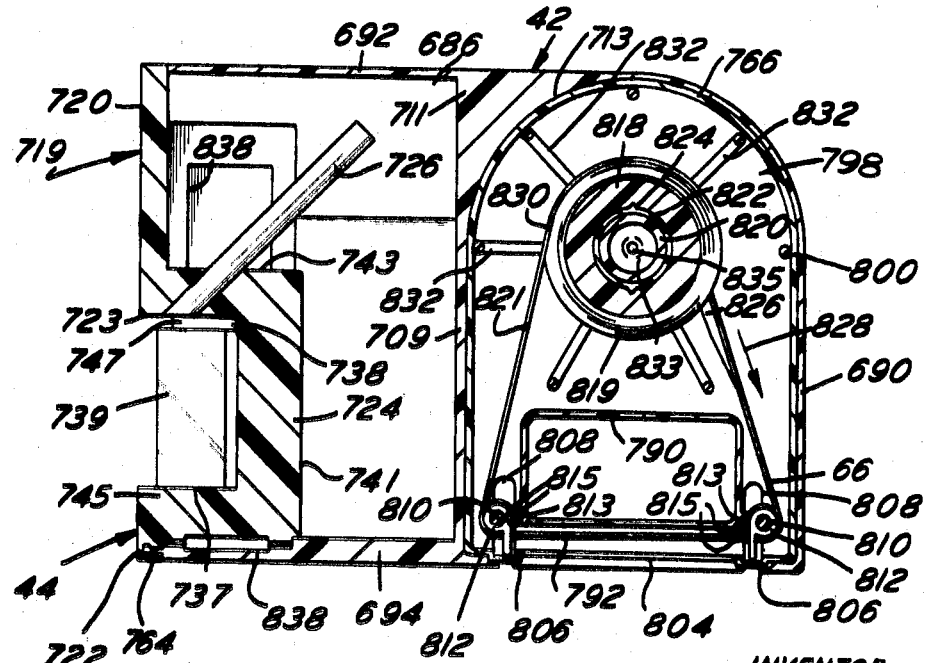

Patented July 24, 1973

INVENTOR
DONALD A. YOUNGBLOOD

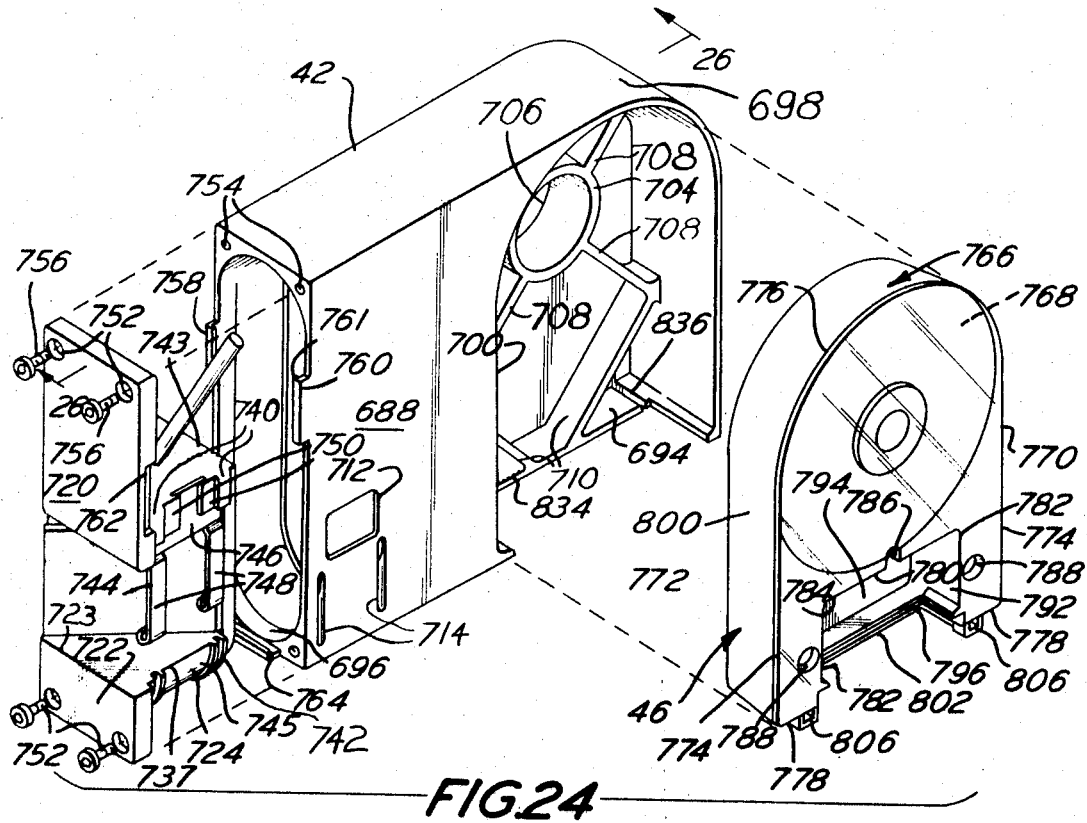
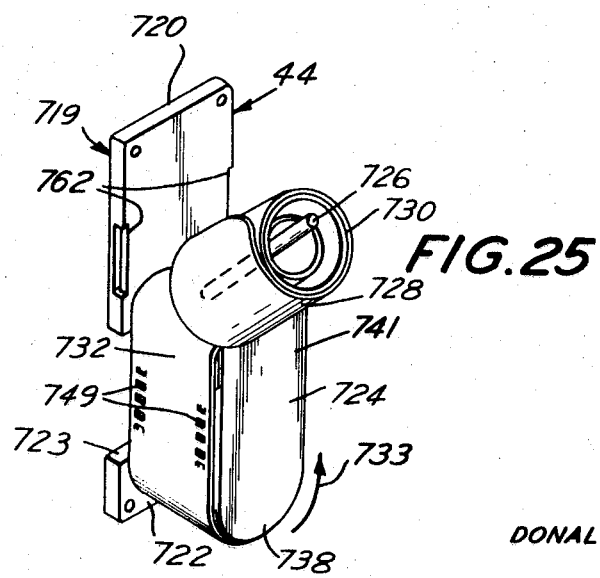
INVENTOR.
DONALD A. YOUNGBLOOD

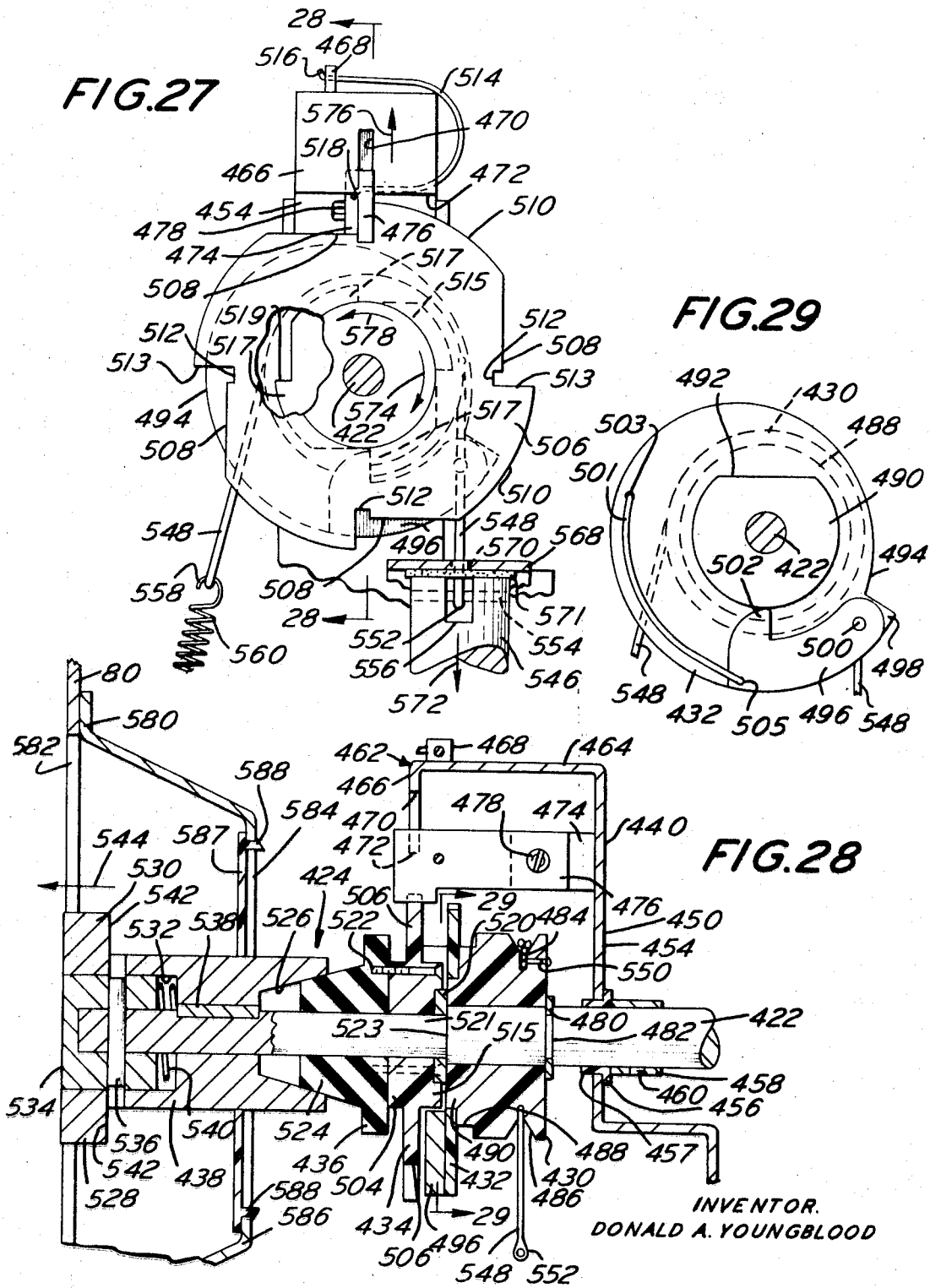

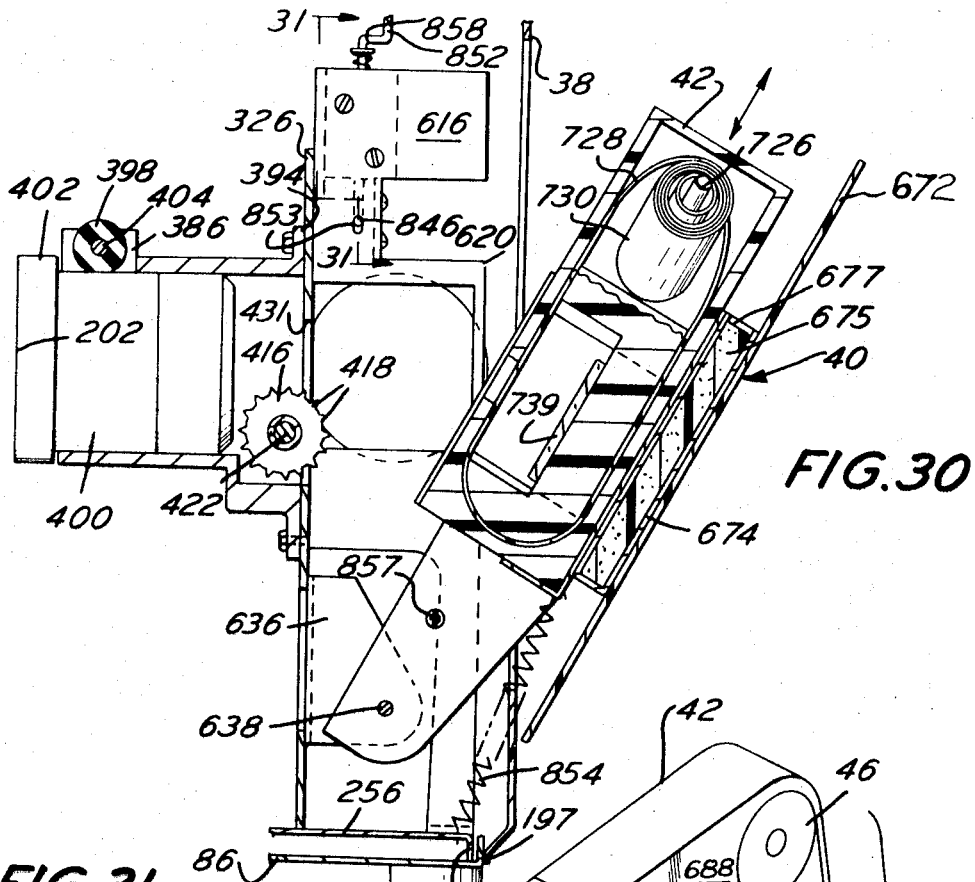
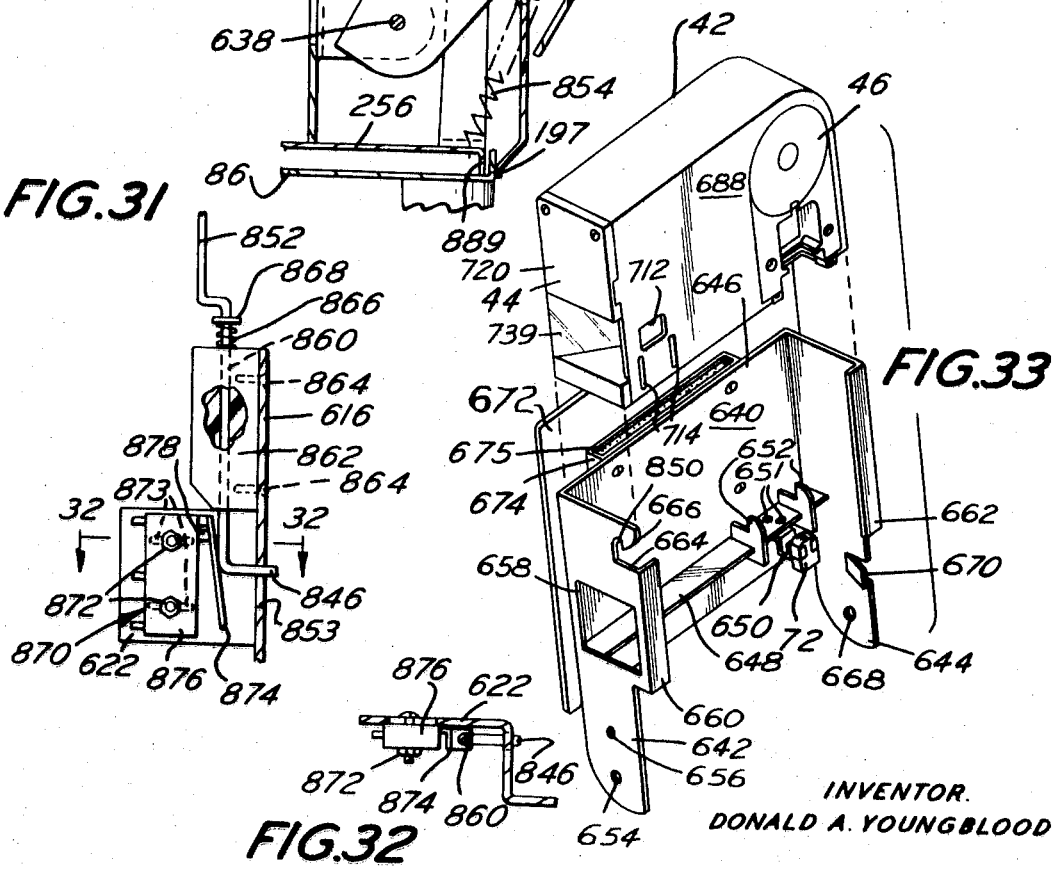

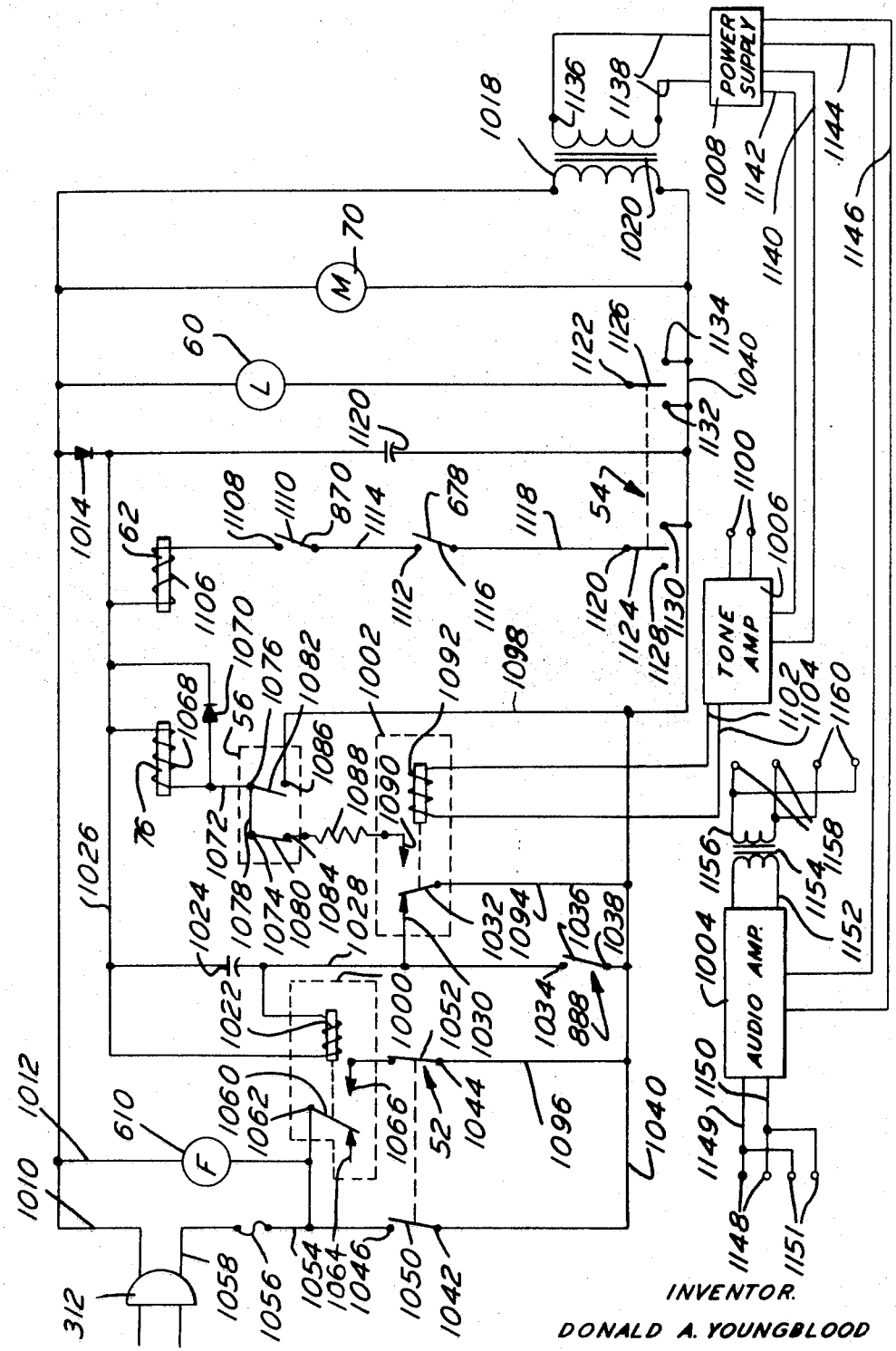

INVENTOR.
DONALD A. YOUNGBLOOD

INVENTOR.
DONALD A. YOUNGBLOOD

3,748,031

PROJECTOR AND CARTRIDGE FOR COMBINATION VISUAL AND SOUND APPARATUS

This is a division of parent application Ser. No. 739,909, filed June 14, 1968 (now abandoned), which parent application in turn is a continuation of grandparent application Ser. No. 535,149, filed March 17, 1966 (now abandoned). Three other divisional applications of said parent application (Ser. Nos. 25,707, 31,071, and 31,072 and filed on even dates herewith) now U.S. Pat. Nos. 3,669,531, 3,695,746 and 3,662,936 respectively describe inventions related to that of the present application.

This invention relates to an entertainment and/or educational device and more particularly to a combination visual and sound apparatus.

Combination audio and visual devices are known to be an important tool of education as well as sales. That is, where untrained teachers or salesmen are used, a device which combines a visual production with a audio background enables the untrained to present to a potential client or student a complete and well prepared program.

These combination visual and sound apparatus, however, have been inadequate because they are either inflexible or too difficult to operate for an untrained worker. At present, those which are easy to operate are so because they do not allow flexibility of programming. That is, in these devices, the apparatus is prepared in advance for presentation of a sound and film program in the factory and thus are able to show only a single presentation. In order to show an additional or alternate audio-visual presentation, it is necessary that the apparatus be transmitted to the factory which produced the apparatus originally and be returned with a different program. Or, the user would have to have a plurality of such devices, one for each program.

Those devices which are flexible enough to present various programs are difficult to operate. The operator of such a device must be given an intensive orientation as to the capabilities of the machine and must be capable of trouble shooting if any disorder results. These devices normally require threading of the film through the various guide and sprocket wheels in the device. If it is necessary to use a different sound track with the prethreaded film, the operator is required to manually synchronize the audio with visual presentation.

Therefore, there has been a recognized need for a combination visual and sound presentation device which is flexible enough so that various programs may be shown in the device yet is so uncomplicated to use that a relatively unskilled person may operate the device. For example where the device is to be used in various countries, the sound track should be easily interchangeable so that a plurality of sound tracks may be used with a single film. However, the device must be easy to operate.

It is, therefore, an object of this invention to provide a new and improved combination visual and sound apparatus.

Another object of the invention is to provide a new and improved visual and sound apparatus which is both portable and easy to operate.

Another object of the invention is to provide a combination visual and sound apparatus which readily handles a plurality of programs and which is adapted to easily interchange the audio and visual contents of a program.

Another object of the invention is to provide a new and improved unitized tape and film cartridge which is easily inserted into a visual and sound apparatus.

Another object of the invention is to provide a new and improved combination visual and sound apparatus having a receptacle which facilitates handling of film and tape cartridges.

Another object of the invention is to provide in a combination visual and sound apparatus a new and improved cartridge and cartridge receptacle therefor which is pivotable into and out of said apparatus to snap the cartridge into place.

These and other objects of the present invention are achieved by providing in a combination visual and sound apparatus, a cartridge having a first compartment for removably receiving a detechable magazine having mounted therein an endless coil of tape rotatably mounted for the production of sound, said cartridge having a separate second compartment for receiving an endless coil of film, said film adapted to be movable within said second compartment, said cartridge having an opening adjacent said film so that a single frame of said film may be positioned within said opening at a time, a pivotable cartridge receptacle mounted in said apparatus, a sound pickup means mounted in said receptacle, said receptacle being adapted to removably receive said cartridge, said receptacle including means for moving a portion of said tape into an operative position adjacent said pickup means during insertion of said cartridge, said apparatus including a sprocket wheel and a capstan mounted adjacent said pivotable receptacle, said sprocket wheel adapted to engage said film when said receptacle is pivoted to a closed position, said capstan adapted to be adjacent said tape when said receptacle is closed and adapted to movably engage said tape when said apparatus is in operation.

Other objects and many of the attendant advantages of this invention will be readily appreciated as the same becomes better understood by reference to the following detailed description when considered in connection with the accompanying drawings wherein:

FIG. 4 is an enlarged fragmentary sectional view taken along the line 4—4 in FIG. 1;

FIG. 5 is an enlarged fragmentary sectional view taken along the line 5—5 in FIG. 2;

FIG. 6 is an enlarged fragmentary elevational view taken along the line 6—6 in FIG. 5;

FIG. 7 is an enlarged fragmentary sectional view taken along the line 7—7 in FIG. 6;

FIG. 10 is a fragmentary side elevational view of the hood and screen with parts shown in section for the purpose of clarity;

FIG. 11 is an enlarged fragmentary sectional view taken along the line 11—11 in FIG. 10;

FIG. 12 is an enlarged fragmentary sectional view taken along the line 12—12 in FIG. 10;

FIG. 13 is an enlarged fragmentary sectional view taken along the line 13—13 in FIG. 1;

FIG. 14 is an enlarged discontinuous fragmentary sectional view taken along the line 14—14 in FIG. 14;

FIG. 15 is an enlarged sectional view taken along the line 15—15 in FIG. 2;

FIG. 16 is a side elevational view taken along the line 16—16 in FIG. 2 with the wall plate removed;

FIG. 17 is an enlarged sectional view taken along the line 17—17 in FIG. 15;

FIG. 18 is a sectional view taken along the line 18—18 in FIG. 15;

FIG. 19 is an enlarged fragmentary sectional view taken along the line 19—19 in FIG. 15;

FIG. 24 is an enlarged perspective view of a unitized tape and film cartridge embodying the invention;

FIG. 25 is an enlarged perspective view of an endless coil of film wound about the film holder;

FIG. 26 is an enlarged sectional view taken along the line 26—26 in FIG. 24;

FIG. 27 is an enlarged sectional view taken along the line 27—27 in FIG. 16;

FIG. 28 is an enlarged sectional view taken along the line 28—28 in FIG. 24;

FIG. 29 is an enlarged sectional view taken along the line 29—29 in FIG. 28;

FIG. 30 is an enlarged sectional view similar to FIG. 18 with the cartridge receptacle in an open position;

FIG. 31 is an enlarged sectional view taken along the line 31—31 in FIG. 30;

FIG. 32 is an enlarged fragmentary sectional view taken along the line 32—32 in FIG. 31;

FIG. 33 is an exploded perspective view of the cartridge receptacle and the cartridge prior to insertion thereof;

FIG. 34 is a schematic block diagram of the interconnections between the various electrical and electronic components within the combination visual and sound apparatus;

Referring now in greater detail to the various figures of the drawing wherein similar reference characters refer to similar parts, a combination visual and sound apparatus embodying the invention is generally shown at 30 in FIG. 1.

Figure 2:
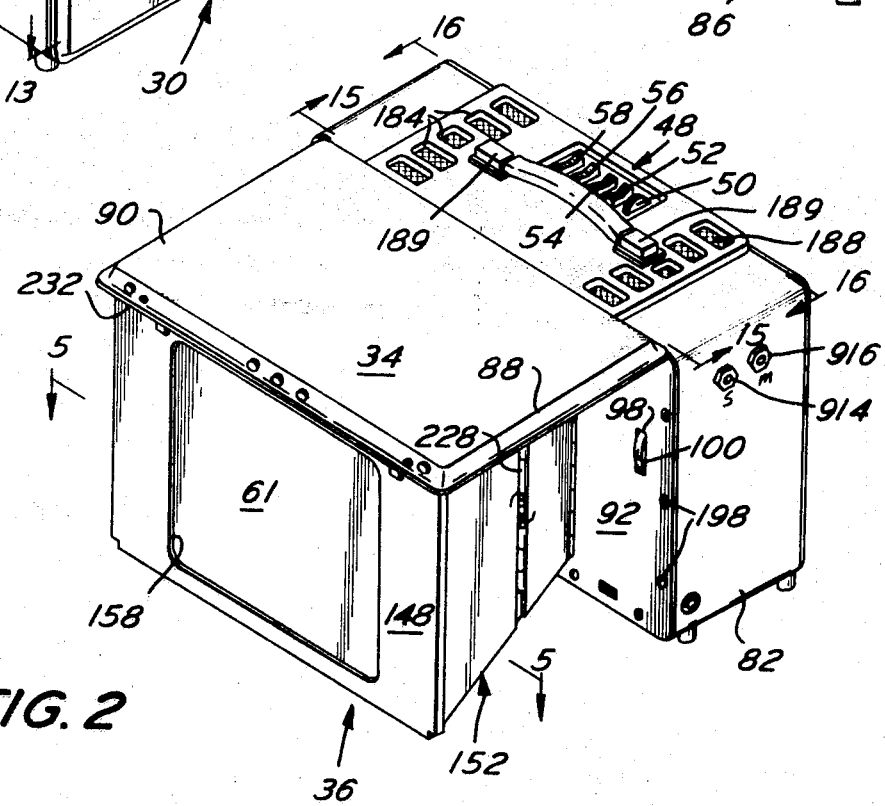
FIG. 2 is a perspective view of the combination visual and sound apparatus embodying the invention in an open position for projection on a built-in screen.

The outer body of the combination visual and sound apparatus is in he configuration of a small suitcase or attache case. The device includes a handle 32 which facilitates carrying of the device. As best seen in FIG. 2, when in use, the hood 34 for the screen assembly 36 is urged outwardly by springs provided in the walls thereof.

The remaining side wall 38 of the device 30 includes a cartridge receptacle 40 which is pivotably mounted in the wall. When pivoted outwardly as shown in FIG. 30 the receptacle 40 is adapted to receive a cartridge 42 which is shown in FIG. 24. Cartridge 42 is adapted to removably receive a film holder 44 and a tape magazine 46. The film holder 44 and tape magazine 46 are adapted to house an endless strip and an endless tape, respectively.

In order to insert cartridge 42, the receptacle 40 is pivoted out of side wall 38 of device 30 and cartridge 42 is inserted in the receptacle as best shown in FIG. 33. As will be seen hereinafter, the receptacle 40 includes means for exposing the tape in magazine 46 during insertion of cartridge 42 in receptacle 40. After the cartridge 42 has been completely inserted into receptacle 40, the receptacle and cartridge are pivoted into side wall 38. The combination visual and sound apparatus is now in position to be operated.

Figure 1:
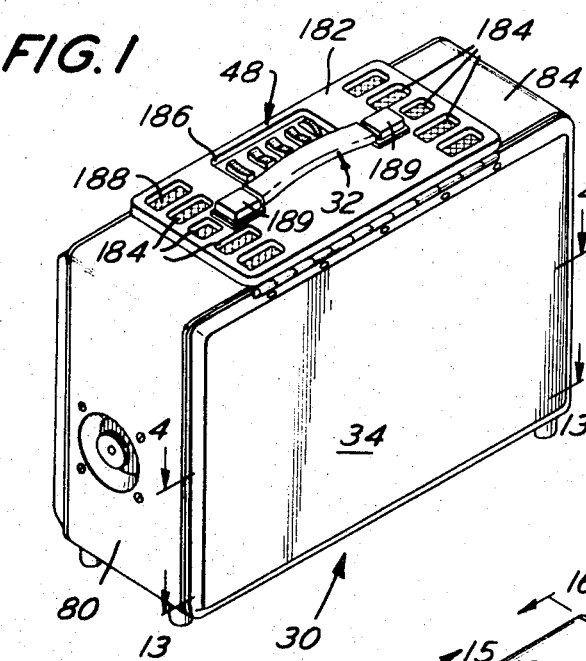
FIG. 1 is a perspective view of the combination visual and sound apparatus embodying the invention in a closed position.

As best seen in FIGS. 1 and 2, a bank of switches 48 is provided at the top of apparatus 30 for controlling the operation thereof. A rotary knob 50 is provided for adjustment of the volume of the audio system by rotation thereof. An "On-Off" switch 52 is provided which is used to start or stop the operation of the device 30. A switch 54 is also included in bank 48 which selects the manner of advancing the film strip. Either automatic or manual control of the advancement is selectable with switch 54. For normal operation, the switch is pressed to its automatic position. In automatic operation the film is advanced by the detection of advance pulses from the sound tape. Manual control is provided so that if no sound tape is provided, the film strip may be advanced manually.

A switch 56 is provided which has a first portion entitled "Hold" which when pressed prevents the advancement of the film strip so that the audio portion of the program can catch up to the visual presentation. The other position of switch 56 is the "Advance" position which enables the film strip to be advanced so that it may catch up with the sound portion of the presentation. Thus the Hold-Advance switch 56 enables synchronization between the visual and sound portion of the program. Further, the Advance portion of the switch may also be used to advance the film strip manually when the switch 54 is in the manual position.

The final switch 58 provided in bank 48 is the "Eject" switch which is mechanically linked to the pivotable receptacle 40 so that pressure applied to said switch ejects said receptacle. That is, the receptacle 40 is freed by the eject switch 58 to pivot out of wall 38 when the switch is pressed.

To commence operation of the device 30, the On portion of switch 52 is pressed. When the On portion of switch 52 is pressed, the following events occur.

1. Lamp 60, which is best shown in FIG. 16, is energized thereby projecting an image from the endless film in cartridge 42 on the back of translucent screen 61.

Figure 15:
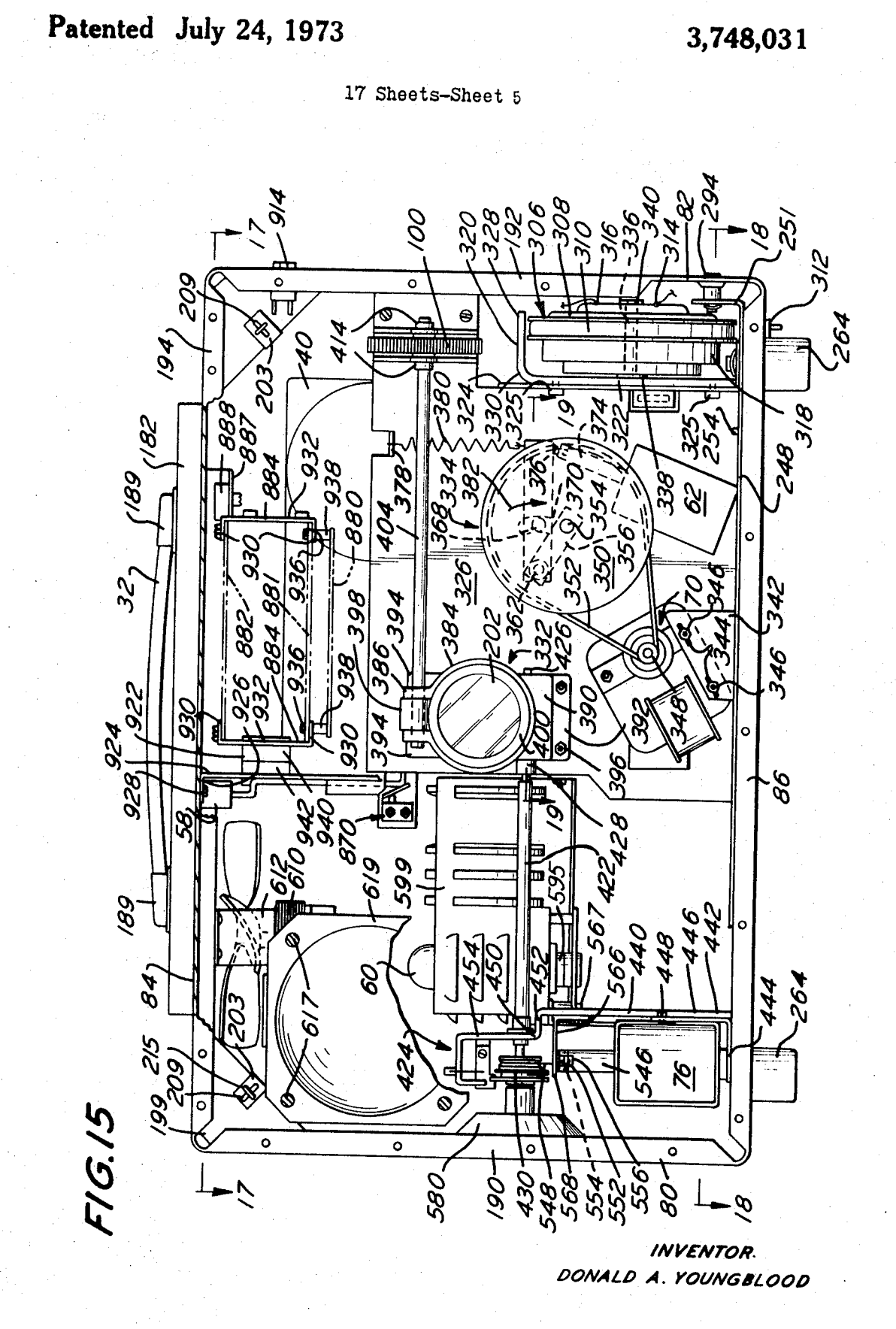

2. Solenoid 62, which is best seen in FIG. 15, is energized thereby drawing pressure roller 64 downwardly against sound tape 66 and presses it against capstan 68.

3. Motor 70, which is best seen in FIG. 15, is also energized and thereby rotates capstan 68. Thus, sound tape 66 which is engaged between the pressure roller 64 and the capstan is moved. As sound tape 66 moves past sound pickup head 72, the audio message is transmitted via appropriate amplifiers to speaker 74 which is best seen in FIG. 15.

4. Pickup head 72 also picks up control signals which are recorded on a second channel of the sound tape 66. These signals are transmitted to appropriate control circuitry which controls the energization of solenoid 76 which is best seen in FIG. 15. Solenoid 76 is mechanically linked to sprocket wheel 78 which is best seen in FIG. 18. Each time solenoid 76 is energized, sprocket wheel 78 advances the endless film one frame. Appropriate circuitry is provided between the pickup head 72 and the solenoid 76 so that signals provided on the sound tape 66 which indicate that the film should be advanced, activate the solenoid.

5. After the endless tape 66 has made a complete cycle, i.e. the entire sound content of the tape has been played, a control signal which indicates that the end of the program has been reached, is provided on the second channel of sound tape 66 which is sensed as an end of program signal by the control circuitry which acts to deactivate lamp 60, motor 70 and solenoid 62. The combination visual and sound apparatus 30 is thus turned off automatically and is ready to be operated again by pressing the On portion of switch 52 or to be unplugged and transported elsewhere.

6. Where it is desired to stop the operation of the device 30 before the end of a complete program, the Off portion of switch 52 may be pressed to turn off the apparatus 30.

7. The apparatus 30 may also be switched into a continuous operation mode so that the program will be repeated indefinitely. In this manner the apparatus 30 may be used as a window display.

Referring now to FIG. 1, it can be seen that the combination visual and sound apparatus 30 is generally rectangular and in the form of an attache case when closed. The outer walls of the apparatus when in a closed position comprise hood 34, rear side wall 38, end walls 80 and 82, top wall 84 and bottom wall 86. Hood 34 is generally rectangular and tray shaped and includes a peripheral wall 88 and a planar portion 90. Wall 88 extends from the rectangular planar portion 90 of the hood 34.

As best seen in FIG. 4, the peripheral wall 88 is comprised of elongated strips which are integral with the periphery of portion 90 and which extend at an angle therefrom towards the major portion of apparatus 30.

Figure 8:
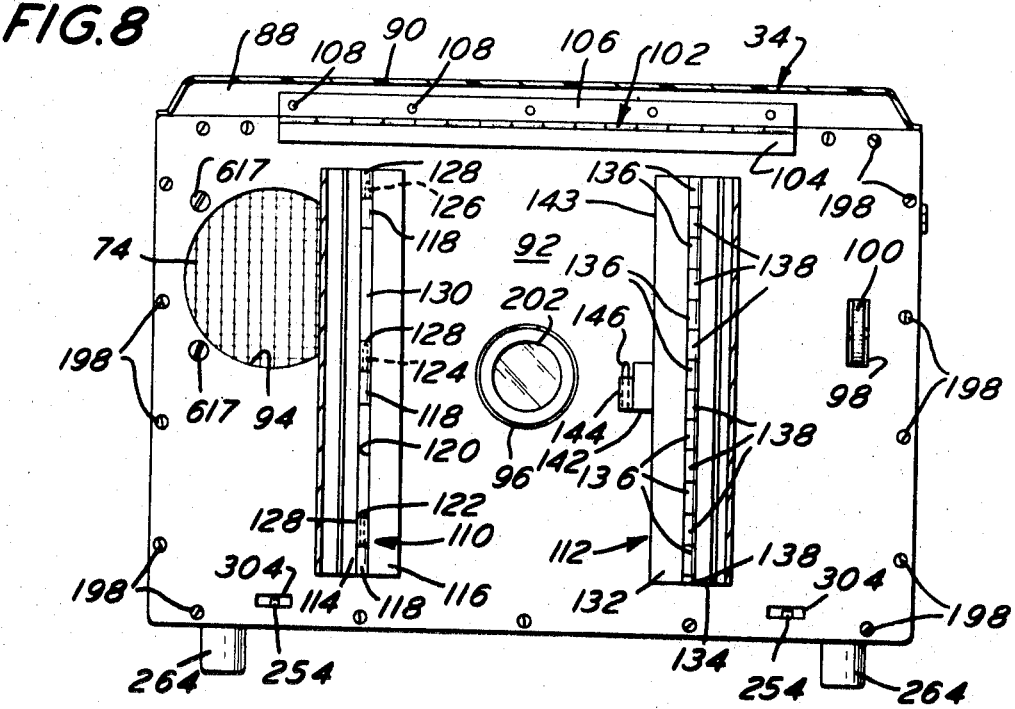
FIG. 8 is a sectional view taken along the line 8—8 in FIG. 5.

As best seen in FIGS. 2 and 8, an inner wall 92 is provided under hood 34. Inner wall 92 is planar and generally rectangular and includes openings 94, 96 and 98. Opening 94 is circular and provides an opening through which the projected image passes to screen 61. Opening 98 is a vertically extending rectangular opening which enables a portion of dial 100 to be exposed for adjusting the focus of the projected image.

Hood 34 is pivotably mounted to the inner wall 92 by a hinge 102 which is connected at the upper edges of the hood 34 and inner wall 92. Hinge 102 comprises a first hinge plate 104 and a second hinge plate 106. First hinge plate 104 is preferably secured along the upper edge of inner wall 92 by welding. The hinge plate 104 is horizontally disposed, longitudinally elongated and substantially planar. Hinge plate 106 is also horizontally disposed, longitudinally elongated and substantially planar. It is secured to the upper strip of peripheral wall 88 by suitable fasteners 108. Thus, the hood 34 is pivotable about hinge 102. In a closed position the hood 34 is vertically disposed. To open the screen assembly the hood 34 is pivoted upwardly until it is disposed horizontally.

As best seen in FIG. 8 screen assembly 36 is connected to inner wall 92 at hinges 110 and 112. Hinge 110 is vertically positioned and includes a pair of hinge plates 114 and 116. Hinge plate 116 is substantially planar elongated, vertically disposed and is preferably secured by welding to the outer surface of inner wall 92. Hinge plate 116 includes three journals 118 which are integral with vertical lateral edge 120 of the hinge plate 116. Journals 118 are each comprised of hollow cylindrical sleeves which extend vertically. Each of the sleeves is aligned vertically with respect to each other. The sleeves are vertically spaced from each other with bottom journal 118 adjacent the bottom edge of plate 116 and upper journal 118 spaced from and adjacent the top edge of hinge plate 116. The middle journal 118 is located centrally along the edge 120. Elongated pins 122, 124 and 126 are mounted in the lowermost, middle and uppermost journals 118 respectively. Pin 122 is larger than pins 124 and 126 for reasons which will hereinafter appear. Similarly, pin 124 is larger than pin 126. The lowermost portions of the pins 122, 124 and 126 are secured within the journals 128.

Hinge plate 114 includes three journals 128 which are of hollow cylindrical configuration and which extend vertically. Journals 128 are integral with vertical lateral edge 130 of the plate 114.

Journals 128 are vertically spaced from each other with the uppermost journal 128 adjacent the uppermost edge of the plate 114. The middle journal 128 is located centrally along edge 130 and the lowest journal 128 is secured adjacent but is spaced upwardly from the lowermost edge of hinge plate 114. The hinge plate 114 is removably secured to hinge plate 116 by telescoping journals 128 over pins 122, 124 and 126. The decreasing heights of pins 122, 124 and 126 enable the journals 128 to be aligned with and placed easily over the pins. That is, when the lowermost journal 128 is aligned with and started over pin 122, the uppermost journals 128 are enabled to be aligned over pins 124 and 126. If the pins 122, 124 and 126 were each the same length, the insertion of a portion of the lowest journal 128 over any portion of pin 122 would prevent the upper journals 128 from being pivoted over pins 124 and 126.

Hinge 112 comprises hinge plates 132 and 134. Hinge plates 132 and 134 are pivotably connected to each other and are each planar and extend in a vertical direction. Hinge plate 132 is preferably secured to wall 92 in a vertical position by welding. Hinge plate 132 includes a plurality of journals 136 which are integral therewith and are each vertically spaced along a lateral edge of the plate. Journals 136 are formed as hollow vertically extending cylindrical sleeves. Hinge plate 134 includes a plurality of journals 138 which are integral with and are spaced along a lateral edge of the hinge plate 134. Journals 136 are spaced from each other by a distance substantially equal to the length of journals 138. Similarly journals 138 are spaced from each other by a distance substantially equal to the length of journals 136. Hinge plates 132 and 134 are secured together by vertically aligning the journals 136 and 138 and inserting a longitudinally extending pin 140, which is best seen in FIG. 5, therethrough. A tab 142 which is rectangular and planar is secured to inner wall 92 by welding adjacent vertical lateral edge 143 of hinge plate 132 and is located centrally therealong. Tab 142 is integrally secured to a journal 144 which is comprised of a vertically extending hollow cylindrical sleeve. The lowermost portion of an elongated vertically extending pin 146 is secured in the journal 144. The purpose of journal 144 and pin 146 will hereinafter appear.

Figure 9:
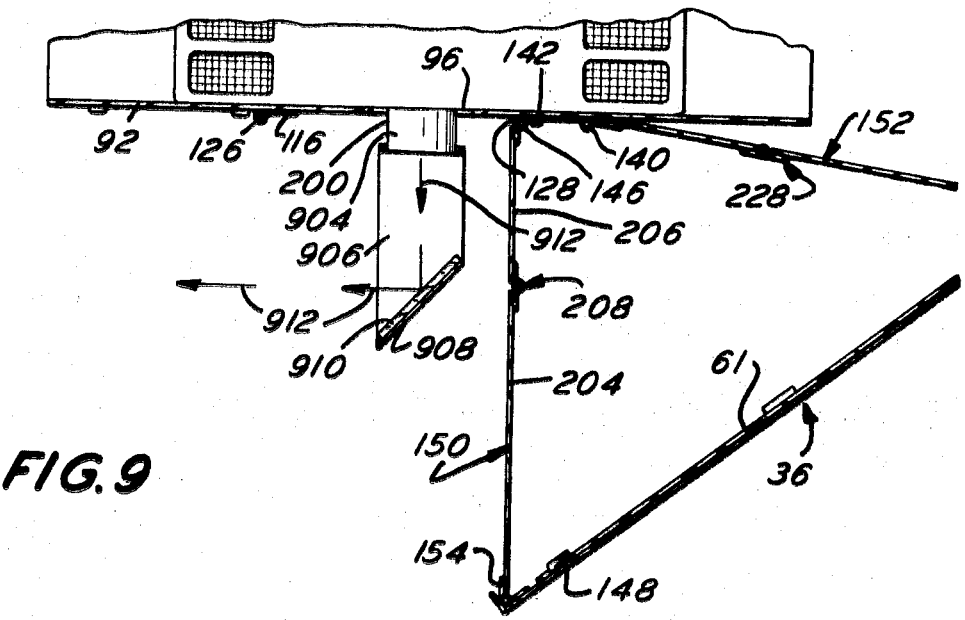
FIG. 9 is a sectional view similar to FIG. 5 with the combination visual and sound apparatus in a position for projection on a wall or screen.

Screen assembly 36, which is best seen in FIGS. 2, 5 and 9, comprises a front wall 148 which includes a screen 61 and collapsible side walls 150 and 152. Side wall 150 is preferably secred to front wall 148 by a hinge 154 which is similar in construction to hinge 112. Hinge 154 is elongated and disposed in a vertical position so that wall 152 is pivotable about a vertical axis with respect to front wall 148. The hinge 154 is connected to the side wall 150 and front wall 148 preferably by welding. Similarly, side wall 152 is pivotably connected by hinge 156 to front wall 148. Hinge 156 is also similar in construction to hinge 112. Hinge 156 is longitudinally extended and vertically disposed and is preferably secured along vertical edges of side wall 152 and front wall 148 by welding. Thus, wall 152 is also pivotable about a vertical axis with respect to front wall 148.

Front wall 148 is substantially planar and rectangularly shaped. It includes a centrally disposed rectangular opening 158 behind which screen 61 is mounted. Screen 61 is secured adjacent opening 158 by mounting brackets 160, 162 and 164. Mounting brackets 160, 162 and 164 are similar to each other and comprise a flat rectangular base portion 166 which is secured to the inner surface of wall 148 by welding and a flat lip portion 168 which is parallel to the base 166 and spaced therefrom approximately the thickness of screen 61. The lip 168 and base 166 are bridged by an integral perpendicular portion 170. Mounting brackets 160 and 164 are each mounted adjacent a vertical edge of opening 158 and disposed centrally therealong. Mounting bracket 162 is mounted adjacent the lower horizontal edge of opening 158 and is located centrally therealong. The lip portion thereof extends upwardly and prevents the screen from movement vertically.

The front wall 148 further includes a pair of integral perpendicular flanges 172 which extend vertically. Flanges 172 extend around hinges 154 and 156 and are adjacent thereto. Front wall 148 also includes a top flange 174 (best seen in FIG. 11) and a bottom flange 176 (best seen in FIG. 5). Flanges 174 and 176 are integral with wall 148 and extend perpendicularly from the rear surface thereof along the top and bottom edges respectively. As best seen in FIG. 10 there is provided along the upper edge of wall 148 a pair of upwardly extending locating posts 178. The function of locating posts 178 will hereinafter be seen. Locating posts 178 are located at opposite ends of the top edge of wall 148. Extending laterally from posts 178 and wall 148 are a pair of laterally extending ledges 180 which coact with locating posts 178 to position hood 34 over the screen assembly 36.

Walls 80, 82, 84 and 86 are comprised of an integral elongated planar sheet of metal which encompasses the internal organization of elements in apparatus 30. Top wall 84 has affixed on the outer surface thereof a cover plate 182. Cover plate 182 is planar and rectangular and includes a plurality of openings 184 at opposite ends thereof. Top wall 84 also includes similar openings which are vertically aligned with openings 184. A large rectangular opening 186 is also provided in cover plate 182 for access to the bank of switches 48. The cover plate 182 is located in the center of wall 84 lengthwise and is coextensive widthwise with said wall. A grill 188 is encapsulated between the cover plate 182 and wall 184. The openings in wall 84 and the aligned openings 184 in cover plate 182 provide ventilation for the cooling of lamp 60. Top wall 84 further includes rectangular openings which are located within opening 186 of cover plate 182. Switches 50, 52, 54, 56 and 58 are mounted within said openings and extend upwardly therefrom so that they are accessible to the operator of apparatus 30.

The cover plate 182 is positioned on the outer surface of top wall 84 by locating posts (not shown) which extend through openings provided in top wall 84. The cover plate is secured in place by mounting brackets 189 which includes projections that extend through top wall 84 and are secured at the lower surface of the wall. Mounting brackets 189 also serve to secure handle 32 at opposite ends thereof.

As best seen in FIGS. 15 and 16, walls 80, 82, 84 and 86 each have depending pairs of perpendicular flanges. Wall 80 includes a pair of perpendicular flanges 190 and 191. Wall 82 includes a pair of flanges 192 and 193. Wall 84 includes a pair of flanges 194 and 195. Wall 86 includes a pair of flanges 196 and 197. Flanges 190, 192, 194 and 196 each extend from edges of the walls 80 through 86 on the first side of apparatus 30 and flanges 191, 193, 195 and 197 from the opposite side.

Flanges 190 to 197 are integral with their respective walls and extend inwardly and perpendicularly therefrom. Flanges 190, 192, 194 and 196 each extend from the sides of walls 80, 82, 84 and 86 which are seen on the near side of FIG. 15. These flanges provide a base for the securement of inner wall 92. Inner wall 92 is secured to the flanges 190, 192, 194 and 196 by fasteners 198 which are preferably machine screws. Fasteners 198 pass through openings provided therefor in wall 92 and are threadedly secured in openings which are provided in flanges 190, 192, 194 and 196.

A pair of triangular plates 199 and 201 are connected to flanges 191, 193 and 195 on the other side of the apparatus 30. Plate 199 is secured at the corner between flanges 193 and 195 preferably by welding. Similarly, plate 201 is secured to flanges 191 and 195 at the corner between them. Plate 201 is preferably secured thereto by welding. Each of plates 199 and 201 include a metal clip 203. Clips 203 are generally rectangular and are bent around edges 205 of the plates 199 and 201. The clips are each located centrally along edges 205. Clips 203 include a circular opening 207 which is centrally located in the portion of clip 203 which is adjacent the outer surface of plates 199 and 201. The inner portion of clips 203 adjacent the inner surface of plates 199 and 201 include a slotted opening 209. Slotted openings 209 extend substantially perpendicularly from edges 205 towards the corners between walls 80, 82 and 84.

The clip 203 enables wall 38 to be removably secured to apparatus 30. That is, walls 38 are secured to the apparatus 30 by fasteners 211. Fasteners 211 include an enlarged head 213, a longitudinally extended shank which is integrally secured to head 213 and a transversely extending link 215 which is integral with the shank at the opposite end thereof. Link 215 and the shank of fastener 211 are inserted through openings 207 and 209 by aligning link 215 in the direction of slot 209. To secure the wall 38 to the apparatus the fasteners 211 are rotated substantially 90°. Thus link 215 extends transversely to slot 209 and the links bear against the surface of the inner portion of clip 203. Therefore links 215 and enlarged head 213 maintains wall 38 against flanges 191, 193, 195 and 197 until links 215 are aligned with slots 209.

The heads 213 of fasteners 211 include an enlarged slotted opening so that the fasteners may be turned with a coin or other flat device. To remove the plate 38 the fasteners 211 are rotated 90° so that links 215 are aligned with the slotted opening 209 and easily pass through. The wall 38 is then easily removed.

Collapsible wall 152 of the screen assembly 36 is pivotably connected to inner wall 92 by hinge 112. As best seen in FIGS. 5 and 9, collapsible wall 150 is connected to hinge plate 114 which is detachably connected to hinge plate 116 of hinge 110 when the visual presentation is to be shown by projection of the image on the back of screen 61. When the visual portion of a program is to be projected on an outer surface such as a wall or screen, the collapsible wall 150 is connected to tab 142 by telescoping the middle journal 128 over pin 146. Thus, as best seen in FIG. 9, the area adjacent opening 96 through which the visual portion of a program is projected is clear. An adapter 200 is inserted through opening 96 in place of the lens 202 for presentation of the program on an external screen. As will be seen hereinafter, the adapter enables the image to be projected parallel to wall 92. The apparatus 30 may thus be used as a projector.

Collapsible walls 150 and 152 are each comprised of two flat rectangular walls. Wall 150 is comprised of a rectangular forward wall 204 and a smaller rectangular rear wall 206. Forward wall 204 and rear wall 206 are connected together by a spring loaded hinge 208. As best seen in FIG. 6, the hinge plates of hinge 208 are welded to walls 204 and 206, respectively. Wall 204 includes a pair of rectangular fingers 210 and 212 which extend laterally from a vertical edge of wall 204 adjacent the top and bottom of said edge. As best seen in FIG. 7, these fingers are parallel to the wall 204 and are spaced therefrom substantially the thickness of wall 206 by an integral bridging portion 214. Hinge 208 includes a plurality of journals 216 which are discontinuous at the center of the hinge. That is, there is no journal provided on either of the hinge plates at the center of the hinge so that a spring 218 may be located therein. The spring 218 along with journals 216 are secured together by a pin 219 which passes through journals 216 and spring 218. Spring 218 has a pair of L-shaped ends 220 and 222 which bear against the outer surface of walls 204 and 206, respectively. Therefore the spring 218 urges the walls 204 and 206 at an angle of 180° away from each other.

Fingers 210 and 212 of wall 204 prevent the walls opening greater than at a 180° angle. That is, as best seen in FIG. 4, walls 204 and 206 may be folded together about hinge 208 so that they are substantially parallel to each other. The spring 218, as mentioned hereinabove, urges the walls 204 and 206 away from each other. However, when in the position shown in FIG. 4, hood 34 prevents the screen assembly from opening up. When in an open position, as shown in FIG. 5, the walls 204 and 206 are prevented from opening farther than 180° by fingers 210 and 212 which bear against the inner surface of wall 206 when the walls 204 and 206 are pivoted at an angle 180° from each other. Similarly, the collapsible wall 152 is comprised of a forward wall 224 and a rear wall 226 which are pivotably connected to each other by hinge 228 which is identical to hinge 208. Wall 224 also includes a pair of fingers similar to fingers 210 and 212 of wall 204 to prevent the opening of walls 224 and 226 beyond an angle of 180°.

As previously mentioned, when screen assembly 36 is collapsed by folding walls 204 and 224 against walls 206 and 226, respectively, hood 34 encapsulates the screen assembly 36. As best seen in FIG. 4, flanges 172, 174 and 176 of front wall 148 abut the outer surface of inner wall 92 so that the collapsible walls 150 and 152 cannot be urged against screen 61 and thereby injure or scratch the screen. When hood 34 is pivoted to a vertical position and covers forward wall 148 and screen assembly 36, a locking mechanism 230 maintains hood 34 in a closed position.

As best seen in FIGS. 10 and 11, hood 34 includes along its lowermost horizontal edge 232 and within its peripheral wall 88 a U-shaped support bracket 234. As best seen in FIGS. 11 and 12, bracket 234 includes a pair of flat rectangular legs 236 and an elongated web 238 which has a V-shaped cross-section. Legs 236 extend rearwardly from the edge 232 in a plane parallel to the plane of rectangular planar portion 90 of hood 34. Web 238 of the bracket extends along edge 232 substantially the length of hood 34 and is secured to the inner surface of wall 88 by fastening means such as machine screws 240. Machine screws 240 pass through openings provided therefor in wall 88 of the hood and are secured in threaded openings provided therefor in an elongated planar leg 242 of web 238. The lower leg 244 of web 238 is also elongated and planar and is disposed in the same plane as legs 236 and is integral therewith. A pair of planar fingers 246 depend from and are integral with the leg 244 of web 238. These fingers 246 are perpendicular to the plane of leg 244 and extend towards the inner compartment of the apparatus 30. Fingers 246 are adapted to be releasably locked in locking mechanism 230.

Locking mechanism 230 is best shown in FIGS. 13, 14 and 18. The mechanism comprises a U-shaped bar 248 having a pair of rectangular vertically extending planar legs 250 and 251 and a flat elongated and horizontally disposed bridging section 252. Section 252 is perpendicular to, integral with and bridges legs 250 and 251. Section 252 also includes a pair of upwardly extending cylindrical locking posts 254. The bridging section 252 is supported by an inner lower wall 256 which is spaced from and parallel to outer lower wall 86. A pair of posts 258 which are cylindrical extend from the inner surface of lower wall 86 and through circular openings in lower wall 256 and through rectangular slots 259 which are provided in the bridging section 252 of the U-shaped bar 248.

Posts 258 each have a circular threaded bore 260 which extends axially from the lower edge towards the center of said post. Each of said posts is secured in place by a threaded screw 262 which extends through an opening in lower wall 86 and is threadedly engaged in bore 260. Screws 262 also secure rubber support members 264 to the bottom of lower wall 86. Support members 264 are cylindrical and have an axially extending cylindrical bore 266 which extends from the lower edge thereof to a point intermediate of the top edge. A smaller axially extending bore extends through the remaining portion of the support member 264 to provide an opening for screw 262 to pass through. The bridging section 252 is maintained against the top surface of lower wall 256 by means of locking nuts 268 which are telescoped over posts 258. The locking nuts 268 are separated from the bridging section 252 by nylon washers 270 which are telescoped over the posts prior to the locking nuts 268.

Thus, the U-shaped bar 248 is movable longitudinally with respect to the post 258 as a result of longitudinally elongated openings 259. The U-shaped bar 248 is normally urged towards wall 82 by a spring assembly 272. Assembly 272 comprises an upstanding bracket 274 which extends vertically from lower wall 256. The bracket 274 includes a pair of lateral flanges 275 which are vertically disposed and which are adjacent to and bear against the inner surface of wall 80 for additional support when spring mechanism 272 urges the bar 248 towards wall 82. Bracket 274 also includes a horizontally extending flange 276 which is secured to the inner lower wall 256 by a suitable fastener 278. A cylindrical pin 280 is secured to bracket 274 and extends to and through a circular opening 282 in leg 250 of the bar 248.

Pin 280 includes an integral lower threaded member 284 which extends through an opening in bracket 274. The pin is secured to bracket 274 by threaded nuts 286 which are threadedly secured to pin 280 at threaded member 284. The nuts 286 thus sandwich the bracket and prevent movement of pin 280 with respect to the bracket. A spring 288 is telescoped over pin 280 and extends between nut 286 and leg 250 of U-shaped bar 248. Thus, spring 288 urges the bar 248 towards wall 82.

Wall 82 has an indented portion 290 which has a circular opening 292 through the center thereof. A cylindrical button 294 extends from opening 292 to the outer surface of leg 251 of the U-shaped bar. The button has an integral axially extending cylindrical portion 296 of decreased diameter which extends through an opening provided therefor in leg 251. Button 294 is secured to leg 251 by a locking washer 298 which is telescoped over member 296.

The fingers 246 which depend from hood 34 have rectangular notches 300 along their leftmost lateral edge. Adjacent notch 300 at the forwardmost edge of fingers 246 there is provided a bevelled portion or chamfer 302 which enables the fingers 246 to move U-shaped bar 248 toward wall 80 as the bevelled portion abuts post 254 when hood 34 is closed. Posts 254 thereby slide over bevelled surface 302 until the opening to notches 300 of fingers 246 are aligned with the posts whereupon the bar 248 slides towards wall 82 as spring 288 urges the posts into the notches. In order to disengage hood 34, button 294 should be pressed inwardly thereby moving bar 248 towards wall 80 and thereby removing posts 254 from notches 300. The posts are thus removed as an obstruction to the removal of fingers 246 and hood 34 is therefore enabled to be pivoted open.

Figure 3:
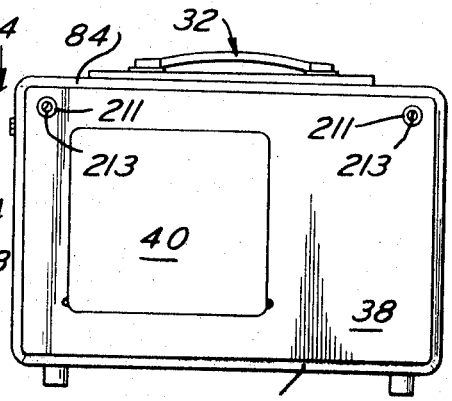
FIG. 3 is a side elevational view of the rear side of the visual and sound apparatus.

When hood 34 is opened, the spring loaded hinges 208 and 228 urge the forward walls 204 and 224 away from rear walls 206 and 226, respectively. The walls 150 and 152 thereby straighten out and project forward wall 148 away from the body of apparatus 30. The front wall 148 including screen 61 is thereby disposed parallel to and spaced from wall 92. As shown in FIG. 3, the hood 34 is then placed down over the screen 61 so that legs 236 of supporting bracket 232 are telescoped around locating posts 178 thereby centering the hood over the screen. Legs 236 also rest on ledges 180 to support the hood 34.

If it is desired that the film portion of a presentation be shown on a screen or external surface other than the screen 61, the collapsible side wall 150 is removed from its position as shown in FIG. 5 and is moved to the position shown in FIG. 9 by separating hinge 110 so that journals 128 are slid upwardly over the pins 122, 124 and 126. The wall 150 is then disposed in the plane shown in FIG. 9 and the middle journal 128 is telescoped over pin 146 and thereby aligned with journal 144. The adapter 200 may then be inserted in place of lens 202 for projection of a visual program on an external surface.

In order to close the apparatus so that it may be easily transported, the middle journal 128 is slid upwardly over pin 146 and the three journals replaced over pins 122, 124 and 126 of hinge 110. The screen assembly 36 may then be collapsed by exerting slight inward pressure to walls 150 and 152 so that forward walls 204 and 224 fold against walls 206 and 226, respectively. The front wall 148 which includes screen 61 is then pressed against inner wall 92 so that the assembly assumes the collapsed position shown in FIG. 4. Hood 34 is then pivoted downwardly so that fingers 246 pass through rectangular openings 304 which are provided in inner wall 92 and are then engaged by locking posts 254. The hood is thus disposed in a position for easy transportation of the apparatus 30.

Thus it can be seen that the screen assembly 36 has a plurality of advantages. The screen is collapsible and is thereby compactly stored by apparatus 30 when not in use. The collapsible walls 150 and 152 are opaque and do not allow light within the screen assembly through either of the side walls. The engagement with hood 34 further precludes light from entering within the screen assembly in that hood 34 is opaque and includes a peripheral wall 88 which overlaps the side walls 150 and 152.

It should also be noted that the lowermost edge of screen assembly 36 is disposed relatively close to the bottom wall 86 so that by placement of the apparatus 30 on a dark surface such as a desk, very little light can enter screen assembly 36 under the side walls 150 and 152 and front wall 148. The prevention of light within the screen assembly enables the apparatus 30 to be operated in a well-lighted room.

The manner in which hood 34 is supported by screen assembly 36 is also an advantage in that the screen may be centered by location of posts 178 within legs 236. The locating of the posts within the legs of bracket 234 ensures the screen is centered properly. When screen 61 is centered properly, it is parallel to wall 92 and is thereby perpendicular to the axis of lens 202. In this manner, the image projected on screen 61 is centered properly. Also, parallax error is overcome and the image is completely in focus throughout the entire screen. The hood 34 is also advantageous in that it is not necessary to interlock the hood with the screen assembly 36. Thus, the screen 36 may be disposed as shown in FIG. 9 and the apparatus 30 may therefore be used as a projector for projection of the visual presentation on an external surface. The hood 34 is supported by the screen assembly 36 while flexibility of the movement of the screen assembly 36 is not affected.

The spring loaded hinges 208 and 228 facilitate removal of the screen assembly 36 from its closed position in that the hinges project the screen outwardly automatically. Thus, reaching for the screen is avoided and injured fingers and fingernails are prevented. Finally, the hood 34 enables the screen assembly to be packaged both securely and neatly when the apparatus 30 is not in use.

Referring now to FIG. 15, the apparatus 30 is seen therein with inner wall 92 removed. As seen at the bottom right-hand side of the drawing, apparatus 30 includes an electrical cord assembly 306. Assembly 306 is comprised of a take-up reel 308 which stores and lets out a standard two wire electrical cord 310. Electrical cord 310 has connected to the end thereof a standard two pronged electrical plug 312 which is adapted to be inserted in a standard household electrical receptacle. Terminals 314 and 316 are provided on the outer surface of the assembly 306 for connection to the electrical circuitry in apparatus 30. The two wires of electrical cord 310 are connected to terminals 314 and 316 in a standard manner. Electrical power is thereby derived at terminals 314 and 316 for the supply of power to the electrical circuitry throughout the apparatus 30.

The reel 308 is connected to a cylindrical compartment 318 which includes a conventional take-up spring. The electrical cord 310 thereby tightens the spring as the electrical cord is drawn out. The cord may be retracted by giving the cord a slight jerk prior to its being taken up. Then the spring draws the cord back on the reel by rotation of the wheel. The electrical cord assembly 306 is supported by a U-shaped bracket 320 which comprises a rectangular planar portion 322 which is vertically disposed and is connected to a flange 324 of the main supporting plate 326 of the apparatus 30 by suitable fasteners 325. U-shaped bracket 320 also includes a rectangular planar top leg 328 which is connected to the planar portion 322 by an integral arcuate bridging section 330 and an integral rectangular bottom leg 331 which is secured to inner lower wall 256 by fasteners 333 (see FIG. 18). The close proximity of the leg 328 to the outer surface of take-up reel 308 prevents the coil of electrical cord 310 within reel 308 from unraveling when the cord is wound or unwound very quickly.

The main supporting plate 326 is substantially planar and is vertically disposed. Flange 324 of the supporting plate 326 is integral with and perpendicular to the main portion of the plate and extends towards wall 92. As best seen in FIG. 15, plate 326 supports, in addition to the U-shaped bracket 320, the solenoid 62, the lens assembly 332 and pulley assembly 334. Bracket 320 pivotably supports the electrical cord assembly 306 by means of a bolt 336 which extends from a boss 338 through assembly 306 and is threadedly secured at its other end to a nut 340 to rotatably secure the assembly to said bracket 320.

Supporting plate 326 includes an integral lower flange 341 which extends along the bottom edge thereof as best seen in FIG. 18 and which is secured to the inner lower plate 256 by fasteners 343. As also seen in FIG. 18, a planar flange 342 is provided which is integral with, upstruck from and perpendicular to inner lower wall 256 and forms a support for motor 70. As best seen in FIG. 15, flange 342 includes a pair of slotted openings 344 through which fasteners 346 extend and secure motor 70 to the flange. As seen in FIG. 15, motor 70 is inclined at an angle from the bottom wall 86. The purpose of such an inclination of the motor is to prevent the field windings of the motor from interfering with the audio system.

Motor 70 has a cylindrical shaft 348 which is connected to a pulley wheel 350 of pulley assembly 334 via endless belt 352. Pulley wheel 350 is cylindrical and larger in diameter than motor shaft 348. As best seen in FIG. 19, both shaft 348 and pulley wheel 350 have an annular groove on their outer surface to form a channel for pulley belt 352. The relative size of the motor shaft diameter to the diameter of pulley belt 352 enables the capstan 68 to drive the audio tape 66 at a speed of 3¾ inches per second. It is, of course, understood that the relative sizes of the diameters may be varied so that the tape speed can be changed to slower or faster speeds which are necessary to accommodate its special purpose. That is, where the audio presentation is merely a speech and does not require the large band width such as that needed for musical presentations, the speed of the tape may be as low as 1⅞ inches per second and still provide adequate sound. In this manner, the length of the sound presentation on the same tape may be twice as long as that possible with a speed of 3¾ inches per second. However, where the apparatus 30 is used predominantly with orchestral presentations which have a larger band width requirement, the speed of the tape may be increased. However, with increased speed, the length of the audio presentation would be limited.

It should also be understood that pulley wheel 350 and shaft 348 may have additional grooves having different diameters so that the ratio of the diameters thereof may be lessened or enlarged so that the operator of the machine would be able to select the speed at which the tape is driven.

Figures 20, 21, 22, 23:
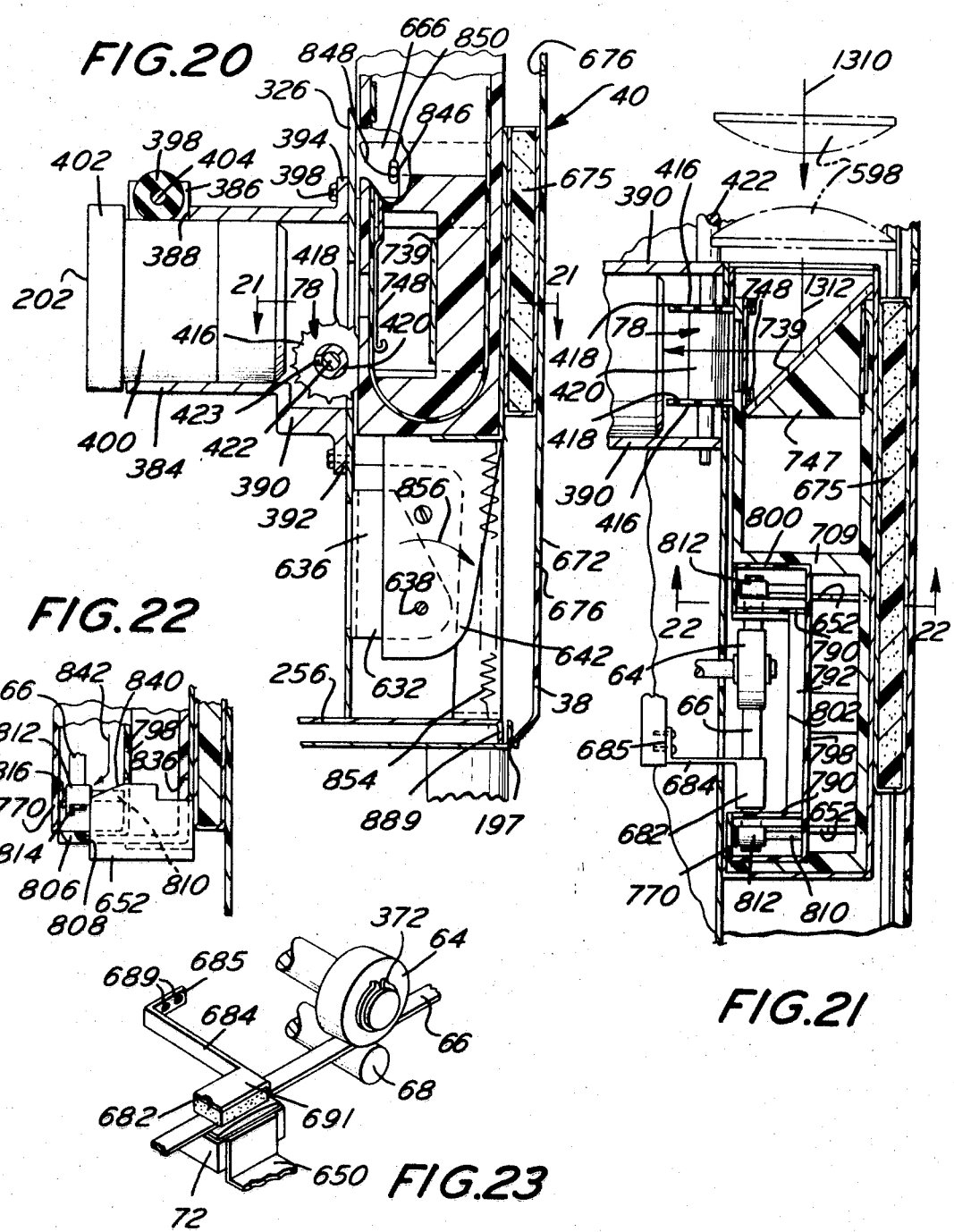
FIG. 20 is an enlarged sectional view taken along the line 20—20 in FIG. 16.
FIG. 21 is an enlarged sectional view taken along the line 21—21 in FIG. 20.
FIG. 22 is an enlarged sectional view taken along the line 22—22 in FIG. 21.
FIG. 23 is an enlarged perspective view of the tape feed read-out assembly.

Pulley wheel 350 is mounted on shaft 354 which is in turn connected to capstan 68 which is best shown in FIGS. 16 and 23. Shaft 354 is supported by main supporting plate 326, a rectangular block 356 and a cylindrical sleeve 357. The shaft 354 is rotatably mounted in a circular opening in block 356 which opening extends through the plate 326. Sleeve 357 is secured to block 356 and extends perpendicularly from a lateral surface thereof to the inner lateral surface of wheel 350. The sleeve 357 also includes an axially extending bore which forms a continuation of the circular opening in block 356. The shaft 354 is thus rotatably mounted and extends through sleeve 357, block 356 and main supporting plate 326.

Rectangular block 356 is secured at its lower portion to supporting plate 326 by a fastener 358, best seen in FIG. 16, which extends through supporting plate 326 and is threadedly secured in an opening in rectangular block 356. As best seen in FIG. 19, the top portion of the block 356 is secured to plate 326 by a nut 360 which is threadedly secured to a locating post 362. Locating post 362 includes a threaded portion 364 which extends through plate 326 and is threadedly secured in block 356.

The locating post has a tapered forward portion which as will be seen in greater detail hereinafter enables the cartridge 42 to be positioned accurately when the apparatus 30 is in operation. Block 356 is bifurcated at end 361 so that a rectangular link 366 may be pivotably secured in the slot formed by virtue of the bifurcation within rectangular block 356. Link 366 is secured within the slot by the threaded shaft of a fastener 365. The shaft of fastener 365 is threadedly secured in a transversely extended opening provided in the block 356. The shaft also extends through an opening provided in link 366. The link is thus pivotally mounted about the shaft of fastener 365. The fastener 365 also includes an enlarged head which may be manually rotated for engagement and disengagement of the fastener with block 356. The link 366 is also secured to a shaft 368 preferably by a pressed fit. Shaft 368 is perpendicular to link 366 and extends through a slotted opening 370 in plate 326. Shaft 368 is cylindrical and extends through opening 370 to pressure roller 64 which is mounted on said shaft. Roller 64 is preferably made of rubber and is cylindrical and has an axially extending circular opening therein. The roller is maintained on shaft 368 by split springs 372 and 373 which engage shaft 368 in annular grooves provided in the cylindrical outer surface thereof. Spring 372 is mounted adjacent the outer surface of roller 64 and split spring 373 is mounted adjacent the inner surface of the roller 64 so that the roller is maintained on shaft 368 and is spaced from plate 326.

Link 366 is connected at its opposite end to a retractable shaft 374 of solenoid 62 by a spring 376. Link 366 is also connected to a horizontally disposed flange 378 which is integral with plate 326 and perpendicular thereto by a spring 380. Spring 380 includes an end loop 381 which is connected to flange 378 and is engaged in an opening 383 therein. The lower end of spring 380 includes a similar loop 385. As best seen in FIG. 17, link 366 includes an upstanding tab 387 which has an opening therein for reception and engagement of loop 385. Spring 376 also includes a pair of end loops similar to loops 381 and 385 of spring 380. Similarly, link 366 also includes a tab which is similar to the tab 387 but which extends vertically from the lower surface of the link. Shaft 374 includes an opening which extends diametrically through the shaft adjacent its end. The loops of spring 376 thus are engaged in the openings provided in shaft 374 and the tab of link 366 to operatively connect the link to the shaft.

The tension afforded by spring 380 is taut enough so that it draws link 366 to its uppermost position and also draws shaft 374 out of solenoid 62 when the solenoid is not energized. The tension of spring 380, however, may be overcome by the force with which shaft 374 is pulled downwardly by solenoid 62 when energized. Thus, when shaft 374 is drawn downwardly by solenoid 62 link 366 is drawn to its lowermost position. Spring 376 acts as a shock absorber for pressure roller 64. That is, as shaft 374 draws link 366 downwardly and thereby draws roller 64 against capstan 68, spring 376 stretches enough to take up the shock of the abrupt downward motion of shaft 374. Spring 376 is also less elastic than spring 380 so that as shaft 374 is drawn downwardly spring 380 is stretched rather than spring 376.

When solenoid 62 is energized, during the operation of apparatus 30, the link 366 is drawn in the direction of arrow 382 by shaft 374 which thereby causes roller 64 to be urged against capstan 68. When solenoid 62 is deenergized, the shaft 374 is pulled out of the solenoid 76 as the spring 378 draws link 366 upwardly in a direction opposite that of arrow 378. The roller 64 is thus released from capstan 68.

The lens assembly 332 includes a cylindrical sleeve 384 which is best seen in FIGS. 15 and 20. The cylindrical sleeve 384 acts as a receptacle for the lens 202. A pair of flanges 386 are formed integrally with the sleeve 384 and are substantially planar and rectangular and extend radially and upwardly from the outer surface of the sleeve. The flanges 386 are separated by a discontinuous portion or opening 388 in the sleeve. Also formed integrally with the sleeve 384 is a cup-shaped base 390. Base 390 provides the sleeve 384 with an enlarged opening to house sprocket wheel 78 which is mounted therein. The base 390 and the upper portion of the sleeve 384 have integral flanges 392 and 394 which extend perpendicularly from the outer surface thereof and both lie in a similar plane. Flange 392 extends vertically from base 390 and flange 394 extends vertically from the uppermost portion of the sleeve 384.

The lens assembly 332 is secured to plate 326 by fasteners 396 which extend through flange 392 and fasteners 398 which extend through flange 394. A roller 398 preferably of an elastomeric material such as rubber is rotatably mounted within flanges 386. As best seen in FIG. 20, roller 398 directly contacts the outer surface of housing 400 of lens 202. Housing 400 is generally cylindrical and includes an enlarged cylindrical portion 402 which houses the forwardmost lens of the series of lenses 202. The enlarged portion 402 also prevents the lens housing 400 from being inserted too deeply into sleeve 384 by acting as a shoulder which contacts the forwardmost edge of the sleeve 384.

Roller 398 is rotatably mounted about an elongated shaft 404 which extends through circular openings in flanges 386. The shaft 404 is cylindrical and extends horizontally to cylindrical plastic dial 100 which is pivotably mounted about the opposite end of the shaft 404. Shaft 404 is maintained against longitudinal movement by the roller 398 which is restrained against longitudinal movement by flanges 386 and is secured to the shaft by adhesive bonding. The opposite end of shaft 404 is supported by a U-shaped bracket 406 which is best seen in FIG. 17.

Bracket 406 includes a pair of parallel vertically disposed triangular planar legs 408 which are perpendicular to and are bridged by a rectangular vertically disposed planar web 410. Bracket 406 is connected to supporting plate 326 by fasteners 412 which extends through web 410 and is threadedly secured to plate 326. The dial 100 is mounted about shaft 404 between the legs 408 of bracket 406. The shaft 404 extends through and is rotatably mounted in circular openings which are provided in legs 408 adjacent the apex thereof. Cylindrical nylon washers 414 are telescoped over the shaft 404 and maintain dial 100 centered between the legs 408 and provide a low friction surface between the shaft 404 and the legs 408. A portion of dial 100 extends through opening 98 in inner wall 92 as best seen in FIG. 2. The outer periphery of dial 100 is knurled to facilitate manual rotation. Manual rotation of dial 100 causes the shaft 404 and roller 398 to be rotated. Since roller 398 frictionally engages lens 202, rotation results in the longitudinal movement of lens 202 within sleeve 384. Thus, by appropriate rotation of the dial 100 the focusing of the image on screen 61 may be adjusted.

Sprocket wheel 78 is best seen in FIGS. 20 and 21 and is comprised of a pair of circular discs 416 which are vertically disposed and have sprocket teeth 418 equally spaced about the periphery thereof. Discs 416 are separated by an integral cylindrical body portion 420 having an axially extending cylindrical bore. As best seen in FIG. 15, sprocket wheel 78 is telescoped over shaft 422 so that the shaft extends through the bore in body portion 420. Sprocket wheel 78 is secured to the shaft by a threaded fastener 423 which is threadedly secured in body portion 420 and bears against the outer surface of shaft 422.

As best seen in FIG. 19 shaft 422 extends through openings in the side walls 425 of base 390 and extends to a film advancing assembly 424. Shaft 422 is rotatably mounted within base 390. The shaft is restrained against longitudinal movement by means of a collar 426 which is tightened about the end of the shaft 422 by means of a threaded fastener 427 which is threadedly secured in collar 426, extends therethrough and bears against the outer surface of shaft 422. A similar collar 428 is mounted about shaft 422 adjacent the opposite side wall 425 of base 390 and is tightened about the shaft by a threaded fastener 429 which is threadedly secured in collar 428. Fastener 429 extends through collar 428 and bears against the outer surface of shaft 422 to restrict movement of the collar with respect to the shaft. As best seen in FIG. 30 sprocket wheel 78 is located adjacent a rectangular opening 431 in main supporting plate 326. A portion of each of circular discs 416 extend through opening 431 to the opposite side of the supporting plate 326. Thus, as receptacle 40 is moved into the apparatus 30, the cartridge 42 is engaged by the circular discs 416 of sprocket wheel 78. The sprocket wheel extends into the cartridge 42 in slots provided therefor which are adjacent to the film and film holder 44, as will be seen hereinafter. Thus, the rotation of shaft 422 results in the advancement of the film in cartridge 42 by sprocket wheel 78. Opening 431 also provides a window for the image to be projected through to lens 202, as will also hereinafter be seen.

As best seen in FIGS. 15, 27 and 28, the film advancing assembly 424 comprises in addition to solenoid 76, a drive wheel 430, a cam disc 432, a single frame advance disc 434, a drive cone 436 and an adjusting knob 438. The film advancing assembly 424 is supported by a mounting bracket 440 which includes an L-shaped base portion 442. L-shaped base portion 442 comprises a rectangular planar portion 444 which is disposed horizontally and is secured to the inner lower wall 256 (see FIG. 18) by suitable fasteners 445 and a vertically extending rectangular planar leg 446 which is integral with portion 444 and is disposed vertically. The solenoid 76 is secured to the mounting bracket 440 at leg 446 by fasteners 448.

The mounting bracket 440 further includes an L-shaped central portion 450 which is integral with the vertical leg 446 of the base portion 442. Portion 450 is comprised of a planar rectangular horizontally disposed leg 452 and a rectangular vertically disposed planar leg 454. The vertical leg 454 includes an opening through which shaft 422 extends and is supported thereby. As best seen in FIG. 28, shaft 422 has a washer 456 which is telescoped thereover. Washer 456 includes a cylindrical portion 457 which also extends through the opening in leg 454 of the bracket. The washer 456 is precluded against longitudinal movement within the opening in leg 454 and along shaft 422 by a collar 458 which is similar to collars 426 and 428 and which is maintained tightly about shaft 422 by a threaded fastener 460. Washer 456 provides a low friction surface between shaft 422 and leg 454 so that shaft 422 may rotate easily therein.

Mounting bracket 440 further includes an L-shaped top portion 462 which includes a horizontally disposed planar rectangular leg 464 and a rectangular planar vertically disposed leg 466. A planar tab 468 which is rectangularly shaped is upstruck from horizontal leg 464 and is disposed vertically. Vertical leg 466 is bifurcated by virtue of a slot 470 which extends to the end 472 of the leg 466. Leg 454 of central portion 450 of the mounting bracket 440 includes an outstruck tab 474 which is rectangular, planar and vertically disposed. A finger 476 is pivotably connected to tab 474 by a fastener 478. The function of finger 476 will be seen hereinafter.

As previously mentioned, shaft 422 is connected to the film advancing assembly 424. Drive wheel 430 is loosely mounted about shaft 422 so that it rotates easily with respect to the shaft. It is restrained against longitudinal movement with respect to shaft 422 by a split spring collar 480 similar to collar 372 (best seen in FIG. 23) which is secured to the shaft within an annular groove 482 which is provided on the outer surface of shaft 422.

Drive wheel 430 is generally cylindrical and includes an annular groove 484 which extends about the periphery thereof. Groove 484 is flared towards the outer surface at 486 thereby providing an enlarged opening to the groove. The drive wheel 430 further includes an integral portion 488 which is smaller in diameter than the major portion of the wheel and which is also cylindrical. The remaining portion of drive wheel 430 is a substantially cylindrical portion 490 which is integral with and adjacent portion 488 which includes a flat edge 492 by virtue of a chordally shaped portion having been removed.

Cam 432 is best seen in FIG. 29 and has an opening similar to the outer periphery of portion 490 of the drive wheel 430 and is secured hereon by press fitting portion 490 in said opening. As best seen in FIG. 29, the cam disc 432 is mounted about drive wheel 430 so that it rotates eccentrically with respect to shaft 422. That is, cam surface 494 of disc 432 varies along its periphery in distance from the center of shaft 422.

A pawl 496 is connected to the cam disc 432 adjacent the portion 498 of disc 432 which is the portion of the disc with the greatest diameter. Pawl 496 is pivotably mounted to disc 432 about fastener 500 which is preferably a rivet. Pawl 496 has a finger 502 the purpose of which will appear hereinafter. The single frame advance disc 434 is pivotably mounted about shaft 422 adjacent the disc 432 of pawl 496. Pawl 496 is connected to the cam disc 432 by a spring 501. Cam disc 432 includes an opening 503 adjacent its outer surface which is adapted to receive and engage a first end of spring 501. Pawl 496 includes an opening 505 in which the opposite end of spring 501 is engaged. The normal tendency of spring 501 is to draw pawl 496 towards shaft 422. That is, pawl 496 is urged against the outer surface of a portion of single frame advance disc 434, as will be seen hereinafter.

As best seen in FIG. 27, single frame advance disc 434 comprises a first portion 504 which is substantially cylindrical, a central portion 506 which is somewhat wafer-shaped and includes four flat surfaces 508 which are each equally spaced from each other and lie in a separate quadrant of the central portion 506. Flat portions 508 are separated by arcuate surfaces 510. Between each flat surface 508 and arcuate surface 510 is a detent or notch 512 which is somewhat larger than the thickness of finger 476. Each of the detents 512 is connected to an arcuate surface 510 via a flat radially extending shoulder 513. The shoulders 513 act to limit the rotation of the single frame advance disc 434 by abutting finger 476 after the disc has been rotated 90° to advance the film. Finger 476, after it stops disc 434 by abutting shoulder 513, is urged into the detent 512 by a U-shaped spring 514 which is connected between the finger 476 and the tab 468.

The remaining portion 515 of single frame advance disc 434 is best seen in FIG. 27. Portion 515 is generally cylindrical and includes four ratchet teeth 517 which are equally spaced about the periphery of the portion 515. Teeth 517 have radially extending shoulders 519 which each face in the same direction about the shaft 422. Pawl 496 is urged against the periphery of portion 515. The remaining surfaces of the teeth 517 provide a gradual increase in the diameter of the portion 515 so that pawl 496 may be gradually urged away from the shaft 422 if the pawl is moved in a first direction. However, if moved in the opposite direction, finger 502 of pawl 496 engages the shoulder 519 of the teeth and draws the single frame advance disc 434 with drive wheel 430.

Spring 514 is generally U-shaped and includes an L-shaped end 516 which extends through an opening which is provided in tab 468. The L-shaped end 516 maintains the spring 514 in the opening in tab 468. Spring 514 also includes an L-shaped end 518 which extends through an opening provided in finger 476. The shape of end 518 maintains spring 514 in the opening in finger 476.

Finger 476 is located within slot 470 so that it may pivot vertically about the horizontal axis through fastener 500. The normal tendency of spring 514 is to have its legs diverge. Thus, the finger 476 is urged away from tab 468 against the outer periphery of the central portion 506 of single frame advance disc 434. When finger 476 is engaged in any of the notches 512, the single frame advance disc 434 is restrained against any rotation. As will be seen hereinafter, the finger 476 enables the single frame advance disc 434 to be rotated a discrete amount each time it is moved. That is, the finger 476 engages the next notch 512 after each rotation of the disc for advancement of the film. Engagement of the finger 476 into the next notch, thereby, enables the single frame advance disc to be rotated only a quarter revolution each time it is used to advance the frame of the film in cartridge 42. The finger 476 also prevents rotation of single frame advance disc 434 when a framing adjustment is made and the film is moved less than a complete frame length. Thus, finger 476 may be used as a releasable locking means for the single frame advance disc 434.

As best seen in FIG. 24, the cam surface 494 of the cam disc 432 is adapted to lift finger 476 vertically as the drive wheel 430 is rotated. As previously mentioned, the cam disc 432 is fixedly mounted to drive wheel 430 and therefore rotates therewith. In this manner, rotation of the drive wheel frees finger 476 from notch 512, thus enabling the single frame advance disc 434 to move with respect to finger 476.

The single frame advance disc 434 is separated from the drive wheel 430 by a shim 520 to prevent friction between cam disc 432 and drive wheel 430. The shim 520 is substantially cylindrical and is mounted about the shaft 422 within a cylindrical recess in the disc 434. As best seen in FIG. 15, the shim is thicker than the depth of the recess so that the parts are separated.

The separation of drive wheel 430 from single frame advance disc 434 is further enhanced by shaft 422 which includes a portion 521 of smaller diameter which extends to adjusting knob 438. A shoulder 523 is formed at the interface between portion 521 of shaft 422 and the main portion thereof. The shoulder 523, as well as a lateral face of drive wheel 430, abut shim 520 which thereby maintains a space between the drive wheel and single frame advance disc 434. The drive cone 436 is secured to the single frame advance disc 434 by fasteners 522 which extend through disc 434 and are threadedly engaged in cone 436. Thus, drive cone 436 is secured to the disc 434 for rotation about the axis of shaft 422. The drive cone 436 has a frusto-conical mating portion 524 which is tapered at its end. The mating portion 524 of the drive cone 436 is preferably comprised of an elastomeric material such as rubber and is adapted to engage the adjusting knob 438.

Adjusting knob 438 is generally cylindrical and includes a female frusto-conically shaped mating section 526 which presents a flared opening to receive the mating section 524 of the drive cone 436. As the mating section of the drive cone and adjusting knob 438 make contact, they are frictionally engaged to prevent relative rotation between the two.

Adjusting knob 438 is mounted on the shaft 422 so that it is longitudinally slidable with respect thereto. As best seen in FIG. 28, the adjusting knob 438 has an enlarged cylindrical end member 528 which has a knurled outer surface 530 which adapts the adjusting knob 438 to be rotated manually. The adjusting knob 438 also includes a cylindrical bore 532 which extends through the enlarged member 528 and in which an end button 534 is secured to the end of shaft 422.

The button 534 also includes a cylindrical bore which is substantially similar in diameter to shaft 422 and in which the shaft 422 is secured by a pin 536. Pin 536 extends through a transverse opening in shaft 422 and radially extending openings in the button 534. Button 534 is movable within bore 532 of adjusting knob 438. That is, the adjusting knob 438 may be moved longitudinally with respect to shaft 422. Button 534 is fixedly secured to shaft 422. Thus, as adjusting knob 438 is moved with respect to the shaft 422, the button 534 is moved within bore 532. However, the adjusting knob 438 is secured rotationally to shaft 422 by a keying pin 538 which is mounted in a longitudinally extending notch in shaft 422 and a similar complementary longitudinally extending notch in the adjusting knob 438. The adjusting knob 438 is urged against the drive cone 436 by a spring 540 which is axially mounted about shaft 422 within bore 532 of the adjusting knob. Thus, the normal tendency of the spring 540 is to urge button 534 out of bore 532. To disengage the adjusting knob 438 from drive cone 436 it is therefore necessary to draw the adjusting knob towards button 534. The button 534 is then inserted deeper in bore 532.

By gripping the adjusting knob 438 at the shoulders 542 and sliding the adjusting knob in the direction of arrow 544, the adjusting knob 438 is disengaged from the drive cone 436 and the single frame advance assembly. The rotation of the adjusting knob while manually urged away from drive cone 436, enables shaft 422 to rotate without the drive wheel 430, cam 432, single frame advance disc 434 or drive cone 436 being similarly rotated.

That is, when adjusting knob 438 is slid in the direction of arrow 544, the mating section 524 of drive cone 436 is drawn out of the mating section 526 of adjusting knob 438. The adjusting knob 438, though disengaged from drive cone 436, is still keyed to shaft 422 by keying pin 538. Thus, rotation of the adjusting knob 438 rotates shaft 422. The drive cone 436 is stationarily maintained against rotation in that it is secured to single frame advance disc 434 which is fixed against rotation by the engagement of finger 476 in a notch 512. Drive cone 430 and cam disc 432 are also not moved for reasons which will hereinafter appear. Thus, the adjusting knob 438 enables rotation of the shaft and subsequent rotation of the sprocket wheel 78 for adjustment of the film for framing purposes.

Referring now to FIG. 15, it can be seen that a cylindrical shaft 546 of solenoid 76 is connected to drive wheel 430 via a wire 548. As best seen in FIGS. 27 and 28, wire 548 is wrapped as a coil in groove 484 of the drive wheel 430. It is secured against sliding in groove 484 by a fastener 550 which extends axially through a portion of drive wheel 430 and into groove 484 to secure the inner loops of the coil in the groove. The first end of wire 548 is terminated in a loop 552 which is secured to shaft 546 by a suitable fastener 554. As best seen in FIG. 15, the end of shaft 546 is bifurcated by virtue of a slot 556. The loop 552 is secured to the shaft 546 within slot 556 by fastener 554 which extends through the loop and openings provided therefor in the walls of the shaft.

The other end of wire 548 is terminated in a loop 558. Wire 548 is connected by loop 558 to a spring 560 which is best seen in FIGS. 16 and 27. The end of spring 560 extends through loop 558 to secure the spring to the loop. Spring 560 is connected at its other end to a fastener 562 which is connected to a bracket 564. Bracket 564 is connected to the inner lower wall 256 of the apparatus 30 by a fastener 565.

As best seen in FIG. 15, an L-shaped bracket 566 is connected to the mounting bracket 440 by a fastener 567. The top leg 568 of bracket 566 which is best seen in FIG. 28, is planar, horizontally disposed and is also bifurcated at its end by virtue of a slot 570. Slot 570 provides a guide for the wire 548 to prevent transverse movement thereof. As best seen in FIG. 27, a pad 571 is provided between the top leg 568 of bracket 566 and the end of shaft 546. Pad 571 acts as a cushion between the top leg 568 and shaft 546 to lessen the impact and noise when shaft 546 is released from solenoid 76. The top leg 568 of the bracket acts as a stop to prevent the shaft from being completely disengaged from the body of the solenoid 76.

In operation, each time solenoid 76 is energized the shaft 546 is pulled down in the direction of arrow 572. As shaft 546 is so pulled, the wire 548 rotates the drive wheel 430 in the direction of arrow 574 in FIG. 27. The cam disc 432 is likewise drawn in the direction of arrow 574. The shaft 422 is not rotated as a result of finger 476 being engaged in one of the notches 512. Thus, disc 434 cannot rotate. Disc 434 is fixedly secured to drive cone 436 which is therefore also prevented against rotation. Since the drive cone 436 is frictionally engaged with the adjusting knob 438, adjusting knob 438 does not rotate. Therefore, the shaft 422 cannot rotate because it is not rotatably slidable within the adjusting knob 438 as a result of keying pin 538. Thus, only the drive wheel 430, cam disc 432 and pawl 496 are rotated as the wire 548 is drawn by shaft 546. Therefore shaft 422 is not rotated when the shaft 546 is drawn downwardly by solenoid 76.

As the drive wheel 430 and cam disc 432 rotate in the direction of arrow 574, the cam surface 494 of disc 432 urges the finger 476 upwardly in the direction of arrow 576. When the shaft is completely drawn into the body of solenoid 76, a portion of surface 494 has lifted finger 476 sufficiently so that is is drawn above arcuate surface 510 of the periphery of the central portion 506 of single frame advance disc 434. Concurrently, as the drive wheel 430 and cam 432 are drawn down by wire 548, pawl 496 is drawn over the next tooth 517 of the single frame advance disc 434 and finger 502 thereof engages the tooth. After the energization of solenoid 76 is terminated, the tension applied to wire 548 of spring 560 overcomes the pull exerted by shaft 546 and thereby draws the drive wheel 430 in the direction of arrow 578 in FIG. 27. As drive wheel 430 is drawn in the direction of arrow 578, the finger 502 of pawl 496 which is engaged with the next tooth 517 of the single frame advance disc 434 also draws the disc 434 in the direction of arrow 578. The rotation of disc 434 causes the drive cone 436 and adjusting knob 438 to rotate.

Thus, shaft 422 since it is keyed to adjusting knob 438 is rotated and the film in the cartridge is advanced. As disc 434 rotates in the direction of arrow 578, the finger 476 is urged downwardly by spring 514. The finger 476 is thus lowered since cam disc 432 also rotates in the direction of arrow 578 thereby reducing the diameter of the portion of cam surface 494 adjacent finger 476. The finger is thus moved lower than the arcuate surface 510 of the next quadrant of portion 506 of the single frame advance disc 434. Thus, when the radially extending shoulder 513 of the next quadrant of the disc 434 reaches finger 476, it is stopped as the lateral surface of the finger 476 abuts the shoulder. The finger 476 drops into the notch 512 adjacent the abutting shoulder 513 and the single frame advance disc 434 is locked against further movement. In this manner, the single frame advance disc is moved only a discreete angular distance each time. That is, it rotates 90° each time the advance solenoid 76 is energized. It can, therefore, be seen, that the shaft 422 may be rotated and the film moved thereby in either of the following ways:

1. When the adjusting knob 438 is pulled outwardly in the direction of arrow 544 and the knob rotated, shaft 422 is rotated for film adjustment or framing purposes; or 2. When the solenoid 76 is energized, shaft 422 is rotated for advancing the film one frame. It should be noted that the rotation of the single frame advance disc, in the direction of arrow 578, 90° results in the movement of the film a single frame. Thus, framing is maintained throughout by means of the single frame advance disc. Where adjustment is required, it is necessary only to disengage the adjusting knob 438 from the drive cone 436 and rotate shaft 422 until the proper framing adjustment is made.

As best seen in FIG. 28, the adjusting knob 438 is supported by a frusto-conically shaped mounting bracket 580 which is preferably secured to wall 80 of the apparatus 30 by welding. Wall 80 includes a circular opening 582 which communicates with the inner contents of the mounting bracket 580. The mounting bracket 580 includes a circular opening 584 in the circular planar wall 586 thereof. A nylon circular disc 587 is mounted within opening 584 by means of integral perpendicularly extending pegs 588 each of which include a hook type head that grasps wall 586 at the periphery of opening 584. The nylon disc 587 includes a circular opening at its center through which the adjusting knob 438 extends. A smooth surface is provided by the nylon disc at its opening for rotation of the adjusting knob 438 within the bracket 580.

It can be seen that the enlarged portion 530 of adjusting knob 438 is disposed substantially in the plane of wall 80 of the apparatus 30 and is therefore easily accessible for manual adjustment.

As best seen in FIGS. 15 and 16, mounting bracket 440 also includes an integral rectangular horizontally disposed flange 590 which supports lamp 60. The flange 590 is also connected to a lens and lamp housing 592 by legs 594. Legs 594 support the lens and lamp housing in combination with an electrical plug and socket connector 595. The connectro 595 in addition to providing a mechanical mounting for the lamp 60 provides electric power thereto. A pair of clear circular heat shields 596 are mounted in the lens and lamp housing 592 adjacent the lamp 60. The heat shields 596 are preferably comprised of ground glass and act to shield the heat produced by lamp 60 from the lenses 598. Lenses 598 are mounted in the lens and lamp housing adjacent the heat shields 596 and as previously mentioned are separated from the lamp by the shields. Lenses 598 act to collimate the light from lamp 60. The housing 592 includes a pair of parallel vertically disposed side walls 599 (only one of which is shown in FIG. 16) which include louvers 600. A rear wall 602 is also provided in the housing 592 which includes louvers 604. Louvers 600 and 604 enable ventilation of lamp 60 and heat shields 596. The housing also includes a top wall 606 and bottom wall 608 which include openings to mount the lenses 598 and heat shields 596. Walls 606 and 608 are parallel to each other, horizontally disposed and planar. The lens and heat shields are secured in the housing by extending partially through slotted openings in walls 599, 606 and 608. A fan 610 is supported by a mounting bracket 612 which depends from and is secured to the flanges 194 and 195 of top wall 84 of the apparatus 30 by fasteners 613. Fan 610 is mounted adjacent the openings in the top wall 84 and the openings 184 in cover plate 182. Thus, the fan 610 acts to draw air through louvers 600 and 604 past lamp 60 so that the apparatus does not overheat. As best seen in FIG. 18, a screen 614 is mounted between wall 256 and bottom wall 86 of the apparatus within a circular opening 615 in wall 256 and adjacent to an opening in the bottom wall 86 which is aligned with and similar to opening 615 so that air may be drawn therethrough by fan 610 for ventilation of lamp 60. The openings 184 on the other side of the cover plate 182 also facilitate the flow of air to increase the ventilation of the apparatus. The housing 592 is also supported at its opposite end by a flange 609 which is integral with and epends perpendicularly from bottom wall 608. Flange 609 is secured to a flange 616 of supporting plate 326 by a fastener 611.

As best seen in FIGS. 8 and 15, the speaker 74 is secured to wall 92 adjacent opening 94. The speaker 74 is secured to the wall by fasteners 617 which extend through openings in wall 92 and are threadedly secured in openings provided in a peripheral flange 619 which is provided about the speaker. As seen in FIG. 8, the speaker 74 is provided adjacent the screen assembly 36. Thus, the speaker 74 is located so that the sound is transmitted directly towards the viewer of the visual program on screen 61.

As best seen in FIGS. 16 and 17, main supporting plate 326 includes an integral perpendicular flange 616 which is vertically disposed and extends from the supporting plate 326 in the direction of wall 38. Flange 616 includes a generally rectangular opening 618 which is adjacent to and axially aligned with lenses 598. flange 616 further includes a rectangular opening 620 which is adjacent opening 618 that is formed by virtue of an outstruck integral perpendicualr tab 622 which extends from the flange 616 towards the wall 80. Flange 616 also includes an opening 624 adjacent the bottom thereof which is substantially rectangular. The edge 626 of opening 624 is inclined at an angle with respect to the vertical edge 628 of flange 616 so that the cartridge receptacle 40 may be opened farther as will be seeen hereinafter.

As best seen in FIG. 18, the flange 616 includes an integral tab 630 which is horizontally disposed and perpendicular to the flange and which is secured to the inner lower wall 256 by a fastener 631. As best seen in FIGS. 16, 20 and 30, a first supporting bracket 632 is connected to supporting plate 326 below lenses 598. A similar supporting bracket 634 is also connected to supporting plate 326 but is horizontally spaced from bracket 632. Ths supporting brackets 632 and 634 each include a vertically disposed leg 636 which extends perpendicularly from plate 326 towards wall 38. The leg 636 is substantially planar and includes an opening for receiving a fastener 638. Brackets 632 and 634 also include a rectangular vertically disposed leg 637 which is integral with and perpendicular to leg 636 and is secured to plate 326 by fasteners 639. The supporting brackets 632 and 634 combine to support the cartridge receptacle 40.

Cartridge receptacle 40 is best seen in FIGS. 19 and 33 and includes a U-shaped frame 640. Frame 640 includes a first plate 642 and a second plate 644 which are planar and parallel to each other and which are bridged by an integral perpendicular base plate 646. Frame 640 also includes a flange 648 which is horizontally disposed, perpendicular to and integral with base plate 646. The flange 648 extends inwardly towards the apparatus and is substantially planar. Flange 648 supports a tape recording head 72 which is connected to the flange 648 by a U-shaped bracket 650. Bracket 650 depends from flange 648 and is secured thereto by fasteners 651. A pair of release brackets 652 are connected to the cartridge receptacle 40 about flange 648 on opposite sides of the bracket 650. Release brackets 652, as will hereinafter be seen, operate to expose the audio tape for reproduction of sound.

The plates 642 and 644 act as guide walls for the reception of the cartridge 42. First plate 642 is vertically disposed, is substantially planar and includes in its lower end portion, openings 654 and 656. Plate 642 further includes a rectangular opening 658 which is aligned with opening 618 in flange 616 when the cartridge receptacle 40 is inserted into wall 38. The plate 642 includes a flange 660 which is integral with and perpendicular to the plate and extends inwardly towards plate 644. Plate 644 includes a flange 662 which is integral therewith and similar to flange 660 and which extends towards plate 642. Flanges 660 and 662 are both vertically disposed, lie in substantially the same plane and act to restrain transverse movement of cartridge 42 as it is slid into the cartridge receptacle 40. The plate 642 includes above the opening 658 a lock receiving opening 664 and a locking finger 666. Locking finger 666 partially extends into the opening 664 and has a tapered forward portion which is adapted to be engaged by a spring urged locking post as will hereinafter be seen.

The plate 644 is parallel to plate 642 and on the opposite end of plate 646. Plate 644 includes an opening 668 which is horizontally aligned with opening 654. It also includes a rectangular planar tab 670 which is outstruck from the plane of plate 644 at an acute angle towards plate 642. The U-shaped frame 640 is connected to a rectangular planar outside wall 672 of the receptacle. As best seen in FIG. 30, outside wall 672 is disposed vertically and is connected to the base plate 646 of the frame 640 by a spacer 674. The spacer 674 is narrow, rectangularly shaped and hollow. Spacer 674 forms a housing for a sponge or porous insert 675 which is inserted through the rectangular opening 677 at the top of spacer 674. The insert 675 may be moistened prior to or after insertion into spacer 674 so that the film in cartridge 42 is properly humidified and does not crack. Insert 675 is removable. As best seen in FIG. 31, the spacer 674 has an enclosed bottom so that no moisture leaks out through the bottom. The insert 675 is particularly effective in very dry climates to prevent film cracking.

Spacer 674 is also provided so that the outside wall 672 of the cartridge receptacle 40 is aligned with and substantially in the same plane as the remainder of wall 38, while the cartridge 42 and the cartridge receptacle 40 are adequately inserted into the inside wall 38 for operation of the apparatus 30. That is, the cartridge 42 is disposed internally, adequately to have the tape and film contained therein engaged by the capstan 68 and the sprocket wheel 78, respectively.

The cartridge receptacle 40 is pivotably connected at openings 654 and 668 of plates 642 and 644 to the legs 636 of brackets 632 and 634, respectively, by fasteners 638. Thus, cartridge receptacle 40 is pivotable into and out of wall 38. The outside wall 672 of the cartridge receptacle 40 has substantially the same dimensions as the opening 676 in wall 38. Thus, as best seen in FIGS. 3 and 20, cartridge receptacle 40 is substantially flush with wall 38 when the cartridge 42 is in place.

A normally open microswitch 678 is also supported by bracket 634 as best seen in FIGS. 16 and 19. The tab of plate 644 of receptacle 40 operates to close microswitch 678 when the cartridge receptacle 40 is pivoted into position in apparatus 30. As best seen in FIG. 18, the tab 670 urges arm 679 of microswitch 678 against the microswitch when the cartridge receptacle 40 is engaged within apparatus 30. This action closes the switch. Microswitch 678, as will be seen hereinafter, must be closed in order to energize solenoid 62. Thus, if the cartridge receptacle 40 is not inserted into an operating position within apparatus 30, the roller 64 cannot be drawn against capstan 68 since solenoid 62 cannot be energized unless microswitch 678 is closed. Thus, the tape 66 can never be caught between the roller 64 and capstan 68 if the cartridge receptacle 40 is pivoted out of the apparatus 30 during operation thereof. Also, the tape can never be cut by pivoting the cartridge receptacle 40 into the apparatus 30 during operation thereof. As best seen in FIGS. 16 and 19, a second locating post 680 is secured to the supporting plate 326. Locating post 680 is similar to locating post 362 and horizontally aligned and spaced therefrom. It includes a threaded portion 681 which extends through an opening provided in supporting plate 326 and is secured thereto by nuts 683 which are threadedly engaged to portion 681 on opposite sides of plate 326. The purpose of locating posts 362 and 680 will appear hereinafter. As best seen in FIGS. 16, 19 and 23, link 366 is also connected to a pressure pad 682 via an L-shaped bracket 684. The bracket includes a shorter leg 685 which is integral and perpendicualr to the main portion thereof and which is connected to the link 366 by threaded fasteners 687. Fasteners 687 extend through opening 689 in leg 685 and are threadedly secured to link 366. Bracket 684 further includes a rectangular planar flange 691 which is integral with the main leg of the bracket and is hoirzontally disposed. Pressure pad 682 which is substantially rectangular and comprised of an easily compressible soft material is preferably secured to the bottom surface of flange 691 by adhesive bonding. As link 366 is drawn down by shaft 374 of solenoid 62, pressure pad 682 engages the tape 66 so that it is urged against recording head 72. Simultaneously, roller 64 which is also connected to line 366, is drawn down against tape 66 which is urged against capstan 68 so that the tape 66 is engaged therebetween for movement thereof.

Referring now to FIGS. 24, 25 and 26, the cartridge 42 is shown in greater detail. Cartridge 42 is generally rectangular, integrally formed and includes a rear wall 686, a forward wall 688, a side wall 690, a top wall 692 and a bottom wall 694. The remaining side of the cartridge 42 is comprised of an opening 696 which is formed between walls 686, 688, 690 and 692. Opening 696 is adapted to receive the film holder 44. The side wall 690 and top wall 692 are substantially planar and rectangular and integrally joined by an arcuate portion of wall 698 thereby providing a rounded corner at one edge of the cartridge. The provision of a single rounded edge at the top of the cartridge 42 facilitates identification of the disposition of the cartridge for insertion in receptacle 40.

The forward wall 688 is substantially rectangular, planar and integral with walls 690, 692 and 694. Wall 688 includes an opening 700 which is adjacent to side wall 690. The opening 700 is similar in shape to the outline of the tape magazine 46 and provides a receptacle therefor. The depth in which the tape magazine 46 may be inserted is limited by webbing 702 which is formed integrally and perpendicular to rear wall 686.

The webbing 702 comprises a hollow cylindrical member 704 which is aligned with a circular opening 706 in wall 686. The webbing 702 also comprises four ribs 708 which are integral with, extend radially from and are spaced equally about the cylindrical member 704 towards walls 690, 698 and an inner compartment wall 709. Ribs 708 are each rectangular and are perpendicular to the plane of and integral with rear wall 686.

The webbing 702 also comprises a pair of ribs 710 which are perpendicular to and integral with ribs 708 and extend therefrom towards lower wall 694. Tehe ribs 710 are also rectangular and perpendicular to the wall 686 and are integral therewith. The ribs 710 and those ribs 708 which are integral therewith form a rectangularly shaped opening. The web 702, as previsouly mentioned, forms a bed for the tape magazine 46 so that it cannot penetrate too deeply into opening 700. Thus, the outer surface of magazine 46 is flush with and substantially in the same plane as wall 688 when the magazine is inserted in opening 700.

Forward wall 688 also includes a rectangular opening 712. Opneing 712 is substantially the size of but slightly larger than a single frame of 35mm film. A pair of vertically elongated slots 714 are also provided in wall 688 below opening 712 which are parallel to each other, spaced from each other and disposed on opposite sides of opening 712. The slots 714 are so positioned that the discs 416 of sprocket wheel 78 may extend therethrough when the cartridge 42 is inserted in the cartridge receptacle 40 and the cartridge receptacle pivoted into the wall 38. The opening 696 in the side of cartridge 42 is elongated with the sides 716 of said openings being substantially flat, parallel and spaced from each other and ends 718 of the opening 696 being semi-circular.

The cartridge 42 is separated into two compartments by a compartmental wall 709 which extends perpendicularly to and between walls 692 and 694 of the cartridge and is also integral therewith. The cmpartmental wall 709 is substantially rectangular and planar along its major portion and includes a flared portion 711 at the portion thereof with is integral with wall 692. Flared portion 711 includes an arcuate edge 713 which enables the opening 700 in wall 688 to be similar in shape to the rounded top portion of magazine 46. Wall 709 is vertically disposed, integral with and bridges the wall 686 and 688 of the cartridge 42. It extends transversely between these walls and forms an internal wall for the compartments which receive the magazine 46 and film holder 44. The wall 709 also acts to rigidify the structure of cartridge 42.

The film holder 44 is best seen in FIG. 25. The film holder 44 is integrally formed and comprises an outer wall 719 which includes a portion 720 which is planar and rectangular, a second rectangular portion 722 which is spaced from wall 720 by a rectangular opening 723, a film guiding means 724 and a stem 726. The film holder 44 is adapted to hold a roll of film 728. Film 728 is preferably 35mm, however, any conventional size of film may be used without departing from the scope of the invention. Roll of film 728 is wrapped so that it is formed as an endless loop of film. The roll includes a coiled portion 730 which is telescoped over stem 726 and a loop portion 732 which is threaded around the film guiding means 724. The loop 732 emanates from the center of coil 730 and is wound back on the outer loop of coil 730. The film is therefore moved around the guiding means 724 in the direction of arrow 733. Thus, as the film 728 is moved around the guiding means 724, the loop is drawn from the center of coil 730 as the film being wound up on the coil 730 is returned to the outside thereof.

The film guiding means 724 is a somewhat rectangularly shaped solid member having a wedge shaped channel 734 provided at the center thereof. The channel 734 has parallelly spaced and triangularly shaped side walls 736. Channel 734 forms the opening 723 between portions 720 and 722 of wall 719. The channel also forms an integral opening 737 in guiding means 724 which is rectangular and adjacent opening 723. The remaining wall of the channel 734 is a rectangular planar surface 738 which is vertically disposed and extends at approximately a 45° angle from the plane of wall 719. This wall includes a mirror 739 which is bonded flat against the surface thereof.

Guiding means 724 extends laterally from wall 719 and is integral with portions 720 and 722 thereof. The guiding means includes an inner wall 741 which is planar and generally rectangular and lies in a plane substantially parallel to the plane of wall 719. The wall 741 is integral with and adjacent a top wall 743 which is rectangular and horizontally disposed and is perpendicular to wall 741. The guiding means 724 further includes an arcuately shaped bottom wall 745. Bottom wall 745 has an arcuate lower surface and is integral with and extends perpendicularly from wall 741 towards portion 722 of wall 719. The bottom wall 745 and top wall 743 are bridged by a vertically extending wall 747. Wall 747 includes rectangular surface 738 which is disposed at substantially a 45° angle from the outer surface of wall 747. As best seen in FIG. 21, the wall 747 is substantially triangular in cross-section. As best seen in FIG. 24, the remaining side of the guiding means 724 is formed as an opening 737 and is somewhat bridged by a spring clip as will hereinafter be seen. The loop 732 of the film 728 is guided around the outer surface of walls 743, 745 and 747 and past opening 737. The opening 737 provides in combination with opening 723 a window for reflection of light from lamp 60 through a frame of film 728 to display the transparency on screen 61.

The outer surface of the film guiding means 724 also includes a pair of projections 740 which extend laterally from top wall 743 and act to press the loop 732 of the film 728 against the side surface 716 of the opening 696. A pair of U-shaped projections 742 also extend laterally from the outer surface of the bottom wall 745 of the film guiding means 724 and are vertically aligned with projections 740 on the opposite side of opening 737. Each of the U-shaped projections 742 includes a pair of parallel legs which are integral with and perpendicur to the outer surface of wall 745 and are separated by a groove. The legs of the U-shaped projections 742 are projected outwardly substantially similar to projections 740 so that the film is pressed against the side wall 716 of openings 696. The grooves between the legs enable the teeth 418 on discs 416 of the sprocket wheel 78 to grasp the film and advance the frames thereof.

As best seen in FIG. 25, the roll of film 728 includes a plurality of sprocket holes 749 which extend along the sides of the film. Sprocket holes 749 are provided on both sides of each of the frames and are engageable by the sprocket teeth 418 of discs 416 of sprocket wheel 78. The film is guided over the lateral surface of guiding means 724 so that the holes are aligned with the grooves between the legs of projection 742. Thus, the sprocket teeth 418 extend through sprocket holes 749 into grooves and draw the loop 732 about the guiding means 724 in the direction of arrow 733.

A U-shaped spring clip 744 depends from the film guiding means 724 into the channel 734 and is provided to urge the film in loop 732 against the opening 712 when film holder 44 is inserted in opening 696 of the cartridge 42. The U-shaped clip 744 includes a rectangular planar web 746 and a pair of perpendicularly extending planar legs 748. The web 746 is secured to the film guiding means 724 by a pair of integral tabs 750 which overlap web 746 and thereby secure the clip 744 in place. The normal tendency of the legs 748 is to extend out of the outer surface of film guiding means 724 at an acute angle and thus urge the film against opening 712 as the film passes thereby. The film holder 44 further includes a plurality of openings 752 at the outermost corners of wall portions 720 and 722. The main portion of cartridge 42 further includes a plurality of openings 754 which are adjacent to and extend in the direction of opening 696. The openings 754 are disposed so that they are aligned with openings 752 when the film holder 44 is inserted in opening 696. The film holder is preferably secured therein by threaded fasteners 756 which extend through openings 752 and are threadedly secured in opening 754. It should be understood that fasteners 756 are optional in that they are not required for ordinary operation of apparatus 30. As will be seen hereinafter, the film holder 44 is normally maintained in place within opening 696 by a snap fastening action. The fasteners 756 are provided where it is not desirable that film 728 be readily changeable and/or accessible to the operator of the device.

Wall 686 includes a rectangularly shaped tab 758 which extends from the wall in the direction of the film holder 44. Wall 686 also includes a rectangular tab 760 which is similar to and aligned vertically with tab 758. Tabs 758 and 760 each include a vertically extending bead 761 vhich are provided on the inner surfaces of the tabs and extend toward each other. Tabs 758 and 760 are aligned with and fit into recesses 762 which are provided in the vertical edges of wall 720 to position the film holder 44 when inserted in opening 696 of cartridge 42. Recesses 762 each include a vertically extending detent 763. When tabs 758 and 760 are inserted into the recesses 762, beads 761 are snapped into detents 763 to provide a solid securement of the film holder in the opening 696. The location of tabs 758 and 760 are eccentric with respect to the axis of the cartridge 42 so that the film holder 44 is always inserted in the same direction within opening 696. Bottom wall 694 also includes a horizontally extending tab 764 which engages wall 722 in a recess (FIG. 26) similar to recess 762. The film holder 44 is thus secured in the cartridge 42 by the snap action of tabs 758, 760 and 764.

Tape magazine 46 is best seen in FIGS. 24 and 26 and is preferably of the type shown in U.S. Pat. No. 2,911,215.

As best seen in FIGS. 24 and 26, the tape magazine 46 basically comprises a cover 766, a circular disc 768 and an endless sound recording tape 66. Cover 766 comprises a base plate 770 and a cup shaped portion 772. The plate 770 is substantially planar and the periphery thereof includes a pair of parallel straight edges 774 which are bridged by a semi-circular top edge 776 at one end and are bridged at their bottom end by a pair of straight edges 778 which are perpendicular to and extend inwardly from edges 774 and are separated by a substantially U-shaped edge 780. The U-shaped edge 780 extends inwardly from edge 778 towards the semi-circular edge 776 to provide a rectangular opening for access to the tape 66. The U-shaped edge 780 includes a pair of parallel straight edges 782 which are perpendicular to straight edges 778 and which are bridged by a perpendicular straight edge 784. A U-shaped notch 786 is provided which extends from the central portion of edge 784 towards semi-circular edge 776. The plate 770 also includes a pair of countersunk openings 788 which are located between edges 774 and 782 and which are adapted to receive the locating posts 680 and 362 as the cartridge 42 is inserted into the apparatus 30.

The base plate 770 further includes an integral flange 790 of U-shaped cross-section which is perpendicular to and depends from U-shaped edge 780 of the base plate 770 towards the cup shaped portion 772 of the cover 766. The inner edge of the flange 790 is substantially defined as the outline formed by the U-shaped edge 780. The open end of the U-shaped flange 790 is bridged by an elongated rectangular strip 792. The innermost edge 794 of strip 792 closest to the cup shaped portion 772 of cover 766 is continuous with the edge of flange 790 closest to the cup shaped portion. The outermost edge 796 of strip 792 is spaced from the innermost edge 794 only a small portion towards the plane of plate 770. Thus, it can be seen best in FIG. 24 that the width of strip 792 is smaller than the depth of cup shaped portion 772 or U-shaped flange 790 and thereby defines a lateral opening in the lowermost edge of the tape magazine 46, the purpose of which will appear hereinafter. The flange 790 forms a recess in base plate 770 which provides accessibility to the tape 66 by rubber roller 64 as well as pressure pad 682.

The cup shaped portion 772 of the cover 766 comprises a cover plate 798 and a peripheral skirt 800. Peripheral skirt 800 is integral with cover plate 798 and extends from the periphery thereof with a slight flare. The plate 798 is substantially similarly outlined to base plate 770 but does not include a cut out portion such as U-shaped edge 780 and therefore has a straight lower edge. The peripheral skirt 800 extends adjacent to and bears against the straight edges 774 and semi-circular edge 776 of the base plate 770. The lowermost portion of the peripheral skirt 800 includes a rectangular opening 802. The portion of peripheral skirt 800 below opening 802 at 804 is substantially similar to strip 792 and is substantially aligned therewith. The strip 792 and portion 804 define a channel through which tape 66 passes. As will be seen hereinafter, the strip 792 and portion 804 of skirt 800 act to encapsulate and therefore protect tape 66 when the tape magazine 46 is not inserted in the apparatus 30.

Skirt 800 also has in its lowermost portion a pair of outstruck projections 806. As best seen in FIG. 22, a pair of elongated slots 808 are provided in projection 806 which extend perpendicularly to cover plate 798. Slots 808 continue into the cover plate 798 and extends parallel to the straight lateral sides thereof as best seen in FIG. 26. The base plate 770 also has a pair of cylindrical posts 810 which are integral therewith and extend perpendicularly therefrom. As best seen in FIG.

22, posts 810 extend towards and abut the cover plate 798. Posts 810 support a pair of nylon guides 812. Guides 812 are substantially cylindrical, have a cylindrical bore and are slidable longitudinally on posts 810. The nylon guides 812 each include a projection 814 which extends into projection 806 and which is L-shaped and acts to support tape 66. Also telescoped over posts 810 are helical springs 816. Springs 816 are inserted over posts 810 between the plate 770 and the nylon guides 812. The normal tendency of springs 816 urge the nylon guides to the endmost point of post 810 so that when the tape magazine 46 is not inserted in the apparatus, the nylon guides are urged by the springs to bear against the plate 798. The tape 66 is thus urged adjacent cover plate 798 and is maintained there by the projections 814 of the nylon guides. In this position, the tape is completely encapsulated by strip 792 and portion 804 of the skirt 800.

As best seen in FIG. 26, nylon guides 812 also include laterally projecting ridges 813. Ridges 813 extend axially along the guides 812, are integral therewith and extend inwardly towards each other. The U-shaped flange 790 includes at the ends of each of its legs adjacent strip 792, a pair of legs 815. Each pair of legs 815 is horizontally disposed, integral with flange 790 and parallelly spaced from each other. They are separated by a groove in which the ridges 813 are engaged. The legs 815 are coextensive with the length of the flange 790. The grooves provided between the legs 815 act as a track for the ridges 813. Ridges 813 are longitudinally slidable in said grooves and act to maintain the disposition of nylon guides 812. That is, the ridges 813 prevent rotation of nylon guides 812 about posts 810 as the tape passes therearound in the direction of arrow 828.

As also best seen in FIG. 26, the tape is wound as an endless loop about a drum 818. The tape 66 comprises a coil portion 819 which is wound around drum 818 and a loop portion 821 which emanates from the center of coil 819, is threaded around nylon guides 812 and is wound back on the outside loop of coil 819. Drum 818 is integral with and is perpendicular to disc 768 which is shown in phantom in FIG. 24. The disc 768 is circularly shaped and planar. It acts to support the coil of tape 66 and rotates therewith. Drum 818 is rotatably mounted about an annular flange 820 which projects from, is integral with and extends perpendicularly from the base plate 770. The drum 818 is separated from the flange 820 by a nylon collar 822. Collar 822 is substantially cylindrical and includes a pair of longitudinally or axially extending ridges 824 which are on diametrically opposite sides of the outer surface thereof and which engage drum 818 in axially extending slots which are provided therein and are of similar cross section. Thus, the drum 818 and collar 822 rotate together about annular flange 820.

When pressure roller 64 and capstan 68 engage the tape 66, the tape is drawn out of the center of the coil at 826 and is drawn in the direction of arrow 828. The tape 66 is wound back about the coil at point 830. Thus, the tape travels out of the center of the coil of film about drum 818 to the first nylon guide 812. Then it passes through strip 792 and portion 804 of the skirt 800. It is then passed about the remaining guide 812 and back to the outermost loop of the coil 819 about drum 818. By threading the tape in this manner, the tape 66 may be played continuously without rewinding. The cup shaped portion 772 of cover 766 includes an annular web (not shown) which is integral with cover plate 798 and is perpendicular thereto. The annular web also includes a plurality of radially extending webs 832 which are rectangular strips and extend to and are connected to the inner surface of skirt 800. Webs 832 act to space the coil 819 of sound tape 66 from the plate 798 and retain the coil 819 on the circular disc 768. Thus, the webs 832 maintain coil 819 of tape 66 in a neatly wound condition at all times.

The flange 820 is integral with a circular end piece 833 which includes a circular opening at the center thereof. The cover plate 798 of the cup shaped portion 772 of cover 766 includes an opening which is aligned with the opening in end piece 833. The cup shaped portion 772 is secured to the base plate 770 by a fastener 835 which extends through the opening and secures the plates together. The portions of cover 766 are thus secured together for encapsulation of the tape 66. The tape 66 is thus not accessible until nylon guides 812 are moved by release brackets 652 as will hereinafter be seen to expose a portion of the loop 821 of tape 66.

The cover 766 including cup shaped portion 772 is preferably comprised of a transparent material such as plastic. Thus, if tape 66 should become inadvertently unthreaded, the condition is easily seen through the cover of the magazine.

As best seen in FIG. 24, the tape magazine 46 is inserted in cartridge 42 by inserting the cartridge in opening 700. As hereinbefore mentioned, the cover plate 798, though similar in shape to base plate 770, is slightly smaller than the plate 770. Thus, skirt 800 extends outwardly towards the outer edge of the base plate 770. That is, the base plate is fitted within and is adjacent to the outermost edge or lip of skirt 800. The cover 766 of the magazine, thus, tapers to a smaller size from the base plate 770 towards cover plate 798. AS a result of this tapering, the magazine is not placeable within opening 700 easily if it is disposed backward when inserted therein. That is, the base plate 770 is substantially the same width and length as the opening 700 and therefore does not slip easily into the opening 700. However, the cover plate 798 is smaller than the opening 700 and therefore slides easily into the opening. The flaring of the skirt 800 towards plate 770 also enables the tape magazine to be easily placeable into cartridge 42 and secured more tightly as it is inserted deeper into the opening 700.

As seen in FIG. 24, opening 700 in rear wall 686 is adjacent to and communicates with a rectangular opening 834 which is provided in bottom wall 694. Opening 834 is substantially the same size as opening 802 in the skirt 800 of the tape magazine 46. Thus, opening 834 in the cartridge 42 provides access to the tape magazine 46 through bottom wall 694. Also provided in bottom wall 694 are a pair of elongated slots 836. Slots 836 extend perpendicularly from opening 834 and extend perpendicularly into rear wall 686. Slots 836 are aligned with slots 808 of the tape magazine 46 when the magazine is placed in opening 700 so that access is provided through slots 836 in the cartridge 42 to nylon guides 812 in magazine 46. The film holder 44 is inserted in opening 696 with guiding means 724 being inserted first and the portions 720 and 722 of wall 719 being engaged by tabs 758, 760 and 764. The roll of film 728 is thereby positioned within the cartridge for display thereof.

As best seen in FIG. 26, the cartridge includes an elongated groove 838 in which the film is guided. It can be seen that the cartridge 42 provides physical access to the sprocket wheel 78 for advancing or moving the film 728 and the audio tape 66 in the plane of forward wall 688. The access provided in wall 688 to film 728 is via slots 714 which are adapted to receive discs 416 of sprocket wheel 78. Access to tape 66 is provided by the recessed opening defined by edge 780 of the base plate 770 of the tape magazine 46 which is adapted to enable pressure roller 64 and pressure pad 682 to enter therein. It can also be seen that access is provided for the movement of tape 66 by opening 834 in lower wall 694 which enables capstan 68 and sound pickup head 72 to contact tape 66 therethrough. Slots 836 and 808 within the magazine 46 enable release brackets 652 to engage guides 812. The cartridge 42 also includes openings 723 and 737 which enable a collimated beam of light from lamp 60 to be passed through a frame of film 728 and directed toward screen 61. Thus, light may be projected perpendicular to the plane of portions 720 and 722 of wall 719 through opening 723 into cartridge 42. It is then reflected off mirror 739 perpendicularly through a frame of the film 728 and out through opening 737.

As best seen in FIGS. 30 and 33, cartridge 42 is adapted to be inserted into cartridge receptacle 40 between plates 642 and 644. As the cartridge is slid into place, the release brackets 652 project into slots 836 of the cartridge 42 and the slots 808 of tape magazine 46. As best seen in FIG. 22, the inclined edges 840 of bracket 652 slide the tape guides 812 in the direction of arrow 842. As the tape guides 812 are moved in the direction of arrow 842, the audio tape 66 is drawn out of the channel formed by strip 792 and portion 804 of the skirt 800. As best seen in FIG. 21, the tape 66 is thus made accessible to the roller 64, capstan 68, pressure pad 682 and sound pickup head 72 through opening 802. As best seen in FIGS. 20, 21 and 30, when the cartridge receptacle 40 is pivoted and inserted into apparatus 30, the entire assembly is pivoted about fasteners 638 in the direction of arrow 844 of FIG. 30. The cartridge receptacle is secured in place by a locking post 846 which is moved downwardly by the tapered forward edge 848 of the locking finger 666 until the post 846 reaches notch 850 of the finger and moves upwardly therein. The cartridge receptacle 40 is thus maintained in place until the locking post 846 is moved downwardly out of notch 850.

Locking post 846 is the endmost projection of an elongated bar 852 which is connected to the eject switch 58. As best seen in FIG. 30, locking post 846 extends through a vertically elongated slot 853 which is provided in flange 616. As the eject switch 58 is pushed downwardly, the bar 852 is moved downwardly and the locking post 846 is likewise moved downwardly thereby enabling the locking finger 666 to be clear of said post. The cartridge receptacle 40 is opened as a result of being connected to a spring 854 which is in turn connected to inner lower wall 256. The spring 854 urges the cartridge receptacle downwardly thereby urging the cartridge receptacle to pivot about fasteners 638. Thus, when the locking post 846 is moved out of the notch 850, finger 666 becomes free and thereby enables the cartridge receptacle to be drawn to an open position in the direction of arrow 856.

As best seen in FIG. 31, plate 642 of the cartridge receptacle 40 has a stop 857. The stop 857 is secured to plate 642 in opening 656 thereof. Stop 857 extends perpendicularly to the surface of plate 642 and is adapted to abut edge 626 of opening 624 in flange 616. Thus, the stop 857 prevents the cartridge receptacle 40 from being drawn by spring 854 too far out of the apparatus 30. The stop engages edge 626 only when the cartridge receptacle 40 is pivoted out of the opening 676 in wall 38.

The cartridge 42 is slid into and out of cartridge receptacle 40 in the direction of arrows 859 which are shown in FIG. 30 when the receptacle is disposed in its outermost position. The cartridge 42 is not movable in the receptacle 40 when the receptacle is pivoted into the apparatus. Thus, the film 728 and tape 66 are not subjected to undue stress as a result of improper positioning of the cartridge 42 within the cartridge receptacle.

As best seen in FIG. 18, the eject switch 58 is substantially rectangularly shaped and is movable vertically through the opening provided therefor in top wall 84 of the apparatus 30. As best seen in FIGS. 16 and 31, the bar 852 extends downwardly from the eject switch 58 and to an integral horizontal bridging section 858. Bridging section 858 is connected at its other end to a downwardly extending integral vertical portion 860. A substantially rectangular member 862 having a vertically extending cylindrical bore therethrough is connected to flange 616 by fasteners 864, as best seen in FIG. 31. Member 862 acts as a vertical guide means for the bar 852 so that it will be restrained against horizontal or transverse movement when moved vertically by eject switch 58. The bar 852 is biased upwardly by a spring 866 which is telescoped over the vertical portion 860 of the bar 852. A collar 868 is mounted about the vertical link adjacent the top thereof and provides a shoulder to bear against the upper edge of spring 866. The lower edge of spring 866 bears against the top surface of member 862. Thus, the eject switch is biased upwardly and maintains its uppermost position unless pressed manually in a downward direction.

A microswitch 870 is connected to tab 622 of flange 616 by fasteners 872. The fasteners extend through slotted openings 873 in the tab 622 and are threadedly secured in microswitch 870. The slotted openings 873 extend horizontally and enable the placement of microswitch 870 to be adjusted in order to ensure operation of the switch each time the eject switch 58 is pressed. When eject bar 852 is pressed downwardly, the corner between locking post 846 and link 860 urges arm 874 of the microswitch towards the body 876 of the microswitch 870. As arm 874 is urged towards the body 876, a link 878 is moved inwardly of body 876 and thereby opens microswitch 870. The microswitch 870 is normally closed and is in the same circuit, as will be seen hereinafter, with solenoid 62. Thus, as eject bar 852 is moved downwardly to eject the cartridge receptacle 40, the microswitch 870 is opened thereby opening the circuit to solenoid 62 which in turn releases the roller 64 from against capstan 68. In this manner, when the eject button is pushed, the sound tape 66 is released from between pressure roller 64 and capstan 68 so that the tape cannot be inadvertently pulled out of the tape magazine by ejecting cartridge 42 during the operation of the apparatus 30.

As best seen in FIGS. 15, 16 and 17, printed circuit boards 880, 881 and 882 are shown in phantom and are mounted adjacent top wall 84 by mounting brackets 884. The mounting brackets 884 are disposed adjacent to a horizontally extending rectangular planar plate 886 which is vertically disposed. Plate 886 includes a horizontally disposed rectangular flange 887 which is best seen in FIG. 17 and to which is mounted a continuous operation switch 888. The continuous operation switch 888 extends through a rectangular slotted opening (not shown) which is provided in flange 887 so that the continuous operation switch is accessible to be manually slided to an On or Off position. The continuous operation switch will be discussed hereinafter in greater detail with the remainder of the electrical circuitry. The switch 888 may be used to continuously repeat a program, for example, where the device is used in a showroom window.

The lower portion of the apparatus 30 is best seen in FIG. 18. As seen therein, the inner lower wall 256 is substantially coextensive with bottom wall 86 of the apparatus. The inner lower wall 256 is substantially rectangular and, as best seen in FIGS. 14 and 31, includes a pair of flanges 889 along both its longitudinal edges. Flanges 889 are perpendicular and integral with the inner lower wall 256 and bear against the bottom wall 864. The inner lower wall 256 is preferably secured to bottom wall 86 by welding at the junction of the flanges 889 and the wall. A pair of the support members 264 are secured to the bottom wall 86 by a threaded fastener 262 which is threadedly secured to cylindrical posts 258. The remaining pair of support members 264 are similarly connected to the bottom wall 86 by fasteners 262 which extend through the bottom wall 86 and inner lower wall 256 and are threadedly engaged by nuts 891.

The inner lower wall 256 also includes an opening 893 which is substantially rectangular and is provided adjacent bracket 320 which supports the electrical cord assembly 306. A similar opening is provided in bottom wall 86 and is vertically aligned with opening 893. The electrical cord 310 extends through the aligned opening 893 and the opening in bottom wall 86 to the electrical plug 312. The opening 893 is so shaped that a portion of electrical plug 312 may be drawn therein without being able to completely pass through the opening. The apparatus is thus adapted to store the electrical plug 312 in a readily accessible position to the operator without having a bulky electrical cord depending therefrom.

A bracket 890 is secured at the bottom of apparatus 30 adjacent inner lower wall 256. Bracket 890 includes a pair of outwardly extending horizontally disposed fingers 892 and an integral rectangular bridging section (not shown) which is vertically disposed. The bridging section of the bracket 890 is secured to the plate 326 preferably by welding. Fingers 892 each have a central arcuate portion 895. The arcuate portions 895 of the fingers 892 of bracket 890 are complementary to each other. That is, the center of each of the arcuate portions 895 extend oppositely from each other. Fingers 892 each further include an insert 894 which is preferably comprised of an elastomeric or spongy material and which is secured preferably by bonding to the inner surfaces of arcuate portions 895. The fingers 892 act as a receptacle for storing adapter 200 therein when the apparatus 30 is either not in use or is operated in a mode where the visual program is presented on screen 61. The inserts 894 act to protect the outer surface of the adapter 200 from being scratched during insertion or removal from the bracket.

Referring now to FIG. 9, it can be seen that adapter 200 may be used in place of lens 202 by inserting it in the sleeve 384 provided for the lenses. The screen 61 is positioned as shown in FIG. 9, by moving the side wall 150 to one side of opening 96 so that it is connected to inner wall 92 at pin 146.

As best seen in FIGS. 16 and 18, the adapter 200 is comprised of a cylindrical housing 896 which is hollow and in which a long focal length lens is mounted. The forward end of the lens housing 896 includes a smaller diameter boss 898 to which is attached a hood 900. Hood 900 is connected to the cylindrical housing 896 by fasteners 902 which are threadedly secured in boss 898 and pass through openings provided therefor in hood 900. The hood 900 is comprised of a pair of arcuate ribs 904, a pair of integral, planar side walls 906 which are parallel to each other and are bridged by a rectangular end plate 908 which is substantially planar and is perpendicular to the side walls 906.

As best seen in FIGS. 9 and 16, the end plate 908 is inclined at an angle with the edges of side walls 906. End plate 908 has a mirror 910 secured to the inner surface thereof. The angle at which the plate 908 and mirror 910 are inclined with respect to the edges of side walls 906 is approximately 45° so that when the adapter 200 is inserted in sleeve 384, the beam of light is directed in the direction of arrows 912. The height at which the picture is projected may, of course, be varied by slight pivoting of the adapter 200 about its axis through the cylindrical housing 896. Adapter 200 thus enables the film 728 to be displayed on an external screen.

As best seen in FIGS. 2, 15 and 16, a pair of jacks 914 and 916 are secured to side wall 82 of apparatus 30. Jack 914 is connected to the output of the audio amplifier circuitry so that a plug may be inserted into jack 914 for use of a more powerful external loud speaker. By using an external loud speaker in combination with the adapter 200 for displaying the visual presentation on an external screen, the apparatus 30 may be used as a sound projector for display of the program to an audience. Jack 916 is connected to the input of the audio amplifier circuitry. A microphone may be plugged into jack 916 so that the operator of the device can speak into the microphone and have his voice amplified during the presentation of a program. The operator of the device may thus manually operate the advancement of the film in place of a prepared audio program on tape 66 and orally present the audio contents of the program himself. Therefore, by merely inserting plug 312 into an electrical receptacle which provides electricity to the apparatus 30, pressing the on side of switch 52 and by having an external loud speaker and microphone plugged into jacks 914 and 916, the apparatus 30 may also be used as an annunciating system.

As best seen in FIG. 16, a mounting bracket 918 which supports and stores a spare lamp 920, is also connected to wall 82. Thus, if lamp 60 should wear out during a program, a spare lamp 920 is readily available for its replacement. Also, the lamp 920 is easily carried in the body of the apparatus 30 without requiring any external carrying cases.

As best seen in FIGS. 15, 16 and 17, plate 886 is integral with a rectangular mounting plate 924. Plate 924 extends transversely across the width of apparatus 30 and is substantially coextensive therewith. Rectangular plate 924 also includes a flange 926. Flange 926 is rectangular, extends along, is integral with and perpendicular to the main portion of plate 924. Flange 926 is horizontally disposed and is secured to top wall 84 of the apparatus 30 by fasteners 928 which extend through flange 926 and are threadedly secured to the top wall.

Thus, the plate 924 depends from top wall 84. It is provided to support the printed circuitry assembly. The printed circuitry assembly is comprised of brackets 884 which are secured together by printed circuit boards 880, 881 and 882. The brackets 884 are substantially U-shaped and each include rectangular, planar and horizontally disposed legs 930 which are parallel and which are bridged by an integral rectangular, planar, vertically disposed web 932 which is perpendicular to the legs. The printed circuit board 882 is secured to legs 930 of mounting brackets 884 by fasteners 934. The printed circuit boards 880 and 881 are secured to the bottom legs 930 of mounting brackets 884 by fasteners 936. The printed circuit boards 881 and 882 are spaced by cylindrical sleeves 938. Sleeves 938 have a cylindrical bore through which fasteners 936 extend. The fasteners 936, thus, extend through printed circuit board 881, bottom legs 930, sleeves 938 and printed circuit board 880 to secure these elements together.

The printed circuitry assembly is supported by plate 924 and is connected thereto by plug and socket connectors 922. A first portion 940 of each of the connectors 922 is secured in circular openings which are provided in web 932 of one of the mounting brackets 884. The remaining portions 942 of the connectors 922 are secured in openings provided therefor in plate 924. The printed circuitry may thus be plugged into the apparatus 30. It is, therefore, easily removable and the circuitry may easily be worked on in the event of a circuit failure or alteration of the circuitry. The plug in printed circuitry also facilitates assembly of the combination visual and sound apparatus.

It should be noted that throughout the drawing, the electrical connections have not been shown so that the mechanical details could be shown more clearly. The bulk of the electrical circuitry is provided on printed circuit boards 880, 881 and 882. Plates 924 and 886 also have various circuitry connected thereto which is not shown for purposes of clarity. The electrical circuitry as well as the operation thereof is described hereinafter.

A schematic block diagram of the electrical system is shown in FIG. 34. The electrical circuitry includes a fan 610, a hold relay 1000, an advance relay 1002, tape solenoid 62, advance solenoid 76, lamp 60, motor 70, audio amplifier 1004, tone amplifier 1006, power supply 1008 and the various interconnections between the circuits. The switching circuitry includes on-off switch 52, the automatic-manual switch 54, the hold-advance switch 56, microswitches 678 and 870, and continuous operation switch 888. The electrical plug 312 is a two pronged conventional male plug which is adapted to be inserted in a receptacle which is connected to a 110-120 v. A. C. power supply. Plug 312 includes a first lead 1010 which is connected to fan 610 via lead 1012. The first lead 1010 of plug 312 is also connected to a didoe rectifier 1014, lamp 60, motor 70 and the primary winding 1018 of a step-down transformer 1020.

The hold relay 1000 includes a winding 1022 which is connected in parallel with a capacitor 1024. Winding 1022 is connected to lead 1010 via lead 1026 and diode 1014. Winding 1022 is also connected via lead 1028 to a contact 1030 which is a part of advance relay 1002. The winding 1022 is also connected via lead 1028 to a contact 1034 of continuous operation switch 888. The continuous operation switch 888 further includes an arm 1036 which is movably connected to terminal 1038. Arm 1036 is selectively engageable with contact 1034. The continuous operation switch 888 is normally in an open position with arm 1036 not engaging contact 1034 and is closed only when the apparatus is to be used in a continuous operating mode and arm 1036 is urged against contact 1034. Terminal 1038 is connected via lead 1040 to terminal 1042 of on-off switch 52. On-off switch 52 further includes a second terminal 1044, a pair of contacts 1046 and 1048 and manually movable arms 1050 and 1052. The arms 1050 and 1052 are mechanically coupled for movement together as indicated by the dashed lines between the two arms as shown in FIG. 34. When the on side of switch 52 is pressed, arms 1050 and 1052 are urged to the left in FIG. 34. When the off side of switch 52 is pressed, the arms are urged to the right as shown in FIG. 34.

The arm 1050 does not normally engage contact 1046 and thus the leftmost portion of on-off switch 52 is normally open. The arm 1050 closes the circuit between contact 1046 and terminal 1042 only when the on side of the on-off switch is manually pressed. In this manner, connection is made between the terminal 1042 and contact 1046 only as long as the on side of switch 52 is pressed. Arm 1052 is movably connected to terminal 1044 and is adapted to selectively engage or disengage contact 1048. The arm 1052 is normally urged against contact 1048 so that there is a closed circuit between terminal 1044 and contact 1048. When the off side of the on-off switch 52 is pressed, arm 1052 is drawn away from contact 1048 and an open circuit is formed between the terminal 1044 and the contact 1048.

Contact 1046 is connected via lead 1054 and a fuse 1056 to the second lead 1058 from electrical plug 312. Fan 610 is also connected via lead 1054 and fuse 1056 to the lead 1058.

Hold relay 1000 also includes an arm 1060 which is movably connected to a terminal 1062 and is selectively engageable with contacts 1064 and 1066. Arm 1060 is normally spring urged to the left and engages contact 1064. However, when the winding 1022 is energized, the arm 1060 is drawn towards winding 1022 and is drawn into engagement with contact 1064.

As will hereinafter be seen, when the on side of switch 52 is pressed downwardly thereby urging arm 1050 against 1046, the winding 1022 of hold relay 1000 is energized and thereby draws arm 1060 against contact 1066 which enables the entire apparatus 30 to remain on even though arm 1050 is disengaged from contact 1046 when the manual pressure is taken off of the on side of switch 52.

Solenoid 76 includes a winding 1068, the first end of which is connected to the first lead 1010 of electrical plug 312 via diode 1014 and lead 1026. A diode 1070 is provided across winding 1068. The remaining end of winding 1068 is also connected to the hold-advance switch 56 via lead 1072. Hold-advance switch 56 comprises a pair of terminals 1074 and 1076 which are electrically connected by lead 1078. The switch also includes a pair of movable arms 1080 and 1082 which are movably connected to terminals 1074 and 1076, respectively, and which are adapted to selectively engage contacts 1084 and 1086, respectively. Arm 1080 is normally urged against contact 1084 thereby providing a closed circuit between terminal 1074 and contact 1084. The circuit is open only when the hold portion of the hold-advance switch 56 is pressed downwardly which thereby breaks contact between the arm 1080 and contact 1084 and the arm 1080 is urged to the left. The arm 1082 is normally in an open position with arm 1082 urged to the left and not engaging contact 1086. Contact is made between the arm 1082 and contact 1086 only when the advance portion of switch 56 is pressed downwardly thereby moving arm 1082 against contact 1086. As the manual pressure on switch 56 is removed, the arm 1082 resumes its normal position in which it is spaced from contact 1086. Similary, when manual pressure is released from the hold portion of the switch 56, the arm 1080 resumes engagement with contact 1084.

The winding 1068 of the solenoid 76 is connected to the terminals 1074 and 1076 of the hold-advance switch 56. Contact 1084 is connected via a resistor 1088 to contact 1090 of advance relay 1002. Advance relay 1002 includes, in addition to contacts 1030 and 1090 and arm 1032, a winding 1092. The arm 1032 is normally spring urged against contact 1030. Arm 1032 is drawn against contact 1090 whenever winding 1092 is energized. Arm 1032 is connected via lead 1094 to terminals 1042 and 1044 of on-off switch 52 via leads 1040 and 1096, respectively.

Contact 1086 of hold-advance switch 56 is also connected to terminals 1042 and 1044 of on-off switch 52 via lead 1098. It can therefore be seen that the energization of winding 1068 of advance solenoid 76 is controlled by hold-advance switch 56 and advance relay 1002. When the hold-advance switch 56 is in its normal position, a closed circuit is formed between lead 1010 of plug 312, diode 1014, winding 1068, leads 1072 and 1078, arm 1080 and resistor 1088. It should be noted that the diode 1014 acts as a rectifier to provide a D.C. voltage across windings 1022 and 1068 when a closed circuit is made through the windings between leads 1010 and 1058.

Assuming that the apparatus 30 is in operation, a closed circuit is formed by arm 1032, lead 1094, lead 1040, lead 1096, arm 1052 of on-off switch 52, arm 1060 of hold relay 1000, lead 1054 and finally lead 1058 of electrical plug 312. Thus, a complete circuit is made between leads 1010 and 1058 through winding 1068 except that there is an opening in the completed circuit between arm 1032 and contact 1090 of advance relay 1002. Thus, when the apparatus is on, each energization of winding 1092 draws arm 1032 against contact 1090 which in turn forms a complete circuit through winding 1068 and thereby enables solenoid 76 to advance the film in cartridge 42. The diode 1070 is provided to prevent arcing whenever arm 1032 is released from contact 1090 thereby breaking the circuit after the winding 1092 is no longer energized.

The winding 1092 of advance relay 1002 is connected to the output lines of tone amplifier 1006. Tone amplifier 1006 includes a pair of input terminals 1100 which are connected to the sound pickup head 72.

The sound pickup head 72 has a pair of individual heads each of which pick up the recording on one of the tracks of tape 66. There are two tracks on tape 66 as hereinbefore mentioned. The first head of pickup head 72 is aligned with the track on tape 66 on which the instructions or control signals are recorded. The first head is connected to terminals 1100 of the tone amplifier 1006. The instruction signals on the instruction track are comprised of approxiately 1,000 cycle per second (hereinafter abbreviated as c.p.s.) signals of approximately one-tenth second duration which are recorded at intervals to indicate that the film should be advanced to the next frame.

The instruction track of tape 66 also includes a signal of approximately 1,000 c.p.s. and two second duration which is provided to indicate the end of a complete program. When such a signal is received by the first head of pickup head 72, the apparatus 30 is automatically turned off. The two tracks of the tape 66 run along the tape side by side and are sensed by the two heads of pickup head 72 simultaneously. That is, a signal on the instruction track is sensed at the same time as a signal on the sound track which is located at the same point along the tape 66. Thus, the signals which indicate that the film should be advanced are recorded at intervals along the instruction track which are determined by the content of the material recorded on the sound track. Therefore, when the sound background for the frame of film that is presently displayed is terminated, a 1,000 c.p.s. signal is recorded on the instruction track of the tape adjacent to the point on the sound track where the recording of the sound background is terminated.

Tone amplifier 1006 converts the 1,000 c.p.s. signal received at terminals 1100 into a D.C. signal on output lines 1102 and 1104. Thus, reception of a 1,000 c.p.s. of one-tenth second duration produces a D.C. voltage between output lines 1102 and 1104 for a similar but slightly longer duration. Thus, the winding 1092 of advance relay 1002 is energized for a fraction of a second. During the period of energization of winding 1092, the arm 1032 is drawn against contact 1090 thereby energizing the solenoid 76 and advancing the frame of the film.

It should be noted, that when arm 1032 is drawn from contact 1030, there is no longer a closed circuit between the leads 1010 and 1058 of electrical plug 312 through winding 1022 of the hold relay 1000. However, the apparatus 30 remains in an operative condition as a result of capacitor 1024. Capacitor 1024 is charged sufficiently during the period in which winding 1022 is energized so that when the circuit is opened by arm 1032, capacitor 1024 bleeds off, thereby providing enough current to winding 1022 to continue to draw arm 1060 against contact 1064. Since the duration of the energization of winding 1092 of the advance relay 1002 is only a small fraction of a second, the capacitor 1024 is not completely discharged and winding 1022 remains sufficiently energized to maintain arm 1060 against contact 1066. After the duration of the D.C. signal between output lines 1102 and 1104, the winding 1092 is de-energized. Arm 1032 is spring urged to its normal position against contact 1030. Thus, a complete circuit between leads 1010 and 1058 of electrical plug 312 is made through winding 1022 of hold relay 1000.

The diode rectifier 1014 provides a D.C. voltage to start charging capacitor 1024 again and the apparatus 30 remains on.

Upon detection of the 2 second duration 1,000 c.p.s. signal which indicates the end of a program, tone amplifier 1006 provides an approximately 2 second voltage signal on lines 1102 and 1104. The winding 1092 of relay 1002 is again energized and thereby draws arm 1032 against contact 1090 and away from contact 1030. The circuit between leads 1010 and 1058 through winding 1022 of relay 1000 is broken. Capacitor 1024 begins to bleed off to enable winding 1022 to remain energized. However, since the circuit through winding 1092 remains open for two seconds while arm 1032 remains in a position away from contact 1030, the capacitor is discharged sufficiently so that winding 1022 cannot continue to pull arm 1060. The arm 1060 therefore returns to contact 1064 to cut off the operation of the apparatus 30. The capacitor is therefore not able to sustain the energization of winding 1022 for as long a period as advance relay winding 1092 draws arm 1032 away from contact 1030 when the tone amplifier 1006 detects an end of program instruction signal.

The end of program signal, thus, turns off the apparatus since the open circuit across winding 1022 discharges capacitor 1024. This results in the de-energization of winding 1022 of relay 1000. The de-energization of winding 1022 results in arm 1060 leaving contact 1066 and returning to contact 1064. The return of arm 1060 to contact 1064 opens the circuit between leads 1010 and 1058 for all of the elements in the circuit with the exception of fan 610. Thus, fan 610 remains on in that it is connected to lead 1010 directly via lead 1012 and to lead 1058 via fuse 1056 and lead 1054. Therefore, after the program is completed, and the apparatus 30 is not operative, the fan 610 remains on to cool lamp 60.

The tape solenoid 62 includes a winding 1106. The first end of winding 1106 is connected to diode 1014 via lead 1026. The second end of winding 1106 is connected to a contact 1108 of microswitch 870. Microswitch 870 further includes a movable arm 1110 which is selectively engageable with contact 1108. Arm 1110 of microswitch 870 is connected to a contact 1112 of microswitch 678 via lead 1114. Microswitch 678 further includes a movable arm 1116 which is selectively engageable with contact 1112. Arm 1116 is connected to automatic-manual switch 54 via lead 1118. Diode 1014 is also connected to a capacitor 1119. Capacitor 1119 is connected to terminals 1042 and 1044 of on-off switch 52 via lead 1040. Capacitor 1119 acts as a filter to make the voltage between leads 1026 and 1040 a more constant D.C. voltage.

Lead 1010, in addition to being connected to diode 1014, is also connected to lamp 60, motor 70 and to the primary winding 1018 of transformer 1020. Motor 70 and primary winding 1018 are each connected at their other end to lead 1040. Lamp 60 is connected at its other end to automatic-manual switch 54.

Automatic-manual switch 54 includes terminals 1120 and 1122 which are connected to arm 1116 of microswitch 678 and lamp 60, respectively, a pair of arms 1124 and 1126 and contacts 1128, 1130, 1132 and 1134. Arm 1124 is connected to terminal 1120 and is selectively movable between contacts 1128 and 1130. Arm 1126 is connected to terminal 1122 and is selectively movable between contact 1132 and 1134. Arms 1124 and 1126 are mechanically linked as indicated by the dashed line in FIG. 34 so that they are moved together. Thus, when arm 1124 is moved against contact 1128, arm 1126 follows and is urged against contact 1132. Similarly, movement of arm 1124 against contact 1130 results in engagement of contact 1134 by arm 1126.

As seen in FIG. 34, the contacts 1130, 1132 and 1134 are each connected to lead 1040 which is in turn connected to the terminals 1042 and 1044 of the on-off switch 52. Contact 1128, however, is not connected to any of the other electrical elements in the circuitry. Thus, if automatic operation of the apparatus 30 is desired, arms 1124 and 1126 are urged against contacts 1130 and 1134, respectively, by pressing the automatic side of the automatic-manual switch 54. When manual pressure is released from the switch, the arms 1124 and 1126 remain against the contacts 1130 and 1134, respectively. These positions are maintained until the manual side of the automatic-manual switch 54 is pressed.

In automatic operation, the film strip is advanced automatically as a result of the instruction track of the tape 66 as the tape is played back. If, however, a program does not have an audio portion, the tape is not used and therefore control signals are not present on a tape which can enable the advancing of the film. Thus, when the apparatus 30 is operated in a manual mode by pressing the manual portion of the automatic-manual switch 54, the arms 1124 and 1126 are urged against contacts 1128 and 1132. The lamp 60 is connected to lead 1040 via arm 1126 and contact 1132 and therefore is lighted during operation of apparatus 30. However, the tape solenoid 62 is no longer in a complete circuit in that arm 1124 is urged against contact 1128 and an open circuit is provided between arm 1124 and contact 1130. In this manner, lamp 60 projects the image from the film strip for the visual portion of a program; however, the film strip is advanced only by pressing the advance portion of the hold-advance switch 56. This closes the circuit through winding 1068 of advance solenoid 76 between input leads 1010 and 1058 from the electrical plug 312. As hereinbefore mentioned, the energization of solenoid 76 advances the frame of film 728 which is projected onto a display screen.

Transformer 1020 is a step-down transformer and converts the 110–120 volt A.C. signal on primary winding 1018 to a lower voltage A.C. signal on leads 1138 which may be converted by power supply 1008 to D.C. voltages for the operation of tone amplifier 1006 and audio amplifier 1004. The first D.C. output signal from power supply 1008 is provided on output lines 1140 and 1142 which are connected to tone amplifier 1006. A second D.C. voltage output from power supply 1008 is provided on lines 1144 and 1146 to audio amplifier 1004. Audio amplifier 1004 includes input terminals 1148 which are connected to the amplifier 1004 via lines 1149 and 1150. Input terminals 1148 are connected to sound pickup head 72. The terminals 1148 are connected to the portion of sound pickup head 72 which is magnetically coupled to the sound program track on tape 66. Terminals 1148 are connected to input lines 1149 and 1150 of audio amplifier 1004 in parallel with terminals 1151. Terminals 1151 are connected to the microphone jack 916. Thus, inputs may be fed to the audio amplifier either by way of the sound pickup head 72 or via an external microphone. Audio amplifier 1004 amplifies either of these inputs and produces an output on the primary winding 1152 of output transformer 1154.

Transformer 1154 also includes a secondary winding 1156 which is connected across terminals 1158 and terminals 1160. Terminals 1158 are connected to the speaker 74 and terminals 1160 are connected to the external speaker jack 914. Thus, apparatus 30 may be used as an annunciating system by using a microphone and transmitting the signals therefrom via terminals 1151 through the audio amplifier to either the internal speaker 74 or a loud speaker system via terminals 1160 and jack 914. It should also be understood that the audio amplifier may be used to reproduce the sound track of the tape 66 on either the internal speaker 74 via terminals 1158 or on an external loud speaker system via terminals 1160 and jack 914. In this manner, the apparatus 30 is usable with or without a tape magazine in cartridge 42. If the magazine is not provided, the sound portion of the program may be supplied by the operator when a microphone is plugged into jack 916.

Motor 70 is also connected to lead 1040. Thus, motor 70 is energized during the entire operation of the apparatus 30. That is, lead 1040 is electrically connected to lead 1058 whenever the apparatus 30 is in operation. As hereinbefore seen, motor 70 is coupled by pulley wheel 350 to capstan 68 for rotation thereof. Capstan 68 is thereby rotated continuously during the operation of apparatus 30. The audio tape is thus moved during the operation of apparatus 30 whenever winding 1106 of solenoid 62 is energized and draws pressure roller 64 against the capstan 68.

Thus, the operation of the overall electrical circuitry is substantially as follows:

The apparatus is prepared for operation when plug 312 is inserted into a 110–120 volt A.C. receptacle. The on side of on-off switch 52 is then pressed down and thereby closes arm 1050 against contact 1046 for a short period. During this period, a complete circuit is formed between lead 1010 and lead 1058 through hold relay winding 1022. Arm 1060 is drawn against contact 1066 which makes another complete circuit between leads 1010 and 1058 through winding 1022 to hold the apparatus 30 in operation when the pressure on the on side of switch 52 is released. It can be seen that the hold delay enables the apparatus 30 to be turned off automatically, as will be seen hereinafter in the description of the circuit operation.

As a complete circuit is made between lead 1058 and lead 1040, either by arm 1050 engaging contact 1046 or arm 1060 engaging contact 1066, a steady D.C. voltage is provided by diode 1014 and filtering capacitor 1119 across windings 1022, 1068 and 1106 as the circuitry associated therewith is closed to lead 1040. That is, winding 1022 is energized by the D.C. voltage when arm 1032 is against contact 1030 in advance relay 1002. Winding 1068 is energized when either arm 1032 of relay 1002 is against contact 1090 or when arm 1082 of hold-advance switch 56 is urged against contact 1086. Winding 1106 of solenoid 62 is energized when arms 1110 and 1116 of microswitches 870 and 678, respectively, are urged against contacts 1108 and 1112, respectively, and arm 1124 is urged against contact 1130.

The closed circuit between leads 1058 and 1040 also provides A.C. voltage between leads 1010 and 1040 across lamp 60 when arm 1126 is urged against either contacts 1132 or 1134, motor 70 and primary winding 1018 of of transformer 1020. Thus, as soon as the on switch initiates operation of the circuit, hold relay 1022 is energized, lamp 60 is energized, motor 70 is energized and primary winding 1018 of transformer 1020 is energized. If the automatic portion of automatic-manual switch 54 is pressed down, solenoid 62 is energized and thereby draws the pressure roller 64 and pressure pad 682 to urge tape 66 against the capstan 68 and head 72, respectively. Capstan 68 therefore initiates movement of the tape 66.

The first frame of the film 728 is projected by lamp 60 as the audio portion of the program is sensed by pickup head 72, transmitted to terminals 1148 of audio amplifier 1004 and transmitted to speaker 74 via terminals 1158. After the audio portion, which is associated with the first frame is terminated, a 1,000 c.p.s. signal on the first track of tape 66 is sensed by pickup head 72 and transmitted to the tone amplifier 1006 via terminals 1100. Tone amplifier 1006 converts the signal to a D.C. signal which is transmitted on output lines 1102 and 1104 to winding 1092 of advance relay 1002. Arm 1032 is drawn against contact 1090 and the circuit between leads 1010 and 1058 is completed through winding 1068 and thereby causes the frame of film 728 to be advanced. Similarly, the second frame is displayed until the audio portion associated therewith is terminated whereupon the next advance signal causes solenoid 76 to advance the film 728 again.

The process is repeated until the last frame of the film 728 is shown whereupon the audio portion is finally completed. An end of program signal is sensed by sound pickup head 72, transmitted to the tone amplifiers via terminals 1100 and advance relay winding 1092 is energized again. However, the longer signal draws arm 1032 away from contact 1030 for a longer period of time than it is normally drawn for an end of frame signal.

The capacitor 1024 does not energize winding 1022 long enough to prevent arm 1060 from returning against contact 1064 and the on-off switch 52 breaks contact between leads 1058 and 1040 and the break thereby automatically turns off the operation of the apparatus 30.

Various adjustments to the operation of the apparatus 30 may be made with continuous operation switch 888, hold-advance switch 56 and automatic-manual switch 54. The continuous operation switch 888 may be closed to provide a continuous repetitive or iterative showing of the entire program. Hold-advance switch 56 enables the operator to synchronize the display of the visual portion with the audio portion if they are out of alignment with respect to each other. Automatic-manual switch 54 provides the operator with the option of having the frames of a film advanced automatically as the sound portion of the program proceeds, or to advance the film manually and provide an oral presentation.

The solenoid 62 may also be de-energized by the opening of microswitches 678 and 870. Microswitch 678 is opened whenever the cartridge receptacle 40 is opened and microswitch 870 is opened whenever eject switch 58 is pressed. As hereinbefore mentioned, these act as safety measures to prevent damaging tape 66 during either of the above occurences while apparatus 30 is in operation.

Figure 35:
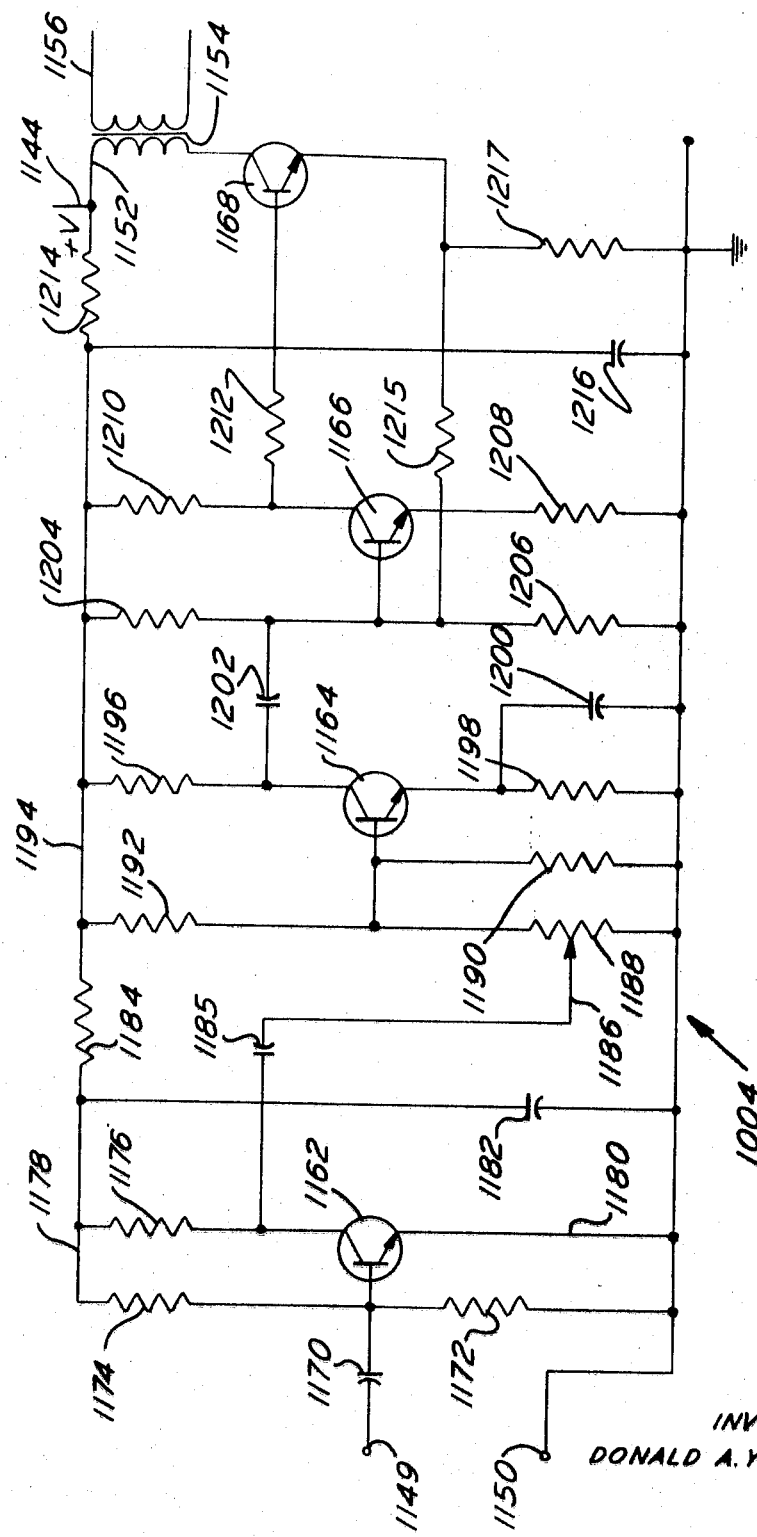
FIG. 35 is a schematic diagram of the audio amplifier.

The audio amplifier 1004 is shown in FIG. 35. The audio amplifier is comprised of four transistor stages including a first transistor 1162, a second transistor 1164, a third transistor 1166 and a fourth transistor 1168. Each of the transistors 1162 through 1168 are preferably of the N-P-N type.

Lines 1149 and 1150, as mentioned hereinabove, are connected to the sound pickup head 72 and to the external microphone jack 916. Line 1149 is connected to the base of transistor 1162 via a coupling capacitor 1170 and input line 1150 is connected to ground. A resistor 1172 is connected between line 1150 and the base of transistor 1162. The base of transistor 1162 is also connected to resistor 1174 which is in turn connected to resistor 1176 via lead 1178. Resistor 1176 is also connected at its opposite end to the collector of transistor 1162. Resistors 1172 and 1174 act as a voltage divider to provide the proper bias to the base of transistor 1162. The emitter of transistor 1162 is connected via lead 1180 to ground via line 1150. Resistor 1176 acts as a load resistor for the output current of transistor 1162. A capacitor 1182 is connected from lead 1178 to line 1150. Lead 1178 is also connected to resistor 1184. Resistor 1184 and capacitor 1182 act as a filter to prevent any hum in the voltage from the power supply to the first transistor stage 1162. The transistor 1162 operates as a pre-amplifying stage and thus it is necessary to prevent any hum so that it is not multiplied or increased in the next stage of the audio amplifier.

The collector of transistor 1162 is also connected to a coupling capacitor 1185 which is in turn connected to the wiper 1186 of potentiometer 1188. Wiper 1186 is moved along the resistance of potentiometer 1188 by manual adjustment of the volume control dial 50. The potentiometer 1188 acts to control the volume in speaker 74. Potentiometer 1188 is connected between line 1150 and the base of transistor 1164. It is connected in parallel with resistor 1190 which is also connected between ground and the base of transistor 1164. Also connected to the base of transistor 1164 is a resistor 1192 which is connected at its other end to the resistor 1184. Resistors 1190 and 1192 act as a voltage divider to provide the proper bias to the base of transistor 1164.

Resistor 1192 is connected via lead 1194 to resistor 1196 which is connected to the collector of transistor 1164 and acts as a load resistor therefor. The emitter of transistor 1164 is connected to a biasing resistor 1198. The biasing resistor 1198 is also connected to ground at its other end. Connected in parallel with resistor 1198 between the emitter of transistor 1164 and ground is a clamping capacitor 1200. The collector of transistor 1164 is connected to the base of transistor 1166 via a coupling capacitor 1202. A resistor 1204 is connected between lead 1194 and the base of transistor 1166. Another resistor 1206 is connected from the base of transistor 1166 to ground.

Resistors 1204 and 1206 act as a voltage divider to provide the proper biasing voltage to the base of transistor 1166. The emitter of transistor 1166 is connected to ground via a biasing resistor 1208. The collector of transistor 1166 is connected to lead 1194 by a load resistor 1210 and to the base of transistor 1168 via a limiting resistor 1212. The connection between the collector of transistor 1166 and the base of transistor 1168 is commonly known as a Darllington connection.

Lead 1194 is connected to a resistor 1214 and capacitor 1216. Capacitor 1216 is connected at its other end to ground. The resistor 1214 is connected at its other end to the primary winding 1152 of output transformer 1154. It is also connected to line 1144 from power supply 1008. A positive voltage is applied to line 1144 from power supply 1008 and is transmitted to the audio amplifying circuit via resistor 1214 and capacitor 1216. The resistor 1214 and capacitor 1216 act to filter out the 120 cycle ripple present in the ouput voltage from the power supply 1008. The emitter of transistor 1168 is connected to the base of transistor 1166 via a resistor 1215. It is also connected to ground via resistor 1217. The combination of resistors 1206, 1215 and 1217 form a voltage divider for a portion of the voltage emitted from the emitter of transistor 1168 and provide a negative feed-back to the base of transistor 1166. Transistor 1168 is a power amplifier. The feed-back of negative voltage from the emitter of transistor 1168 prevents spurious oscillation and provides a flatter frequency response as well as greater stability. The collector of transistor 1168 is fed directly to winding 1152 of output transformer 1154. Thus, the transistor 1168 drives the speaker 74 and any external speaker through transformer 1154.

Figure 36:
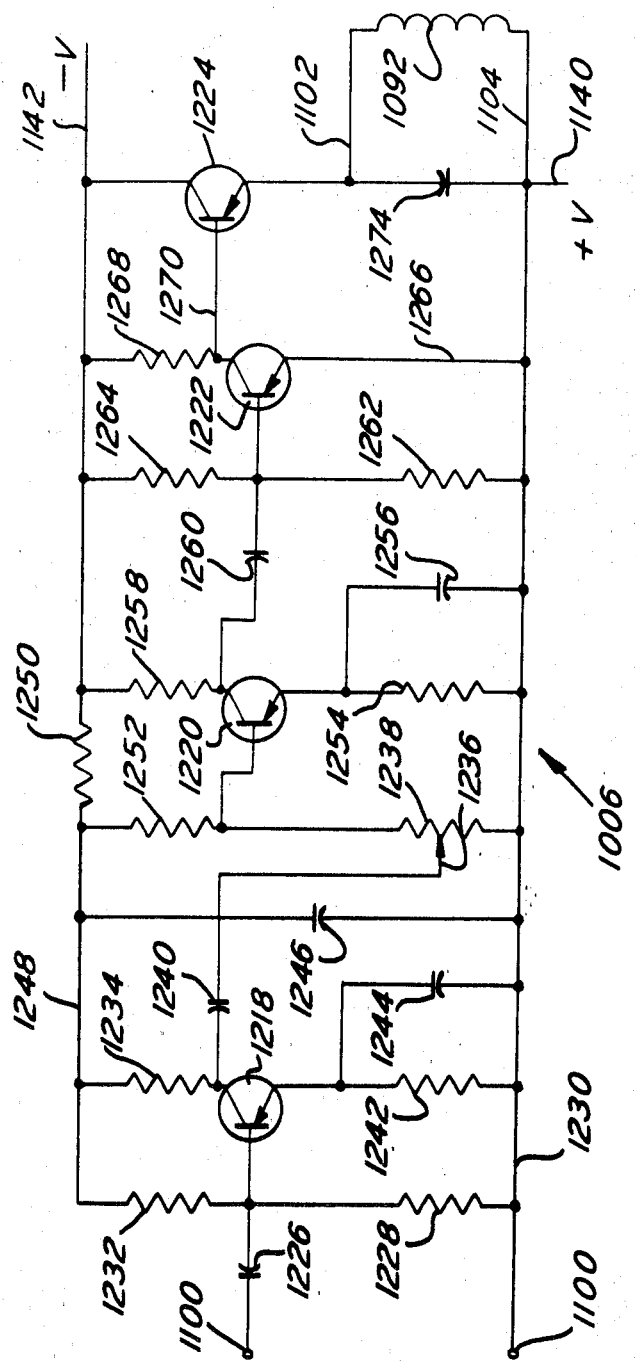
FIG. 36 is a schematic diagram of the tone amplifier.

The tone amplifier 1006 is shown in FIG. 36 and basically comprises a first transistor 1218, a second transistor 1220, a third transistor 1222 and a fourth transistor 1224. Each of the transistors 1218, 1220, 1222 and 1224 are preferably of the P-N-P type. The output from the head of sound pickup head 72 which is magnetically associated with the control signal track is fed to the first transistor 1218 via input terminals 1100 and an RC circuit comprised of capacitor 1226 and resistor 1228. Capacitor 1226 is connected to the base of transistor 1218. Resistor 1228 is connected between the base of transistor 1218 and line 1230. The base of transistor 1218 is also connected to the resistor 1232. Resistor 1232 is connected at its other end to a resistor 1234 which is in turn connected to the collector of transistor 1218. Resistors 1232 and 1228 form a voltage divider for providing proper bias to the base of transistor 1218. Resistor 1234 acts as a load resistor for the transistor 1218. The collector of transistor 1218 is connected to a wiper 1236 of potentiometer 1238 via a coupling capacitor 1240.

Potentiometer 1238 is provided to adjust the gain control of the circuit. That is, transistor 1218 is normally in a non-conducting condition. Upon receipt of a signal at terminals 1100, the transistor 1218 begins to conduct. If the potentiometer 1238 were not provided, any signal which started the transistor 1218 to conduct, in turn would cause transistor 1220 to conduct. Thus, not only 1,000 c.p.s. control signals would operate the circuit, but also spurious pulses or other noise. The potentiometer 1238 is thus set so that the transistor 1220 is turned on only upon receipt of a 1,000 c.p.s. control signal of sufficient magnitude as opposed to a small spurious pulse.

The emitter of transistor 1218 is connected to line 1230 via a resistor 1242 and a capacitor 1244 which are in parallel. Resistor 1242 provides proper emitter bias to transistor 1218. Capacitor 1244 acts as a clamping capacitor to stabilize the emitter bias voltage of transistor 1218 across resistor 1242 when the transistor 1218 is made conductive. A capacitor 1246 is connected from line 1230 to the junction of resistors 1232 and 1234 via lead 1248. Lead 1248 is connected to output line 1142 via resistor 1250. Resistor 1250 and capacitor 1246 act to filter the ripple present on the negative voltage supplied from the power supply 1008 which is fed to the circuit on line 1142.

The lead 1248 is also connected to the base of transistor 1220 via resistor 1252. Resistor 1252 and the resistance of potentiometer 1238 act as a voltage divider to provide proper bias to the base of transistor 1220. Transistor 1220 is normally biased to a non-conducting condition. The emitter of transistor 1220 is connected to line 1230 via a biasing resistor 1254. A clamping capacitor 1256 is also connected between the emitter of transistor 1220 and line 1230. The collector of transistor 1220 is connected to line 1142 via a load resistor 1258.

The collector of transistor 1220 is also connected to the base of transistor 1222 via a coupling capacitor 1260. The base of transistor 1222 is also connected to line 1230 via resistor 1262 and to line 1142 via resistor 1264. Resistors 1262 and 1264 act as a voltage divider to provide the proper bias to the base of transistor 1222. The emitter of transistor 1222 is connected directly via lead 1266 to line 1230. The collector of transistor 1222 is connected to line 1142 via a load resistor 1268 and directly to the base of transistor 1224 via lead 1270 in a Darllington connection mode. Lines 1140 and 1142 are connected as shown in FIG. 34 to the power supply 1008. The power supply 1008 provides D.C. voltage via lines 1140 and 1142 to properly bias transistors 1218, 1220, 1222 and 1224.

Transistor 1224 is a power transistor and is driven into saturation by the conduction of transistor 1222. Transistor 1222 conducts only when transistor 1220 conducts. Transistor 1220 conducts only when the transistor 1218 has been driven into a conducting state sufficient to drive transistor 1220 into operation. Thus, when a 1,000 c.p.s. signal of strong intensity is received at terminals 1100, so long as it is received, transistor 1218 is driven to an operative condition. Transistor 1218 amplifies the signal thereby driving transistor 1220 into an operative condition in which the transistor 1220 conducts.

Similarly, the transistor 1222 is driven to an operative condition by the output of transistor 1220. The emitter of power transistor 1224 is connected to the winding 1092 of advance relay 1002 via output line 1102. The other end of relay winding 1092 is connected to line 1230 via output line 1104. A capacitor 1274 is connected between the emitter of transistor 1224 and line 1230 across the relay winding 1092. Therefore, as transistor 1222 is driven to an operative condition, the output from the collector thereof drives transistor 1224 to saturation thereby providing a large surge of current into relay winding 1092. The surge of current also charges capacitance 1274. Therefore, when the 1,000 c.p.s. input signal received at terminals 1100 is terminated and transistors 1218, 1220 and 1222 become non-conductive, transistor 1224 is thereby no longer driven to saturation and is cut off. However, capacitor 1274 which has been charged bleeds off and enables the relay winding to be energized for a small period thereafter so that the relay winding 1092 has sufficient time to draw arm 1032 against contact 1090 to enable the solenoid 76 to advance the film 728 to the next frame.

It can be seen, therefore, that the length of the 1,000 c.p.s. signal at terminals 1100 determines the amount of time that current is fed via line 1102 to winding 1092. A one-tenth second 1,000 c.p.s. signal causes transistor 1224 and capacitor 1274 to energize winding 1092 for a small fraction of a second. However, the 2 second 1,000 c.p.s. signal energizes the winding 1092 for over 2 seconds.

Figure 37:
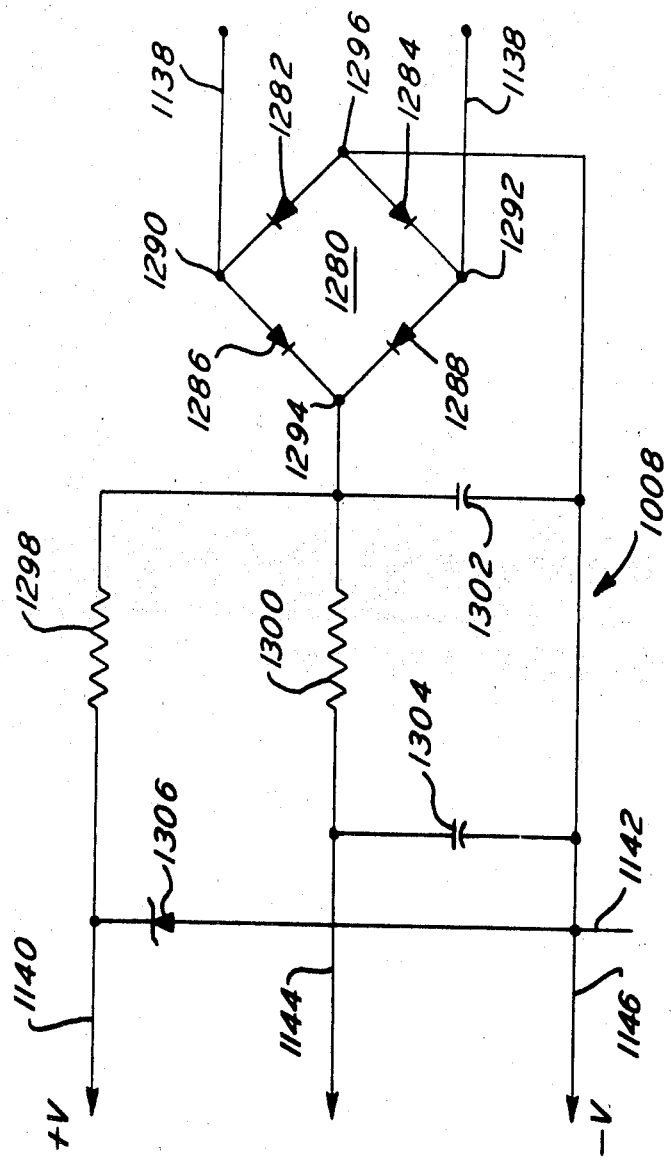
FIG. 37 is a schematic diagram of the power supply.

The power supply 1008 is shown in FIG. 37. The power supply is basically comprised of a full wave bridge rectifier 1280 which is comprised of four diodes 1282, 1284, 1286 and 1288. Diode 1282 is connected to diode 1284 at junction 1296 and diode 1286 at junction 1290. Diode 1285 is connected at junction 1294 to diode 1288. Diode 1288 is connected to diode 1284 at junction 1292. The input leads 1138 are taken from the transformer 1020 and provide an A.C. signal to the bridge rectifier 1280 at junctions 1290 and 1292. A fully rectified D.C. voltage is thus taken off the rectifier 1280 at junctions 1294 and 1296. Junction 1296 is connected to output lines 1146 and 1142. Junction 1294 is conected to the output line 1140 via resistor 1298 and to the output line 1144 via resistor 1300. A capacitor 1302 is connected between junction 1294 and output lines 1146 and 1142 and acts as an input filter to level the D.C. voltage applied across the output lines. Another capacitor 1304 is provided between line 1144 and output lines 1146 and 1142. Capacitor 1304 also acts as a filter to additionally filter the D.C. voltage between lines 1144 and 1146. A Zener diode 1306 is provided between lines 1140 and 1142. Resistor 1298 acts as a limiting or surge resistor to protect Zener diode 1306. The Zener diode has a break-down voltage of approximately 10.6 volts so that a very constant voltage is maintained between lines 1140 and 1142 as a source of voltage to the tone amplifier 1006. Thus, D.C. biasing voltages and power are supplied to tone amplifier 1006 via lines 1140 and 1142 and to audio amplifier 1004 via output lines 1144 and 1146.

OPERATION

When apparatus 30 is not in operation, the hood 34 is locked in a vertical position, as shown in FIG. 1, adjacent inner wall 92 by locking mechanism 230. The cartridge receptacle 40 is pivoted into wall 38, as shown in FIG. 3, and is locked therein by the locking post 846 (see FIG. 20) of the eject switch 58.

To operate the apparatus 30, button 294 which is best seen in FIGS. 13 and 18, of locking mechanism 230 is first pressed inwardly and the locking posts 254 are disengaged from locking fingers 246 of hood 34. The hood 34 is then pivoted outwardly to a horizontal position, as shown in FIG. 2, and screen assembly 36 is urged outwardly by spring loaded hinges 208 and 228 as shown in FIG. 5. The hood 34 is positioned over the screen assembly 36 so that locating posts 178 (best seen in FIGS. 10 and 12) of the screen assembly are engaged between legs 236 of support bracket 234 and the legs 236 rest on ledges 180 of the screen assembly to support hood 34. The screen assembly is thus in position for projection of the film portion of the program on the rear of screen 61.

Electrical plug 312 is then pulled outwardly and the electrical cord 310 (FIG. 15) unreeled from the take up reel 308. The plug 312 is then inserted in a 110–120 volt A.C. receptacle.

To open receptacle 40, the eject switch 58 is pressed downwardly which thereby urges locking post 846 downwardly to release locking finger 666 of the cartridge receptacle 40. The cartridge receptacle 40 is then pivoted outwardly as the spring 854 draws the cartridge receptacle about fasteners 638 in the direction of arrow 856 in FIG. 20. The cartridge receptacle is thereby positioned, as shown in FIG. 30, for removing or receiving a cartridge 42. Cartridge 42 is slid into or out of the cartridge receptacle 40 in the direction of arrows 859. As best seen in FIG. 22, as a cartridge is inserted into the receptacle, release brackets 652 urge nylon guides 812 of the tape magazine 46 against base plate 770 thereof and thereby draw tape 66 out of the confines of the magazine 46.

The tape 66 is thus readily accessible to capstan 68 and roller 64 for movement and is drawn against sound pickup head 72 as the cartridge 42 bears against the bottom of receptacle 40. The cartridge is then pivoted manually in the direction of arrow 844 in FIG. 30 so that the outer wall 672 of the receptacle is flush with outer wall 38. The tape is simultaneously inserted between the capstan 68 and pressure roller 64 as well as underneath pressure pad 682.

Assuming the apparatus 30 is to be operated in an automatic mode, the automatic portion of automatic-manual switch 54, shown in FIG. 2, is pressed downwardly thereby closing arms 1124 and 1126 against contacts 1130 and 1134, respectively, (FIG. 34). The operation of apparatus 30 is started by pressing the on portion of switch 52 which thereby urges arm 1050 against contact 1046. This action closes the electrical circuit between leads 1010 and 1058 through the winding 1022 of relay 1000. Therefore, winding 1022 is energized and the arm 1060 of the relay is drawn against contact 1066.

Thus, even though the pressure applied to on portion of switch 52 is released, the apparatus 30 remains in operation. While arm 1060 remains drawn against contact 1066, the solenoid 62, lamp 60, motor 70 and winding 1018 of transformer 1020 are energized.

The energization of solenoid 62 draws link 66 with the pressure roller 64 and pressure pad 682 (FIGS. 15, 16 and 19) downwardly against capstan 68 and the sound pickup head 72, respectively.

The energization of motor 70 results in the rotation of capstan 68 which thereby enables the movement of sound tape 66. The tape 66 is drawn between capstan 68 and pressure roller 64.

The energization of lamp 60 results in a beam of light (FIG. 21) being generated in the direction of arrow 1310 which is collimated by lenses 598 and directed through the opening 618 of flange 616 (FIG. 31) and the opening 723 between portions 720 and 722 of wall 719 of the film holder 44. The collimated beam is reflected at a 90° angle as indicated by arrow 912 by mirror 739, and directed through a frame of the roll of film 728 and opening 712 provided therefor in wall 688 of cartridge 42, through opening 431 (FIG. 16) in supporting plate 326, through lens 202 and finally to the rear of screen 61.

The sound pickup head 72 reproduces the audio portion recorded on tape 66 while a frame of film 728 is projected on screen 61. The program on the sound track of tape 66 is sensed by sound pickup head 72 and transmitted to the audio amplifier via terminals 1148 (FIG. 34). The audio amplifier feeds the amplified sound portion to output transformer 1154 which supplies the speaker 74 with the output signal via terminals 1158. Simultaneously, sound pickup head 72 also senses the signals on the control track of tape 66 and feeds them to tone amplifier 1006 via terminals 1100.

The tone amplifier 1006 provides a D.C. signal on lines 1102 and 1104 upon reception of each advance signal received at terminals 1100. As each signal is received, a voltage is applied to lines 1102 and 1104 to energize winding 1092 of advance relay 1002.

As advance relay winding 1092 is energized, arm 1032 is drawn against contact 1090. This completes the circuit through winding 1068 of advance solenoid 76.

As best seen in FIG. 27, when advance solenoid 76 is energized, shaft 546 is drawn downwardly and thereby draws wire 548 in the same direction. The drive wheel 430 (FIG. 28) is rotated in the direction of arrow 574 shown in FIG. 27. The cam surface 494 of cam disc 432 urges finger 476 in the direction of arrow 576 as the disc is rotated in the direction of arrow 574 with drive wheel 430. Simultaneously, pawl 496 is drawn over the next tooth 517 of single frame advance disc 434 and engages the tooth at shoulder 519.

When the advance signal from tone amplifier 1006 terminates, the signal on lines 1102 and 1104 is terminated and winding 1092 of advance relay 1002 is de-energized, thereby releasing arm 1032 which moves away from contact 1090. The circuit is thus broken through winding 1068 of solenoid 76. The shaft 546 is thus no longer drawn towards winding 1068 in the body of the solenoid. The pull of spring 560 is then the greater force drawing wire 548 and the spring thereby causes wire 548 to draw drive wheel 430 in the direction of arrow 578. As drive wheel 430 so rotates, the single frame advance disc 434 is drawn by pawl 496 in a similar direction. The drive cone 436 which is connected to the single frame advance disc 434 also rotates with the disc. Adjusting knob 438 is firmly engaged to the drive cone 436 and also rotates. The shaft 422 is keyed to adjusting knob 438 by keying pin 538 so that shaft 422 also rotates in the direction of arrow 578.

Shaft 422 is connected to sprocket wheel 78 which is engaged with film strip 728 through slots 714 and thereby advances the film a single frame as a result of the rotation of shaft 422.

The advancing of the film 728 continues as the subsequent advance signals are received at terminals 1100 from the control track of sound pickup head 72. When the entire program has been played, the end of program signal is sensed by the sound pickup head 72. The end of program signal is similar to the advance signals though longer so that when the winding 1092 of relay 1002 is energized during that period, the arm 1032 breaks contact with contact 1030 and thereby starts capacitor 1024 to discharge.

Capacitor 1024 completely discharges before arm 1032 returns to contact 1030 so that the relay winding 1022 is de-energized and enables arm 1060 to return to contact 1064. The circuits across winding 1106 of solenoid 62, lamp 60, motor 70 and primary winding 1018 of transformer 1020, are broken and the operation of apparatus 30 is thereby terminated. The only circuit which remains on is that circuit through fan 610 which continues to ventilate and cool off the apparatus 30. The fan 610 is not de-energized until the plug 312 is removed from an electrical receptacle.

Where automatic operation of the apparatus 30 is desired without cessation of the program, that is, where it is desired that the program be continually repeated without the apparatus 30 being turned off, continuous operation switch 888 is closed thereby drawing arm 1036 against contact 1034. With switch 888 closed, the apparatus 30 continues to repetitively show the same program over and over again. The end of program signal sensed by the pickup head 72 and converted by tone amplifier 1006 to a D.C. signal on lines 1102 and 1104 across winding 1092 of relay 1002 does not turn off the apparatus 30 at the end of the program. This is so because, as arm 1032 is drawn from contact 1030, capacitor 1024 does not discharge because a complete circuit is provided between contact 1034 and terminal 1038 by the arm 1036 through winding 1022. The winding 1022 thus continues to be energized no matter how long arm 1032 breaks contact with contact 1030.

In a continuous operation mode, the apparatus 30 does not turn off unless someone presses the off portion of switch 52 and thereby releases arm 1052 from contact 1048. This action opens the circuit through relay winding 1022 which causes arm 1060 to return to contact 1062 which in turn breaks the circuit through winding 1106 of solenoid 62, lamp 60, motor 70 and primary winding 1018.

The off portion of on-off switch 52 when pressed during normal automatic operation of the apparatus also terminates operation of the apparatus. The off portion of switch 52 thus may also be used to terminate the operation of apparatus 30 in the middle of a program.

The apparatus 30 may also be used as a projector without the sound presentation. Where a tape magazine is not used with the cartridge 42, it is not necessary to energize solenoid 62 in that the pressure roller 64 need not engage a tape. Thus, the manual portion of automatic-manual switch 54 may be pressed so that arms 1124 and 1126 engage contacts 1128 and 1132, respectively. Thus, lamp 60 remains energized and operates when the apparatus 30 is in operation but solenoid 62 is not energized and does not draw link 366 with pressure roller 64 and pressure pad 682 downwardly. The lamp 60 projects the image from the film 728 onto screen 61 and the film may be advanced by pressing the advance portion of switch 56 so that the switch closes the circuit through winding 1068 of solenoid 76 by urging arm 1082 against contact 1086. The visual program may thus be shown by advancing the film until a complete program is shown. The apparatus 30 is then turned off by pressing the off portion of switch 52.

When a new program comprised of a new film strip and new tape is inserted in the cartridge 42, the probability is that the film and tape are not synchronized. That is, the sound recorded on tape 66 does not correspond to the frame being displayed on screen 61. When the apparatus 30 is in operation, the film and tape are synchronized by appropriately pressing either the hold portion or the advance portion of switch 56.

If the sound portion of the program is ahead of the film portion of the program, the advance portion of the switch 56 may be pressed until the film portion has been advanced enough to correspond with the sound portion. Each time the advance portion of switch 56 is pressed, the arm 1082 is urged against contact 1082 to close the circuit through winding 1068 of solenoid 76 which thereby advances the film. If, however, the film portion is ahead of the sound portion, the hold portion of switch 56 may be continuously pressed until the sound portion of the program corresponds to the film portion. As seen hereinabove, when the hold portion of switch 56 is pressed, arm 1080 is urged away from contact 1084 thus opening the circuit through winding 1068 of solenoid 76. Thus, whether or not relay winding 1092 is energized and draws arm 1032 against contact 1090 an open circuit prevails through winding 1068 of solenoid 76. Thus, solenoid 76 cannot be energized as long as the hold portion of switch 56 is pressed.

The apparatus 30 is also equipped to show the visual portion of the program on an external screen and produce the sound portion of the program on an external loud speaker. The adapter 200 which is stored underneath the cartridge receptacle 40 (FIG. 16) is substituted for lens 202 and is inserted as shown in FIG. 9. Prior to the insertion of adapter 200 the wall 150 of screen assembly 36 is detached from journals 126 and is engaged by pin 146 in journal 144. The adapter 200 includes a longer focal lens which directs the image in the direction of arrows 912, shown in FIG. 9, so that the visual portion of the program may be displayed on an external screen. The adapter 200 may be rotated to vary the height at which the image is displayed.

External speakers may be connected to terminals 1160 by insertion of a speaker plug into jack 914 which is provided in wall 82 of the apparatus 30. It should also be noted that jack 916 may be connected to an external microphone so that the apparatus 30 may be used as an annunciating system using either an external speaker or speaker 74.

The apparatus 30 is also provided with safety features to prevent the tearing of sound tape 66. That is, there are two ways in which the tape 66 could possibly be injured. The first is to close the cartridge receptacle 40 with cartridge 42 in place while apparatus 30 was in operation. In that event, the roller 64 would be pressed against capstan 68 thereby preventing the tape from being slid therebetween. Thus, the tape 66 could be broken if the cartridge 42 is inserted into the apparatus while the machine is in operation. To prevent against such a happening, microswitch 678 is provided which is closed only when the cartridge receptacle 40 is inserted into the wall 38 and thereby closes arm 1116 against contact 1112. As seen in FIG. 34, the microswitch 678 must be closed in order to energize winding 1106 of solenoid 62. Thus, solenoid 62 can never be energized and cause roller 64 to be drawn against capstan 68 without the cartridge receptackle 40 having been completely closed.

The other way that the tape 66 could conceivably be damaged is if during the operation of the apparatus 30, the eject switch 58 is inadvertently pressed, the cartridge receptacle 40 would be drawn open by spring 854 and the tape 66 would be caught between pressure roller 64 and capstan 68, thus, pulling the tape out of the magazine 46. To prevent against such a happening, microswitch 870 is provided which is opened whenever eject switch 58 is pressed downwardly. Thus, as seen in FIG. 34, the arm 1110 would be drawn from contact 1108 to thereby open the circuit to winding 1106 of the solenoid 62 whenever the eject switch is pressed. In this manner, the pressure roller 64 would be released from capstan 68 prior to the opening of the cartridge receptacle 40. When the pressure roller 64 is released from capstan 68, tape 66 is freed to travel with the magazine 46.

Thus, it can be seen that a valuable device has been provided for the fields of education, sales, advertising and other areas where effective communication is essential. An untrained teacher or salesman can use the device to easily provide a complete program to educate the student or consumer. The presentation is well prepared and the contents of the program presented clearly.

It can be seen that the instant device is extremely flexible without decreasing the ease with which it may be operated. The combination visual and sound apparatus does not require threading or other time consuming as well as difficult manipulations to initiate its operation. It is necessary only to slide a cartridge 42 into the cartridge receptacle 40, pivot the cartridge receptacle into the apparatus and the device is ready for operation.

The flexibility of performance is enhanced by the readily interchangeable cartridge 42. The film is readily interchangeable in the film holder 44 for insertion into the cartridge 42. Similarly, tape magazines may be easily replaced by other magazines in opening 700 of the cartridge. Thus, the complete audio and visual program is contained in a single cartridge and is readily interchangeable with other complete programs contained in other cartridges 42 by replacement thereof in the cartridge receptacle 40.

The design of cartridge 42 also enhances the use of the audio-visual device in various foreign countries. That is, where the film content of a program need not be changed, it is necessary only to provide a magazine having a foreign language sound track. In this manner, the apparatus may be taken from one country to another without requiring a separate device for each country. Only a single cartridge 42 for each program is necessary in that the tape magazines 46 for each country may be used with the same cartridge.

The device is also compact and easy to carry. When not in use, the screen assembly is completely enclosed within the narrow hood 34, yet when in use, the screen provides a large viewing surface. Although compact, the combination visual and sound apparatus also includes a self contained sound reproduction unit for good reproduction of sound as well as the means for displaying the visual portion of the program. Thus, a complete visual and sound program is provided within the compact confines of the apparatus.

The device also lends itself to use as an advertising aid. For example, where it is desired to provide an animated advertisement in a store window, the machine may be operated in a continuous fashion. Thus, a program may be repeated over and over again automatically in a store window so that people passing by may view a complete advertising program.

The controls for the device are simple and easy to operate with the switches being labeled for easy identification of the proper switch. The apparatus is also easy to open and the operator may thus prepare the device for operation in a very short period of time. The device is also flexible enough to be used as a sound projector by plugging the leads to an external speaker into jack 914 and placing the screen to one side of the opening 96 as shown in FIG. 9 so that adapter 200 may be inserted in place of lens 202 for projection of the film program on an external screen.

The construction of the cartridge 42 also enables the tape and film to be easily accessible for movement and sensing of the tape and movement of and projection through the film. This accessibility is maintained while the tape and the film are completely self-contained within the confines of cartridge 42. Thus, the cartridge need not be handled with extreme care.

It should also be noted that the receptacle 40 of the apparatus enhances the ease with which the device may be operated in that the cartridge is pivotable into and out of a side wall of the device. The cartridge receptacle provides easy access to the cartridge when it is out of the apparatus, yet when it is closed, the cartridge receptacle completely encapsulates the cartridge 42 within the device to prevent inadvertent movement or jarring thereof.

The release brackets and sound pickup head provided in the receptacle enable the sound tape 66 to be made accessible for operation during insertion of the cartridge into the receptacle. The tape is placed against the sound pickup head during the insertion so that further movement of the tape with respect to the sound pickup head is unnecessary prior to placing the cartridge within the apparatus. Thus, the cartridge 42 is prepared for operation by the receptacle 40 prior to insertion into the apparatus 30. Further, lever operated or other constructions are obviated for operatively positioning the film or tape in that the film and the tape are positioned adjacent the capstan and sprocket wheel, respectively, when pivoted into the apparatus.

Thus, it can be seen that an extremely flexible device has been provided. The device is simple to operate, lends itself to quick operation, and may be used in a varied number of operations. It may be used by a salesman or an educator. It is extremely compact and may easily be taken wherever sales or instruction are needed.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a combination visual and sound apparatus for showing a program having a visual portion and a sound portion, a cartridge having a first compartment for removably receiving a magazine containing an endless roll of audio tape and a second compartment for holding an endless loop of film such that said film can be advanced in frame-by-frame sequence within said second compartment, said second compartment having a window at least as large as a single frame of said film, means for holding a portion of said film against said window, whereby a single frame of said film at a time may be positioned adjacent said window and centered with respect thereto.

a movable cartridge receptacle mounted in said apparatus, a sound pickup means mounted in said receptacle, said receptacle being adapted to removably receive said cartridge, said receptacle including means for moving a portion of said tape into an operative position adjacent said pickup means during insertion of said cartridge, said apparatus including a sprocket wheel and a capstan mounted adjacent said receptacle such that said sprocket wheel engages said film and said capstan is located adjacent said tape when said receptacle is moved to an operative position, said capstan being arranged to movably engage said tape when said apparatus is in operation, said cartridge including a pair of slotted openings adjacent said window thereof for providing access to said film by said sprocket wheel, said cartridge also including an opening in a side wall thereof so as to form an opening for said first compartment, said window and said slotted openings also being provided in said side wall thereof, said apparatus including a pressure roller and a pressure pad, said magazine including a recess in its outer surface adjacent said movable portion of said tape for receiving said pressure pad and pressure roller for urging said tape against said sound pickup head and said capstan, respectively, during operation of said apparatus, said apparatus including a pair of locating posts mounted adjacent said cartridge receptacles, said magazine including a pair of locating openings in said outer surface, whereby said locating posts will engage said locating openings to insure proper positioning of said cartridge when said cartridge receptacle is moved into said apparatus.

2. In a combination visual and sound apparatus for showing a program having a visual portion and a sound portion, a cartridge having a first compartment for removably receiving a magazine containing an endless roll of audio tape and a second compartment for holding an endless loop of film such that said film can be advanced in frame-by-frame sequence within said second compartment, said second compartment having a window at least as large as a single frame of said film, means for holding a portion of said film against said window, whereby a single frame of said film at a time may be positioned adjacent said window and centered with respect thereto, a movable cartridge receptacle mounted in said apparatus, a sound pickup mounted in said receptacle, said receptacle being adapted to removably receive said cartridge, said receptacle including means for moving a portion of said tape into an operative position adjacent said pickup means during insertion of said cartridge, said apparatus including a sprocket wheel and a capstan mounted adjacent said receptacle such that said sprocket wheel engages said film and said capstan is located adjacent said tape when said receptacle is moved to an operative position, said capstan being arranged to movably engage said tape when said apparatus is in operation, said cartridge including a filmholder comprising a film guiding means and a stem, said endless loop of film being wound loosely so that said film is comprised of a coil portion and a loop portion, said loop portion emanating from the center of said coil portion and terminating on the outer loop of said coil portion, said coil portion being positioned over said stem and said loop portion being positioned around said film guiding means, said guiding means including a recess having a mirror mounted therein and means for flattening a portion of said film adjacent one portion of said recess, said mirror being positioned at substantially at 45° angle to the plane of said film adjacent said recess such that a frame of said film within said portion thereof can be projected by directing a column of light through said one portion of said recess and said frame of said film, said column of light also passing through another portion of said recess and being reflected within said recess by said mirror, said second compartment arranged to removably receive said filmholder so that said endless loop of film can be completely enclosed in said second compartment.

3. In a combination visual and sound apparatus for showing a program having a visual portion and a sound portion, a cartridge having a first compartment for removably receiving a magazine containing an endless roll of audio tape and a second compartment for holding an endless loop of film such that said film can be advanced in frame-by-frame sequence within said second compartment, said second compartment having a window at least as large as a single frame of said film, means for holding a portion of said film against said window, whereby a single frame of said film at a time may be positioned adjacent said window and centered with respect thereto, a movable cartridge receptacle mounted in said apparatus, a sound pickup means mounted in said receptacle, said receptacle being adapted to removably said cartridge, said receptacle including means for moving a portion of said tape into an operative position adjacent said pickup means during insertion of said cartridge, said apparatus including a sprocket wheel and a capstan mounted adjacent said receptacle such that said sprocket wheel engages said film and said capstan is located adjacent said tape when said tape receptacle is moved to an operative position, said capstan being arranged to movably engage said tape when said apparatus is in operation, said cartridge including a filmholder comprising a film guiding means and a stem, said endless loop of film being wound loosely so that said film is comprised of a coil portion and a loop portion, said loop portion emanating from the center of said coil portion and terminating on the outer loop of said coil portion, said coil portion being positioned over said stem and said loop portion being positioned around said film guiding means, said filmholder including a mirror, said guiding means including a recess having a mirror mounted therein and means for flattening a portion of said film adjacent one portion of said recess, said mirror being positioned at substantially at 45° angle to the plane of said film adjacent said recess such that a frame of said film within said portion thereof can be projected by directing a column of light through one portion of said recess and said frame of said flm, said column of light also passing through another portion of said recess and being reflected within said recess by said mirror, said guiding means also including a spring clip mounted adjacent said mirror, said spring clip arranged to urge said film against said window in said second compartment of said cartridge such that a portion of said film is flattened against said window for projection of a beam of light therethrough, said guiding means further including spaced projections on one side of said guiding means for aid in flattening and guiding said film adjacent said window, said projections each comprising a groove arranged to accomodate the teeth of said sprocket wheel when said wheel engages said film.

4. The invention of claim 3 wherein said cartridge further includes a plurality of tabs which extend from the walls thereof adjacent the opening forming said second compartment, said film holder including a plurality of recesses in the periphery thereof whereby said tabs and recesses may be aligned for removably receiving said film holder in said second compartment.

5. The invention of claim 4 wherein said tabs include beads disposed at the end thereof and said recesses include detents whereby insertion of said tabs into said recesses causes said beads to be snapped into said detents and thereby snaps the film holder into the second compartment.

6. In a combination visual and sound apparatus for showing a program having a visual portion and a sound portion, a cartridge having a first compartment for removably receiving a magazine containing an endless roll of audio tape and a second compartment for holding an endless loop of film such that said film can be advanced in frame-by-frame sequence within said second compartment, said second compartment having a window at least as large as a single frame of said filmstrip, means for holding a portion of said film against said window, whereby a single frame of said film at a time may be positioned adjacent said window and centered with respect thereto, a movable cartridge receptacle mounted in said apparatus, a sound pickup means mounted in said receptacle, said receptacle being adapted to removably receive said cartridge, said receptacle including means for moving a portion of said tape into an operative position adjacent said pickup means during insertion of said cartridge, said apparatus including a sprocket wheel and a capstan mounted adjacent said receptacle such that said sprocket wheel engages said film and said capstan is located adjacent said tape when said receptacle is moved to an operative position, said capstan being arranged to movably engage said tape when said apparatus is in operation, said sprocket wheel being mechanically linked to a solenoid for rotation of said sprocket wheel and advancement of said film each time said solenoid is energized, said sprocket wheel being rotatably mounted on an elongated shaft, said shaft having a drive wheel rotatably mounted thereabout, an advance disc mounted adjacent said drive wheel and rotatably mounted about a shaft, a spring mechanically linked to said drive wheel, said solenoid arranged to rotate said drive wheel in a first direction and said spring arranged to rotate said drive wheel in a second direction, said drive wheel arranged to rotate said advance disc when said drive wheel is rotated in a second direction, such that shaft and said sprocket wheel will also be rotated by said advance disc.

7. The invention of claim 6 wherein said advance disc is mounted adjacent a stopping finger, said stopping finger adapted to prevent rotation of said advance disc after said advance disc has rotated a predetermined amount whereby said film is advanced a single frame each time said advance disc is rotated by said drive wheel.

8. The invention of claim 7 wherein said stopping finger is pivotably mounted adjacent said advance disce, said advance disc having a plurality of notches equally spaced about the periphery thereof, said stopping finger adapted to be pivoted into and out of said notches of said advance disc, said advance disc being locked rotationally against movement when said stopping finger is engaged in one of said notches, a cam disc secured to said drive wheel, said cam disc adapted to pivot said stopping finger out of said notches when said drive wheel is rotated in said first direction, whereby, said drive wheel frees said stopping finger when rotated in said first direction and said advance disc is rotated when said drive wheel is rotated in said second direction.

9. The invention of claim 8 wherein said apparatus includes means for adjusting the frame of said film so that the image from only a single frame is projected, said frame adjustment means comprising a knob which is secured to said shaft for rotation therewith, a drive cone secured to said advance disc, said cone adapted to be selectively engageable with said adjusting knob whereby said sprocket wheel may be rotated for movement of said film by rotation of said knob after disengaging said knob from said cone.

10. The invention of claim 9 wherein said adjusting knob is axially slidable along said shaft, the shaft including an enlarged cylindrical member secured at the end adjacent said adjusting knob, a spring axially mounted on said shaft between said enlarged member and said adjusting knob, said spring adapted to urge said adjusting knob into engagement with said drive cone so that said advance disc is mechanically secured to said shaft for rotation therewith when said cone and said knob are engaged.

11. In a combination visual and sound apparatus for showing a program having a visual portion and a sound portion, a cartridge having first and second compartments for removably receiving, in said first compartment, a magazine having an endless roll of tape for the production of sound rotatably mounted therein and, in said second compartment, a filmholder having an endless loop of film movably mounted thereon, said second compartment having a window in position such that a portion of said film will lie adjacent said window when said filmholder is mounted therein, whereby any frame of said film may be positioned adjacent and centered with respect to said window, said second compartment containing a pair of slots on opposite sides of said window for providing access to the sprocket holes on said film, said apparatus containing a movable cartridge receptacle having sound pickup means, said receptacle arranged to pivot out of a compartment of said apparatus and removably receive said cartridge, said receptacle including means for moving a portion of said tape into an operative position adjacent said pickup means during insertion of said cartridge, said apparatus including a pair of sprocket wheels extending into said compartment and a capstan mounted adjacent said receptacle such that when said receptacle contains said cartridge and is pivoted into said compartment of said apparatus, said capstan will be located adjacent said tape and said sprocket wheels will extend through said slots on opposite sides of said window and engage said sprocket holes of said film,

* * * * *